(12) United States Patent
Iwata et al.

(10) Patent No.: US 9,150,427 B2
(45) Date of Patent: Oct. 6, 2015

(54) MANGANESE OXIDE AND METHOD FOR PRODUCING SAME, AND METHOD FOR PRODUCING LITHIUM MANGANESE COMPOSITE OXIDE USING SAME

(75) Inventors: Eiichi Iwata, Yamaguchi (JP); Naoto Suzuki, Yamaguchi (JP); Miki Yamashita, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 127 days.

(21) Appl. No.: 13/876,718

(22) PCT Filed: Oct. 4, 2011

(86) PCT No.: PCT/JP2011/072881
§ 371 (c)(1),
(2), (4) Date: Mar. 28, 2013

(87) PCT Pub. No.: WO2012/046735
PCT Pub. Date: Apr. 12, 2012

(65) Prior Publication Data
US 2013/0187083 A1     Jul. 25, 2013

(30) Foreign Application Priority Data

Oct. 6, 2010  (JP) ............................... P2010-226885
Dec. 20, 2010 (JP) ............................... P2010-283790
Feb. 25, 2011 (JP) ............................... P2011-040518

(51) Int. Cl.
*C01G 45/02* (2006.01)
*C01G 45/12* (2006.01)
*H01M 4/505* (2010.01)

(52) U.S. Cl.
CPC ............ *C01G 45/02* (2013.01); *C01G 45/1242* (2013.01); *H01M 4/505* (2013.01); *C01P 2004/03* (2013.01); *C01P 2004/61* (2013.01);
(Continued)

(58) Field of Classification Search
CPC ............ C01G 45/02; C01G 45/1207–45/1292; H01M 4/50
USPC .................................................. 423/605, 599
See application file for complete search history.

(56) References Cited

U.S. PATENT DOCUMENTS

| 5,698,176 | A * | 12/1997 | Capparella et al. ........... 423/605 |
| 5,789,115 | A * | 8/1998 | Manev et al. .................. 429/224 |
| 2001/0022959 | A1* | 9/2001 | Manev et al. .................. 423/599 |

FOREIGN PATENT DOCUMENTS

| CN | 1482068 A | 3/2004 |
| CN | 1602283 | 3/2005 |

(Continued)

OTHER PUBLICATIONS

China Office action in CN 201180048347.8, mail date is Jun. 3, 2014.
(Continued)

*Primary Examiner* — Melvin C Mayes
*Assistant Examiner* — James Corno
(74) *Attorney, Agent, or Firm* — Greenblum & Bernstein, P.L.C.

(57) ABSTRACT

There is provided manganese oxide having a pore volume fraction of no greater than 20% for pores with diameters of 10 μm or greater, as measured by mercury porosimetry, and a tap density of 1.6 g/cm³ or greater, and a method for producing it. There is also provided a method for producing a lithium manganese composite oxide using the manganese oxide.

15 Claims, 76 Drawing Sheets

(52) U.S. Cl.
CPC ......... *C01P 2006/11* (2013.01); *C01P 2006/12* (2013.01); *C01P 2006/17* (2013.01); *C01P 2006/80* (2013.01); *Y02E 60/122* (2013.01)

(56) References Cited

FOREIGN PATENT DOCUMENTS

| | | |
|---|---|---|
| CN | 1626447 | 6/2005 |
| JP | 10-275613 | 10/1998 |
| JP | 2000-281351 | 10/2000 |
| JP | 2001-002422 | 1/2001 |
| JP | 2001-114521 | 4/2001 |
| JP | 2001-261343 | 9/2001 |
| JP | 2003-81638 | 3/2003 |
| JP | 2003-119029 | 4/2003 |
| JP | 2003-272629 | 9/2003 |
| JP | 3505132 | 12/2003 |
| JP | 2008-66028 | 3/2008 |
| JP | 2008-156162 | 7/2008 |

OTHER PUBLICATIONS

J. Pattanayak et al., "Preparation and thermal stability of manganese oxides obtained by precioitation from aqueous manganese sulphate solution", Thermochimica Acta, Nov. 1, 1989, pp. 193-204, vol. 153.

Search report from PCT/JP2011/072881, mail date is Nov. 8, 2011.

International Preliminary Report on Patentability for PCT/JP2011/072881, mailed May 16, 2013.

English translation of Written Opinion of the International Searching Authority for PCT/JP2011/072881.

Taiwanese office action issued with respect to application No. 100136011, mail date is Jan. 29, 2015.

* cited by examiner

MANGANESE OXIDE AND METHOD FOR PRODUCING SAME, AND METHOD FOR PRODUCING LITHIUM MANGANESE COMPOSITE OXIDE USING SAME

TECHNICAL FIELD

The present invention relates to manganese oxide and a method for producing it, and to a method for producing a lithium manganese composite oxide using it. The lithium manganese composite oxide may be used as a positive electrode material for a lithium secondary battery.

BACKGROUND ART

There is a demand for manganese compounds that can serve as starting materials for obtaining lithium manganese composite oxides suitable as positive electrode materials for lithium secondary batteries. Such manganese compounds include manganese oxides, such as manganese dioxide obtained by electrolytic methods (electrolytic manganese dioxide, $MnO_2$), and dimanganese trioxide ($Mn_2O_3$), trimanganese tetraoxide ($Mn_3O_4$) and manganese oxyhydroxide (MnOOH) obtained by chemical synthesis methods.

Of these manganese oxides, trimanganese tetraoxide and dimanganese trioxide have high theoretical density as calculated from their crystal structures. Therefore, trimanganese tetraoxide and dimanganese trioxide have high packing properties, and have become a subject of focus as manganese starting materials for obtaining lithium manganese composite oxide with excellent cell performance.

In the case of trimanganese tetraoxide, there has been reported a method of obtaining trimanganese tetraoxide by generating manganese hydroxide from a manganese solution under an ammonia-containing alkaline atmosphere, and then oxidizing the solution (see PTL 1, for example). Another method that has been reported is one wherein manganese ion, ammonia and hydrogen peroxide are combined in an aqueous alkali solution to obtain trimanganese tetraoxide (see PTL 2, for example).

Dimanganese trioxide obtained by heating electrolytic manganese dioxide at a high temperature is most commonly used in the industry, as a starting material for lithium manganese composite oxide (see PTLs 3-6). There has also been reported the use of dimanganese trioxide obtained by high-temperature heating of manganese carbonate while adjusting the oxygen concentration during firing (PTLs 7-8), and dimanganese trioxide obtained by firing trimanganese tetraoxide with a BET specific surface area of 10 $m^2$/g to 80 $m^2$/g (PTL 9), as starting materials for lithium manganese composite oxides.

CITATION LIST

Patent Literature

[PTL 1] Japanese Unexamined Patent Application Publication No. 2001-114521
[PTL 2] Japanese Patent Publication No. 3505132
[PTL 3] Japanese Unexamined Patent Application Publication HEI No. 10-275613
[PTL 4] Japanese Unexamined Patent Application Publication No. 2003-119029
[PTL 5] Japanese Unexamined Patent Application Publication No. 2003-081638
[PTL 6] Japanese Unexamined Patent Application Publication No. 2008-156162
[PTL 7] Japanese Unexamined Patent Application Publication No. 2000-281351
[PTL 8] Japanese Unexamined Patent Application Publication No. 2008-066028
[PTL 9] Japanese Unexamined Patent Application Publication No. 2001-002422

SUMMARY OF INVENTION

Technical Problem

Conventional manganese oxide has had insufficient reactivity with lithium compounds, or else low packing density. As a result, lithium manganese composite oxides obtained using such starting materials have exhibited inadequate cell performance, i.e. inadequate rate capability and cycle performance. There is consequently a demand for a manganese starting material that can yield lithium manganese composite oxides with excellent cell performance.

It is one object of the invention to provide a manganese oxide that can yield a lithium manganese composite oxide that is superior as a positive electrode material for a lithium secondary battery, the manganese oxide having a high packing property and also having a pore structure that is highly reactive with lithium compounds. It is another object of the invention to provide a method for producing such manganese oxide, and a method for producing lithium manganese composite oxide using the manganese oxide.

Solution to Problem

The present inventors have conducted much diligent research on manganese oxide to be used as a starting material for lithium manganese composite oxide as a positive electrode material for a lithium secondary battery. As a result, it was found that manganese oxide having not only packing density but also a controlled pore structure, or in other words, manganese oxide having both high packing density and a specified pore distribution, is particularly suited as a starting material for lithium manganese composite oxide.

In addition, it was found that manganese oxide obtained by direct oxidation from a water-soluble manganese salt solution, without passing through a manganese hydroxide crystal stage, or under conditions with sufficiently controlled manganese hydroxide crystal growth, has high tap density and a highly homogeneous pore distribution.

Specifically, according to one aspect, the invention provides manganese oxide having a pore volume fraction of no greater than 20% for pores with diameters of 10 μm or greater, as measured by mercury porosimetry, and a tap density of 1.6 $g/cm^3$ or greater. Because such manganese oxide has a smaller proportion of large pores than in the prior art, the progress of reaction with lithium compounds does not vary, and therefore a reaction product with a homogeneous composition and a fine structure is obtained. In addition, the satisfactory packing property allows a high-density positive electrode to be obtained. It is thus possible to obtain a lithium manganese composite oxide with excellent cell performance.

The manganese oxide of the invention preferably has a pore area ratio of no greater than 15%, for pores with diameters of up to 0.1 μm, as measured by mercury porosimetry. This reduces variation in the pore sizes, and can yield a reaction product with excellent homogeneity of the fine structure. Using such a reaction product can further improve the cell performance.

The mode diameter of the manganese oxide of the invention is preferably 10 μm or greater. The Na content is preferably no greater than 300 ppm by weight. Also, the BET specific surface area is preferably no greater than 5 m²/g.

The manganese oxide of the invention preferably contains either or both trimanganese tetraoxide and dimanganese trioxide. This will allow lithium manganese composite oxide to be obtained having even more excellent cell performance.

According to another aspect, the invention provides a method for producing manganese oxide in which the aforementioned manganese oxide is obtained from a water-soluble manganese salt solution, the method for producing manganese oxide having a crystallization step in which manganese oxide is obtained by crystallizing trimanganese tetraoxide from a water-soluble manganese salt solution, without crystallizing manganese hydroxide as a hexagonal plate-like form.

According to this production method, it is possible to easily produce manganese oxide having a smaller proportion of large pores than in the prior art, and an excellent packing property. Because the manganese oxide does not exhibit variation in the progress of reaction with lithium compounds, it is possible to obtain a reaction product with a homogeneous composition and a fine structure. It is therefore possible to produce a lithium manganese composite oxide with excellent cell performance.

In the method for producing manganese oxide according to the invention, preferably in the crystallization step, trimanganese tetraoxide is crystallized from a water-soluble manganese salt solution under conditions that satisfy either or both a pH of 6 to 9 and an oxidation-reduction potential of 0 to 300 mV. Also, more preferably, trimanganese tetraoxide is crystallized while maintaining constant either or both the pH and oxidation-reduction potential.

Here, "maintain a constant pH" means that the pH is kept within a range of ±0.5 from the center value. The pH is more preferably kept within a range of ±0.3 from the center value, and even more preferably it is kept within a range of ±0.1 from the center value. Also, "maintain a constant oxidation-reduction potential" means that the oxidation-reduction potential is kept within a range of ±50 mV from the center value. The oxidation-reduction potential is preferably kept within a range of ±30 mV from the center value, and even more preferably it is kept within a range of ±20 mV from the center value.

In the crystallization step, the trimanganese tetraoxide is preferably crystallized with the temperature of the water-soluble manganese salt solution at 40° C. or higher. Also in the crystallization step, it is preferred to blow an oxygen-containing gas into the water-soluble manganese salt solution.

The method for producing manganese oxide according to the invention may also have a firing step in which the trimanganese tetraoxide is fired after the crystallization step. In the firing step, preferably the trimanganese tetraoxide is fired at 530° C. to 940° C. This can yield dimanganese trioxide with a more excellent packing property, and a sufficiently uniform composition and a fine structure.

According to yet another aspect, the invention provides a method for producing lithium manganese composite oxide, which has a mixing step in which the manganese oxide and lithium compound are mixed, and a heating step in which heat treatment is carried out.

Since manganese oxide having the features described above is used in this method for producing lithium manganese composite oxide, it is possible to easily obtain lithium manganese composite oxide with excellent cell performance, when it is used as a positive electrode material for a lithium secondary battery.

In the mixing step, preferably a heterogeneous metal compound containing a metal element different from manganese or lithium as a constituent element, is mixed with the manganese oxide and lithium compound.

Advantageous Effects of Invention

The manganese oxide of the invention has high packing density (tap density) and excellent reactivity with lithium compounds. Consequently, the manganese oxide of the invention can be suitably used as a starting material (precursor) for production of lithium manganese composite oxide with excellent lithium secondary battery performances, and especially cycle performance and rate capability.

DESCRIPTION OF EMBODIMENTS

Figure 1:
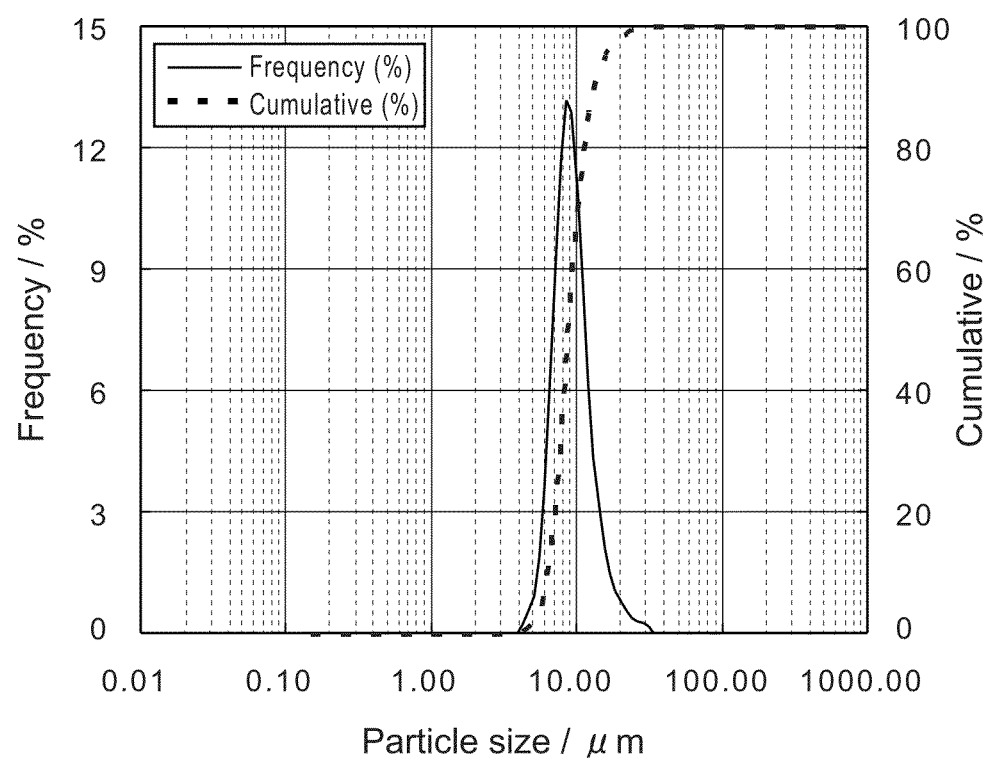
FIG. 1 is a graph showing the particle size distribution of the manganese oxide obtained in Example 1-1.

Preferred embodiments of the invention will now be explained.

[Manganese Oxide]

The manganese oxide of this embodiment has a pore volume fraction of no greater than 20% for pores with diameters of 10 μm or greater, as measured by mercury porosimetry, and a tap density of 1.6 g/cm$^3$ or greater. The tap density of the manganese oxide is preferably 1.8 g/cm$^3$ or greater, more preferably 1.9 g/cm$^3$ or greater and even more preferably 2.0 g/cm$^3$ or greater. If the tap density is less than 1.6 g/cm$^3$, the packing property of the manganese oxide will be low. The packing property of lithium manganese composite oxide obtained from such a manganese oxide will therefore be reduced.

Manganese oxide tends to have a higher packing property with higher tap density. However, the tap density of manganese oxide is preferably no greater than 2.6 g/cm$^3$, more preferably no greater than 2.5 g/cm$^3$, even more preferably no greater than 2.4 g/cm$^3$, yet more preferably less than 2.4 g/cm$^3$, and most preferably no greater than 2.2 g/cm$^3$. In this range, it will be possible to obtain high packing density while maintaining high reactivity with lithium.

The "tap density", as used herein, is the bulk density of powder obtained by tapping the container under constant conditions. It therefore differs from the press density, which is the density of powder in a pressure-molded state under constant pressure in a container filled with the powder. The tap density can be measured by the method indicated in the examples below.

The manganese oxide of this embodiment has a pore volume fraction of no greater than 20% for pores with diameters of 10 μm or greater, as measured by mercury porosimetry. With a pore volume fraction of greater than 20% for pores with diameters of 10 μm or greater, as measured by mercury porosimetry, the reactivity with lithium compounds is non-uniform. Consequently, lithium manganese composite oxide obtained using manganese oxide with such a high pore volume fraction as the starting material, results in reduced secondary battery performances, and especially cycle performance and rate capability.

The pore volume fraction of pores with diameters of 10 μm or greater, as measured by mercury porosimetry, is preferably 15%, and more preferably no greater than 10%. A lower pore volume fraction of pores with diameters of 10 μm or greater tends to result in more uniform reactivity with lithium compounds. Thus, a lithium manganese composite oxide obtained using such a manganese oxide as the starting material also has higher homogeneity in terms of composition, structure and size. On the other hand, there is no particular restriction on the lower limit for the pore volume fraction of pores with diameters of 10 μm or greater.

The term "pore volume fraction", as used herein, is the fraction of the total volume of pores having diameters within a prescribed range (for example, pores with diameters of 10 μm or greater), with respect to the total volume of all of the pores in the manganese oxide. The diameter distribution and volume of pores can be measured with a commercially available porosimeter using mercury porosimetry.

The manganese oxide of this embodiment preferably has a pore area ratio of no greater than 15%, for pores with diameters of up to 0.1 μm, as measured by mercury porosimetry. If numerous fine pores with diameters of 0.1 μm and smaller are present, the reactivity between the manganese oxide and lithium compound will tend to be non-uniform. The pore area ratio of pores with diameters of up to 0.1 μm as measured by mercury porosimetry is preferably no greater than 15%, more preferably no greater than 10% and even more preferably no greater than 5%.

Electrolytic manganese dioxide obtained under ordinary conditions tends to have a high pore area ratio of pores with diameters of up to 0.1 μm, as measured by mercury porosimetry. With electrolytic manganese dioxide, for example, the pore area ratio of pores with diameters of up to 0.1 μm, as measured by mercury porosimetry, can exceed 80%.

The manganese oxide of this embodiment preferably has a pore area ratio of no greater than 5%, for pores with diameters of up to 0.05 μm, as measured by mercury porosimetry. Similar to pores with diameters of 0.1 μm or greater, if numerous fine pores with diameters of 0.05 μm and smaller are present, reactivity with lithium compounds will tend to be non-uniform. The pore area ratio of pores with diameters of up to 0.05 μm as measured by mercury porosimetry is preferably no greater than 5% and more preferably no greater than 1%.

The term "pore area ratio", as used herein, is the fraction of the total area of pores having diameters within a prescribed range (for example, pores with diameters of up to 0.1 μm), with respect to the total area of all of the pores in the manganese oxide. The diameter distribution and volume of pores can be measured with a commercially available porosimeter by mercury porosimetry, as mentioned above.

The manganese oxide of this embodiment preferably has a sharp particle size distribution, from the viewpoint of obtaining more uniform reactivity with lithium compounds.

The mean particle size of the manganese oxide of this embodiment is not particularly restricted. For example, the mean particle size is preferably 1-50 μm and more preferably 5-30 μm.

The mode diameter of the manganese oxide of this embodiment is preferably greater than 5 μm, more preferably greater than 10 μm, even more preferably 13 μm or greater, especially preferably 15 μm or greater, and most preferably 20 μm or greater. If the mode diameter is greater than 10 μm, its use as a starting material to obtain a lithium manganese composite oxide will tend to result in high packing properties and especially tap density of the obtained lithium manganese composite oxide.

There is no particular restriction on the upper limit for the mode diameter of the manganese oxide. For example, the upper limit is preferably no greater than 30 μm and more preferably no greater than 25 μm. If the mode diameter is no greater than 30 μm, and the manganese oxide is used as a starting material for a lithium manganese composite oxide, the cell performance of the lithium manganese composite oxide, and especially the charge-discharge cycle performance and rate capability, will tend to be even higher.

The mode diameter is the particle size of the particles with the highest volume fraction, and it can be used as an index of the mean particle size.

The manganese oxide of this embodiment, in addition to having a mode diameter within the aforementioned range, also preferably has pores with a uniform diameter in the particle size range of no greater than the mode diameter (pores with a low distribution). For example, when the mode diameter is 10 to 50 μm, preferably the major pore diameters are distributed in a range of 1 to 10 μm, and in a uniform manner. The distribution of the pore diameters is also preferably uniform.

The BET specific surface area of the manganese oxide of this embodiment is preferably no greater than 5 m$^2$/g, more preferably no greater than 2 m$^2$/g, even more preferably no greater than 1 m$^2$/g, especially preferably no greater than 0.8 m$^2$/g and most preferably no greater than 0.6 m$^2$/g. If the BET specific surface area is no greater than 5 m$^2$/g, reaction with lithium compounds will occur in a more uniform manner. A smaller BET specific surface area will tend to result in more uniform reaction with lithium compounds. The BET specific surface area is preferably 0.1 m$^2$/g or greater, more preferably 0.2 m$^2$/g or greater and even more preferably 0.3 m$^2$/g or greater. If the BET specific surface area is within this range, reaction between the manganese oxide and lithium compound will tend to be even more uniform.

The manganese oxide of this embodiment preferably has low metal impurities, and especially alkali metals such as Na, alkaline earth metals such as Ca and Mg and transition metals such as Fe.

The Na content of the manganese oxide of this embodiment is preferably no greater than 300 ppm by weight, more preferably no greater than 250 ppm by weight, even more preferably no greater than 200 ppm by weight, especially more preferably no greater than 150 ppm by weight and most preferably 100 ppm by weight. If the Na content of the manganese oxide is no greater than 300 ppm by weight, the Na content of the lithium manganese composite oxide obtained using it as starting material will also be low. Thus, the cell performance of a lithium secondary battery that employs it as a positive electrode active material, and especially the charge-discharge cycle performance, will tend to be higher. From this viewpoint, the Na content is preferably as low as possible. However, even if the manganese oxide contains Na at 20 ppm by weight or greater, it will have virtually no effect when used as a starting material for a lithium manganese composite oxide.

From the viewpoint of increasing the charge-discharge cycle performance, the manganese oxide of this embodiment has a Ca content of preferably no greater than 300 ppm by weight, more preferably no greater than 100 ppm by weight, even more preferably no greater than 60 ppm by weight, and most preferably no greater than 30 ppm by weight. The Ca content is preferably as low as possible. However, even if the manganese oxide contains Ca at 5 ppm by weight or greater, it will have virtually no effect when used as a starting material for a lithium manganese composite oxide.

From the viewpoint of increasing the charge-discharge cycle performance, the manganese oxide of this embodiment has a Mg content of preferably no greater than 200 ppm by weight, more preferably no greater than 100 ppm by weight, even more preferably no greater than 50 ppm by weight, and most preferably no greater than 30 ppm by weight. The Mg content is preferably as low as possible. However, even if the manganese oxide contains Mg at 1 ppm by weight or greater, it will have virtually no effect when used as a starting material for a lithium manganese composite oxide.

From the viewpoint of a higher charge-discharge cycle performance, the manganese oxide of this embodiment preferably has a low metal impurity content, and especially a low iron (Fe) content. Thus, the manganese oxide of this embodiment preferably has an iron content of no greater than 15 ppm by weight, more preferably no greater than 10 ppm by weight and even more preferably no greater than 5 ppm by weight.

From the viewpoint of a higher charge-discharge cycle performance, the manganese oxide of this embodiment preferably has a low metal salt impurity content, and especially a low sulfate group ($SO_4^{2-}$) content. The sulfate group content of the manganese oxide is preferably no greater than 1 wt %, more preferably no greater than 0.7 wt % and even more preferably no greater than 0.5 wt %.

As mentioned above, the reason for the excellent performance of the manganese oxide of this embodiment as a starting material for lithium manganese composite oxide may be not only the high packing property, but also the uniformity of reactivity with lithium compounds, because of the low number of large pores with diameters of 10 μm or greater. Also, if the number of fine pores with diameters of 0.1 μm and smaller in the manganese oxide is low, reactivity between the manganese oxide and lithium compounds will tend to be even more uniform.

The manganese oxide of this embodiment preferably contains either or both trimanganese tetraoxide and dimanganese trioxide. Trimanganese tetraoxide and dimanganese trioxide have high theoretical density. Therefore, by including either or both of these manganese oxides, the powder will tend to have high packing density.

The crystal structure of trimanganese tetraoxide is a spinel structure. This crystal structure exhibits the same X-ray diffraction pattern as the X-ray diffraction pattern of JCPDS pattern No. 24-734.

The chemical formula for trimanganese tetraoxide is $Mn_3O_4$. When trimanganese tetraoxide is represented by $MnO_x$, therefore, the ratio x of manganese element and oxygen element is 1.33-1.34. However, when the manganese oxide of this embodiment is trimanganese tetraoxide, the ratio x of manganese and oxygen in the trimanganese tetraoxide is not limited to 1.33-1.34. The trimanganese tetraoxide of this embodiment has the aforementioned crystal structure and it may be manganese oxide where x=1.20-1.40 when represented as $MnO_x$. The value of x is preferably 1.25-1.40 and more preferably 1.30-1.40.

The crystal structure of dimanganese trioxide, on the other hand, is preferably tetragonal. This crystal structure exhibits the same X-ray diffraction pattern as the X-ray diffraction pattern of JCPDS pattern No. 41-1442 (α-dimanganese trioxide).

The general chemical formula for dimanganese trioxide is $Mn_2O_3$. When dimanganese trioxide is represented by $MnO_x$, therefore, the ratio x of manganese and oxygen is 1.5. However, when the manganese oxide of this embodiment is dimanganese trioxide, the ratio x of manganese and oxygen in the dimanganese trioxide is not limited to 1.5. The dimanganese trioxide of this embodiment has the aforementioned crystal structure and it may be manganese oxide where x=1.45-1.55 when represented as $MnO_x$. The value of x is preferably 1.48-1.53.

[Method for Producing Manganese Oxide]

A method for producing manganese oxide according to this embodiment will now be described. Conventional manganese oxide has not had a sufficiently controlled packing property or pore structure. That is, conventional manganese oxide does not have a high packing property similar to the manganese oxide of this embodiment, and its pore distribution has not been controlled. Such control of the pore structure has first become possible by controlling the manganese oxide crystal formation.

The method for producing manganese oxide according to this embodiment has a crystallization step, in which trimanganese tetraoxide is crystallized from a water-soluble manganese salt solution without being converted to manganese hydroxide. In the crystallization step it is possible to produce trimanganese tetraoxide.

In this step, that is, in the step of crystallizing trimanganese tetraoxide from a water-soluble manganese salt solution without conversion to manganese hydroxide, it is possible to produce manganese oxide from a water-soluble manganese salt solution in the alkaline range, without depositing manganese hydroxide crystals. Specifically, the method for producing manganese oxide according to this embodiment does not have a step of depositing manganese hydroxide crystals from the water-soluble manganese salt solution in the alkaline range and oxidizing the manganese hydroxide with an oxidizing agent. In other words, the production method of this embodiment allows production of manganese oxide without such a step.

In the crystallization step of the method for producing manganese oxide according to this embodiment, the pH of the water-soluble manganese salt solution is adjusted to a pH that inhibits generation of manganese hydroxide. This can directly oxidize the manganese ion in the water-soluble solution, allowing crystallization of trimanganese tetraoxide.

The method for producing manganese oxide according to this embodiment includes a mode in which absolutely no manganese hydroxide crystal phase is produced in the crystallization step, and a mode in which manganese hydroxide microcrystals are deposited for a short period of time, and then converted to trimanganese tetraoxide before growing into hexagonal plate-like crystals. In other words, the method for producing manganese oxide according to this embodiment does not produce hexagonal plate-like manganese hydroxide crystals in the crystallization step. Whether or not such hexagonal plate-like manganese hydroxide crystals have been generated can be judged by observing the particle shapes of the obtained manganese oxide.

A conventional method for producing trimanganese tetraoxide first produces manganese hydroxide from a water-soluble manganese salt solution, and then performs oxidizing treatment of the manganese hydroxide to generate trimanganese tetraoxide. This production method does not yield trimanganese tetraoxide with both a high packing property and a pore distribution as specified in the present application. The reason for this is the low theoretical density of laminar manganese oxide derived from manganese hydroxide.

The theoretical densities of manganese compounds are 3.3 g/cm$^3$ for manganese hydroxide (Mn(OH)$_2$), 3.8 g/cm$^3$ for manganese oxyhydroxide (β-MnOOH) with a laminar structure obtained by oxidation of manganese hydroxide, and 3.7 g/cm$^3$ for birnessite (Mn$_7$O$_{13}$.5H$_2$O), which is a manganese compound with a laminar structure formed by oxidation of manganese oxyhydroxide.

The theoretical densities of these manganese compounds are therefore lower than 4.8 g/cm$^3$, the theoretical density of trimanganese tetraoxide. Consequently, trimanganese tetraoxide obtained via these manganese compounds is affected by the theoretical density of the laminar manganese compound precursor, and presumably thus has lowered density.

In the production method of the invention, the pH of the water-soluble manganese salt solution or slurry used for crystallization of trimanganese tetraoxide is preferably a pH that inhibits generation of manganese hydroxide. Therefore, the water-soluble manganese salt solution more preferably has a weakly acidic to weakly alkaline pH.

Specifically, the pH is preferably between 6 and 9, and more preferably the pH is between 6.5 and 8.5. The center value of the pH is more preferably within this range. By adjusting the pH of the water-soluble manganese salt solution or slurry within this range, generation of manganese hydroxide will be inhibited.

The pH of the water-soluble manganese salt solution or slurry is preferably within the aforementioned range during the crystallization step. Variation in the pH of the water-soluble manganese salt solution or slurry during the crystallization step is preferably minimal. Specifically, the pH is kept preferably within ±0.5 of the center value, more preferably within ±0.3 of the center value, and even more preferably within ±0.1 of the center value.

In the crystallization step of the production method of this embodiment, the oxidation-reduction potential of the water-soluble manganese salt solution is preferably 0 to 300 mV and more preferably 30 to 150 mV. By adjusting the oxidation-reduction potential of the water-soluble manganese salt solution within this range, generation of manganese hydroxide will be inhibited. In particular, limiting the oxidation-reduction potential of the water-soluble manganese salt solution to no greater than 300 mV will inhibit by-production of γ-MnOOH (theoretical density: 4.3 g/cm$^3$) that has a needle-like particle form, and will tend to increase the packing property of the obtained trimanganese tetraoxide.

The oxidation-reduction potential of the water-soluble manganese salt solution or slurry is preferably within the aforementioned range during the crystallization step. Variation in the oxidation-reduction potential of the water-soluble manganese salt solution or slurry during the crystallization step is preferably minimal. Specifically, the oxidation-reduction potential is kept preferably within ±50 mV of the center value, more preferably within ±30 mV of the center value, and even more preferably within ±20 mV of the center value.

By keeping the pH, the oxidation-reduction potential or both within the aforementioned ranges while also limiting the variation range of the pH, the oxidation-reduction potential or both in the crystallization step, it is possible to obtain trimanganese tetraoxide with a sufficiently uniform particle size and pore distribution. The trimanganese tetraoxide obtained in this manner has a high particle packing property and sufficiently uniform reactivity with lithium compounds.

The water-soluble manganese salt solution to be used for the production method of this embodiment may be a water-soluble solution of manganese sulfate, manganese chloride, manganese nitrate and manganese acetate. There may also be suitably used manganese metal, manganese oxide or the like dissolved in a water-soluble acid solution of sulfuric acid, hydrochloric acid, nitric acid or acetic acid.

There is no limit to the concentration of the water-soluble manganese salt solution, but it is preferably at least 1 mol/L. With a water-soluble manganese salt solution concentration of at least 1 mol/L, it will be possible to efficiently obtain trimanganese tetraoxide.

When the pH of the water-soluble manganese salt solution is to be adjusted, it is preferred to use an alkaline water-soluble solution ("aqueous alkali solution"). There is no restriction on the type of aqueous alkali solution, and examples include aqueous sodium hydroxide and potassium hydroxide solutions.

There is also no restriction on the concentration of the aqueous alkali solution. From the viewpoint of reaction efficiency, however, the alkali metal or alkaline earth metal concentration of the aqueous alkali solution is preferably at least 1 mol/L.

In the crystallization step of the production method of this embodiment, the temperature of the water-soluble manganese salt solution is preferably 40° C. or higher, more preferably 60° C. to 95° C. and even more preferably 70° C. to 80° C. By limiting the temperature of the water-soluble manganese salt solution within this range for crystallization, crystallization of trimanganese tetraoxide will proceed and the particle size of the trimanganese tetraoxide will tend toward uniformity.

In the crystallization step of the production method of this embodiment, crystallization is preferably carried out using an oxidizing agent. There is no particular restriction on the type of oxidizing agent, and examples include oxygen-containing gases (including air), and hydrogen peroxide. An oxygen-containing gas is preferably used as the oxidizing agent. More preferably, an oxygen-containing gas is blown into the water-soluble manganese salt solution for crystallization. This will facilitate more uniform crystallization of the trimanganese tetraoxide.

The water-soluble manganese salt solution and aqueous alkali solution are preferably mixed in the crystallization step of the production method of this embodiment. This will allow continuous direction crystallization of trimanganese tetraoxide from the water-soluble manganese salt solution. In the conventional production method, manganese hydroxide has been first produced under a nitrogen atmosphere, and then trimanganese tetraoxide has been generated in an oxidizing atmosphere of oxygen, air or the like. In such a production method, it is necessary to change the reaction atmosphere to obtain trimanganese tetraoxide. Therefore, it has not been possible to continuously produce trimanganese tetraoxide. In the production method of this embodiment, however, a method of direct crystallization of trimanganese tetraoxide from water-soluble manganese salt solution is employed, and therefore no change in the reaction atmosphere is necessary during the process. Consequently, trimanganese tetraoxide can be produced in a continuous manner by mixing the water-soluble manganese salt solution and aqueous alkali solution.

The method of mixing the water-soluble manganese salt solution and the aqueous alkali solution is not particularly restricted, so long as both can be uniformly mixed. The mixing method may be a method of adding and mixing the aqueous alkali solution with the water-soluble manganese salt solution, or a method of adding the water-soluble manganese salt solution and the aqueous alkali solution to purified water and mixing them. From the viewpoint of sufficient and uniform reaction between the water-soluble manganese salt solution and the aqueous alkali solution, the mixing method is preferably a method of adding the water-soluble manganese salt solution and aqueous alkali solution to purified water and mixing them. In this mixing method, the flow rate of the added water-soluble manganese salt solution and aqueous alkali solution may be controlled to allow easy control of the crystallization rate of the trimanganese tetraoxide. A slower crystallization rate will increase the particle size of the trimanganese tetraoxide, tending to increase the tap density.

In the production method of this embodiment, the average time of residence of the crystallized trimanganese tetraoxide particles in the slurry after the crystallization reaction (hereunder referred to as "reaction slurry") (the time will be referred to as the "average residence time"), is preferably 1 hour or greater and more preferably 3 hours or greater. If the average residence time is at least 1 hour, trimanganese tetraoxide particle growth will tend to proceed, and the tap density of the obtained trimanganese tetraoxide will tend to increase. A long average residence time will tend to promote particle growth of the trimanganese tetraoxide particles. In consideration of particle growth efficiency and production efficiency, the average residence time is preferably no greater than 30 hours and more preferably no greater than 20 hours.

In the crystallization step of the production method of this embodiment, crystallization is preferably carried out without the presence of a complex agent. A complex agent, for the purpose of the present specification, is a compound such as ammonia, ammonium salt, hydrazine, EDTA, or a compound having similar complexing power.

These complex agents affect the crystallization behavior of trimanganese tetraoxide. Thus, trimanganese tetraoxide obtained in the presence of a complex agent will tend to have a different pore distribution than trimanganese tetraoxide obtained without using a complex agent, even if they have the same packing property (tap density). Trimanganese tetraoxide obtained in the presence of a complex agent also tends to have a different pore distribution from the trimanganese tetraoxide of the invention. Even if the pore distribution is the same as that of the trimanganese tetraoxide of the invention, the packing property will tend to be lower.

The method for producing manganese oxide according to this embodiment may include a firing step in which dimanganese trioxide is obtained by firing trimanganese tetraoxide having a controlled pore size as explained above. Specifically, it is possible to obtain dimanganese trioxide by firing trimanganese tetraoxide with a pore volume fraction of no greater than 20% for pores with diameters of 10 µm or greater as measured by mercury porosimetry, and a tap density of 1.6 g/cm$^3$ or greater.

The tap density of the trimanganese tetraoxide in the manganese oxide of this embodiment is 1.6 g/cm$^3$ or greater, preferably 1.8 g/cm$^3$ or greater and more preferably 1.9 g/cm$^3$ or greater. Although a higher tap density is preferred, it is preferably no greater than 2.5 g/cm$^3$, more preferably no greater than 2.4 g/cm$^3$, even more preferably less than 2.4 g/cm$^3$, and most preferably no greater than 2.2 g/cm$^3$. Such trimanganese tetraoxide has a high packing property.

The trimanganese tetraoxide has a pore volume fraction of pores with diameters of 10 µm or greater, as measured by mercury porosimetry, of no greater than 20%, preferably no greater than 15% and more preferably no greater than 10%.

The trimanganese tetraoxide has a pore area ratio of pores with diameters of up to 0.1 µm, as measured by mercury porosimetry, of preferably no greater than 15%, more preferably no greater than 10%, even more preferably no greater than 5% and most preferably no greater than 3%.

The trimanganese tetraoxide of this embodiment preferably has the mean particle size described above, and also preferably has uniformity of pores with sizes of no greater than the particle size mode diameter of the trimanganese tetraoxide (a low distribution). For example, when the mode diameter is 10 to 50 µm, preferably the major pore diameters are distributed in a range of 1 to 10 µm. The diameters of the pores are preferably uniform.

The crystal structure of the trimanganese tetraoxide is preferably a spinel structure. This is a structure with the same X-ray diffraction pattern as the X-ray diffraction pattern of JCPDS pattern No. 24-734.

So long as the trimanganese tetraoxide of this embodiment has the aforementioned crystal structure, it may be manganese oxide where x=1.20-1.40 when represented as $MnO_x$. The trimanganese tetraoxide preferably is one wherein x=1.25-1.40, and more preferably x=1.30-1.40.

The BET specific surface area of the trimanganese tetraoxide is preferably no greater than 5 m$^2$/g and more preferably no greater than 2 m$^2$/g. The lower limit for the BET specific surface area is preferably 0.1 m$^2$/g, more preferably 0.5 m$^2$/g and even more preferably 1 m$^2$/g.

The method for producing such trimanganese tetraoxide may be, for example, a method in which trimanganese tetraoxide is crystallized from a water-soluble manganese salt solution without conversion to manganese hydroxide. That is, the production method may be one in which trimanganese tetraoxide is produced from a water-soluble manganese salt solution without conversion to manganese hydroxide.

In this production method, trimanganese tetraoxide is produced from the water-soluble manganese salt solution essentially without conversion to manganese hydroxide. That is, in this production method, trimanganese tetraoxide is produced essentially without a step of depositing manganese hydroxide crystals from the water-soluble manganese salt solution and oxidizing the manganese hydroxide with an oxidizing agent. In this production method, the pH of the water-soluble manganese salt solution is a pH which inhibits generation of manganese hydroxide, and manganese ion in the water-soluble solution is directly oxidized to generate trimanganese tetraoxide by crystallization.

In this production method, trimanganese tetraoxide is produced essentially without conversion to manganese hydroxide. This includes a mode in which absolutely no manganese hydroxide crystal phase is produced, and a mode in which manganese hydroxide microcrystals are deposited for a short period of time, and then converted to trimanganese tetraoxide before growing into hexagonal plate-like crystals.

The manganese oxide of this embodiment may contain dimanganese trioxide. The dimanganese trioxide can be obtained by firing trimanganese tetraoxide having the physical properties described above.

The firing temperature of the trimanganese tetraoxide is preferably 530° C. to 940° C., more preferably 600° C. to 900° C. and even more preferably 600° C. to 800° C. If the firing temperature is 530° C. or higher, it will be easy to obtain a monophase of dimanganese trioxide. If the firing temperature is no higher than 940° C., it will be possible to inhibit aggregation between particles, and the packing property, and especially tap density, of the obtained dimanganese trioxide will tend to be increased.

The firing time will differ depending on the firing temperature, and may be 1 to 10 hours and preferably 3 to 8 hours, for example. The firing atmosphere used may be air, oxygen or the like, with air being preferred for convenience.

The manganese oxide of this embodiment may be suitably used as a starting material for lithium manganese composite oxide. The manganese oxide may be mixed with a lithium compound and heat treated, to obtain a lithium manganese composite oxide with a high packing property and excellent uniformity of composition and fine structure.

(Method for Producing Lithium Manganese Composite Oxide)

The method for producing lithium manganese composite oxide according to this embodiment, has a mixing step in which manganese oxide is mixed with either or both lithium and a lithium compound, and a heating step in which heat treatment is carried out.

When the manganese oxide is mixed with the lithium compound in the mixing step, a different metal compound may also be added to improve the lithium secondary positive electrode material property of the lithium manganese composite oxide. The different metal compound has a metal element different from manganese and lithium, as a constituent element. For example, it is a compound containing one or more metal elements selected from the group consisting of Al, Mg, Ni, Co, Cr, Ti and Zr as constituent elements. A similar effect is obtained even when such different metal compounds are added.

The crystal structure of the lithium manganese composite oxide is preferably a spinel structure. A lithium manganese composite oxide is represented by the following chemical formula (1).

$$Li_{1+x}M_yMn_{2-x-y}O_4 \quad (1)$$

In formula (1), M represents at least one metal element selected from among elements other than Li, Mn and O, and x and y satisfy the following inequalities (2) and (3).

$$0 \leq x \leq 0.33 \quad (2)$$

$$0 \leq y \leq 1.0 \quad (3)$$

The lithium compound used may be of any type. Examples of lithium compounds include lithium hydroxide, lithium oxide, lithium carbonate, lithium iodide, lithium nitrate, lithium oxalate and alkyllithiums. Examples of preferred lithium compounds are lithium hydroxide, lithium oxide and lithium carbonate.

Preferred embodiments of the invention were described above, but the invention is not limited to these embodiments.

EXAMPLES

The present invention will now be described with concrete examples, with the understanding that the invention is not limited by these examples. The evaluations made in the examples and comparative examples were as follows.

[Evaluation Method for Manganese Oxide]

(Pore Distribution Measurement)

The sample pore distribution was determined by mercury porosimetry. The pore distribution measurement was carried out using a Poresizer 9510 (trade name) by Micromeritics, Japan, in a pressure range from atmospheric pressure to 414 MPa. The range of pore diameters that can be measured in this pressure range is 0.003 to 400 μm.

The proportion of the volume of pores with diameters of up to 10 μm with respect to the cumulative pore volume obtained by pore distribution measurement was determined. This proportion was recorded as the pore volume fraction for diameters of up to 10 μm. The pore volume fraction for diameters of up to 2 μm was determined in the same manner. The area of pores with diameters of up to 0.1 μm with respect to the cumulative pore area obtained by pore distribution measurement was determined. This proportion was recorded as the pore area ratio for diameters of up to 0.1 μm. The pore area ratio for diameters of up to 0.05 μm was determined in the same manner. The sample was allowed to stand at 100° C. for drying, as pretreatment for the pore distribution measurement.

(Tap Density)

A 10 mL graduated cylinder was filled with 5 g of sample, and the density after tapping 200 times was recorded as the tap density.

(Mean Particle Size)

The mode diameter was measured as the mean particle size of the sample. A MICROTRAC HRA 9320-X100 (trade name of NIKKISO CO., LTD.) was used for the mode diameter measurement. The sample before measurement was dispersed in purified water to prepare a measuring solution, and ammonia water was added thereto to adjust the pH to 8.5. The measuring solution was then subjected to ultrasonic dispersion for 3 minutes, and the mode diameter was measured.

(BET Specific Surface Area)

The BET specific surface area of the sample was measured by nitrogen adsorption in the single point BET method. The sample used for measurement of the BET specific surface area was subjected to deaerating treatment by heating at 150° C. for 40 minutes, before measurement of the BET specific surface area.

(X-Ray Diffraction Measurement)

The crystal phase of the sample was measured by X-ray diffraction. The measurement was conducted with a common X-ray diffraction apparatus. CuKα-rays (λ=1.5405 angstrom) were used as the line source. The measuring mode was step scan, and the scan conditions were 0.04° per second, a measuring time of 3 seconds, and a measurement range from 5° to 80° as 2θ.

(Chemical Composition Analysis)

The sample was dissolved in a mixed aqueous solution of hydrochloric acid and hydrogen peroxide, and the Na, Mg, Ca, Li, $SO_4^{2-}$ and Mn contents were measured by ICP.

[Production of Manganese Oxide]

Example 1-1

In a reaction tank with an internal volume of 1 L there was placed 500 mL of purified water. The purified water was heated while stirring and refluxing at 80° C. The oxidation-reduction potential of the purified water heated to 80° C. was 150 mV. The starting solution specified below was mixed with the purified water while blowing in oxygen to an oxidation-reduction potential of 100±20 mV. This crystallized the trimanganese tetraoxide, to obtain a reaction slurry with trimanganese tetraoxide dispersed in the solvent.

The starting solutions used were a water-soluble manganese salt solution, and an aqueous alkali solution for pH adjustment. The water-soluble manganese salt solution used was a 2 mol/L aqueous manganese sulfate solution, and the aqueous alkali solution used was a 2 mol/L aqueous sodium hydroxide solution.

The aqueous manganese sulfate solution was continuously added to the purified water in the reaction tank at a constant flow rate. Separately, the aqueous sodium hydroxide solution was added to the purified water as appropriate until the pH of the reaction slurry was a constant 6.5.

When the reaction slurry volume reached 1 L, removal of the reaction slurry from the reaction tank was initiated. Removal of the reaction slurry was continued until the reaction slurry removal volume was equivalent to the amount of starting solution added. As a result, the average residence time of trimanganese tetraoxide in the reaction slurry in the reaction tank was 20 hours. The time from initial supply of the starting solutions to the reaction tank until interruption of supply was 120 hours.

The reaction slurry removed during 100 to 120 hours after initial mixture of the starting solutions was collected, filtered and rinsed to obtain a product. The obtained product was dried at 100° C. and used as manganese oxide for Example 1-1. The evaluation results are shown in Table 1.

The X-ray diffraction pattern of the obtained manganese oxide was the same pattern as X-ray diffraction pattern of JCPDS pattern No. 24-734, indicating that the crystal phase was a spinel structure.

Figure 2:
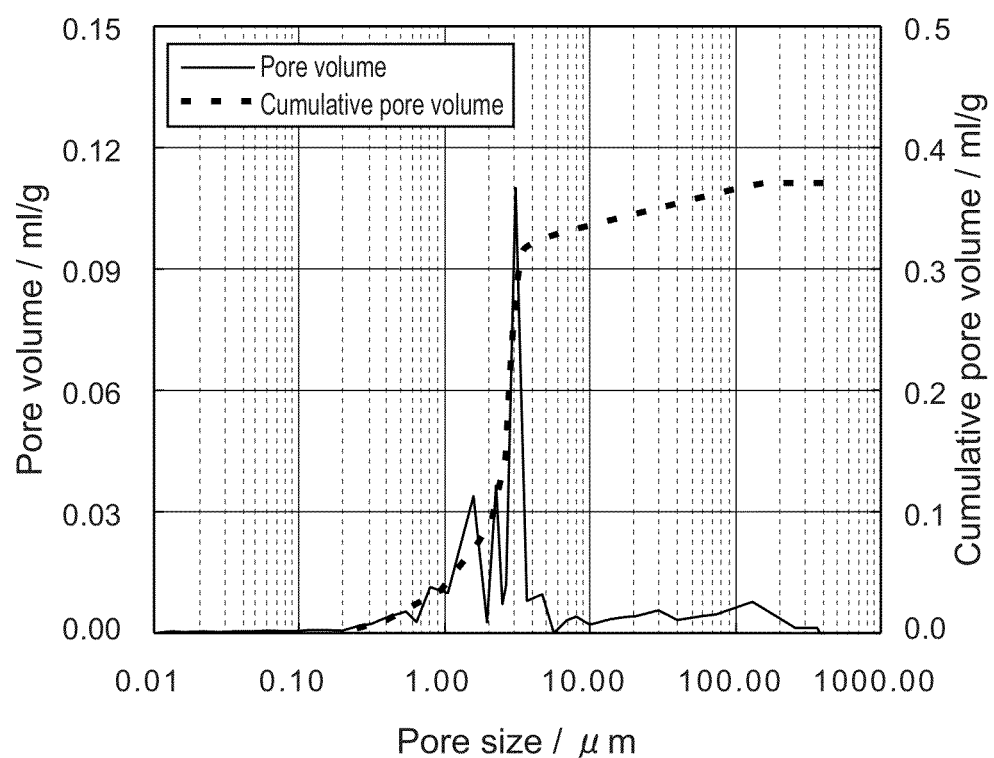
FIG. 2 is a graph showing the pore size and pore volume distribution of the manganese oxide obtained in Example 1-1.
Figure 3:
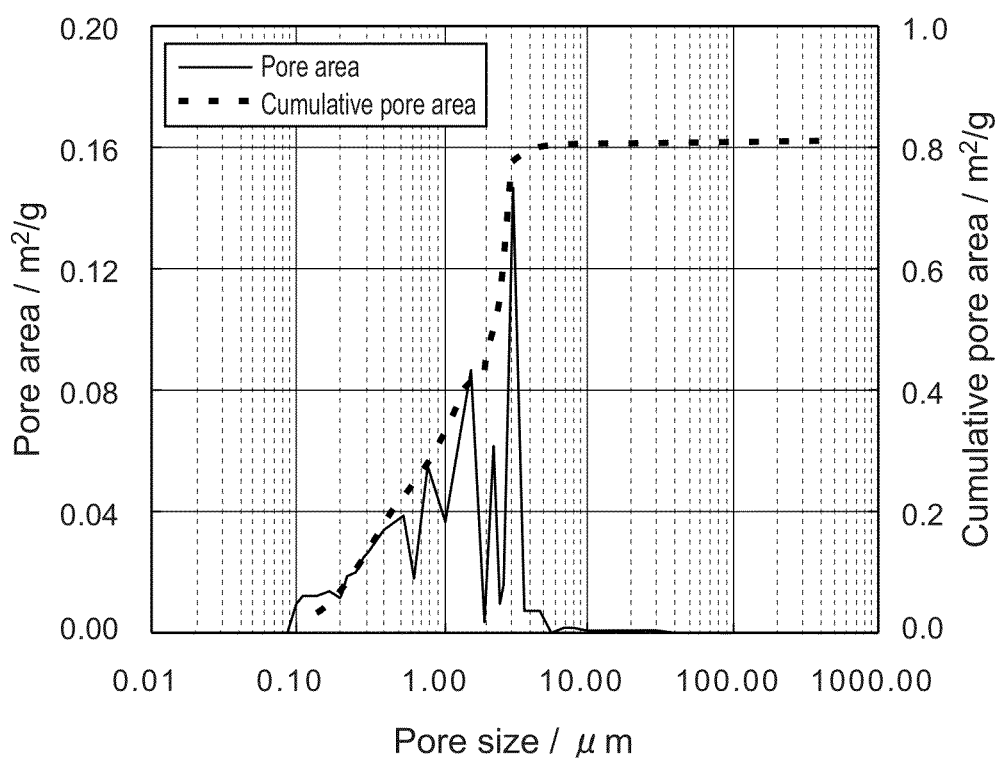
FIG. 3 is a graph showing the pore size and pore area distribution of the manganese oxide obtained in Example 1-1.

The oxidation number of manganese in the manganese oxide, as represented by $MnO_x$, was x=1.33. This demonstrated that the obtained manganese oxide was a monophase of trimanganese tetraoxide. The particle size distribution of the trimanganese tetraoxide is shown in FIG. 1, the pore size and pore volume distribution are shown in FIG. 2, and the pore size and pore area distribution are shown in FIG. 3. The pore volume fraction of the manganese oxide for diameters of up to 2 µm was 23.9%.

The tap density of the obtained manganese oxide was 1.8 g/cm³. The density of the obtained manganese oxide (hereunder, "JIS density") was measured by a method according to JIS R1628. As a result, the JIS density of the manganese oxide of Example 1-1 was 1.98 g/cm³. Thus, the JIS density of the manganese oxide of Example 1-1 was 1.1 times the tap density.

Example 1-2

In a reaction tank with an internal volume of 1 L there was placed 500 mL of purified water. The purified water was heated while stirring and refluxing at 90° C. The oxidation-reduction potential of the purified water heated to 90° C. was 150 mV.

To this purified water there were supplied a 2 mol/L aqueous manganese sulfate solution and a 2 mol/L aqueous sodium hydroxide solution, as starting solutions in the same manner as Example 1-1, and trimanganese tetraoxide particles were crystallized to obtain a reaction slurry having trimanganese tetraoxide dispersed in a solvent. During this time, the starting solutions were added in the same manner as Example 1-1, except for adjusting the amount of aqueous sodium hydroxide solution added in order to shift the reaction slurry pH within the range of 7.0±0.5. No oxygen was blown into the reaction slurry during addition of the starting solutions.

Since the oxidation-reduction potential of the reaction slurry decreased with addition of the starting solutions, supply of the starting solutions was interrupted when the oxidation-reduction potential of the reaction slurry reached 80 mV.

After interrupting supply of the starting solutions, oxygen was blown into the reaction slurry to adjust the oxidation-reduction potential of the reaction slurry. When the oxidation-reduction potential of the reaction slurry reached 120 mV, the oxygen blowing was interrupted, and then supply of the starting solutions to the reaction slurry was resumed.

Supply of the starting solutions to the reaction slurry and blowing of oxygen into the reaction slurry were repeated in an alternating manner, and the starting solution supply and oxygen blowing were interrupted when the total reaction slurry volume reached 1000 mL.

The time required from initial supply of the starting solutions to the reaction tank until the reaction slurry volume reached 1000 mL was 30 hours. When the reaction slurry volume reached 1000 mL, 500 ml of reaction slurry was removed from the reaction tank.

After removal, supply of the starting solutions and blowing of oxygen were repeated in an alternating manner. When the reaction slurry volume reached 1000 mL, 500 ml of reaction slurry in the reaction tank was removed. The procedure of starting solution supply, oxygen blowing and reaction slurry removal was repeated 5 times.

After completion of the 5the removal, addition of the starting solutions and blowing of oxygen were repeated in an alternating manner. When the reaction slurry volume reached 1000 mL, the temperature of the reaction slurry was kept at 90° C. without removal.

Figure 7:
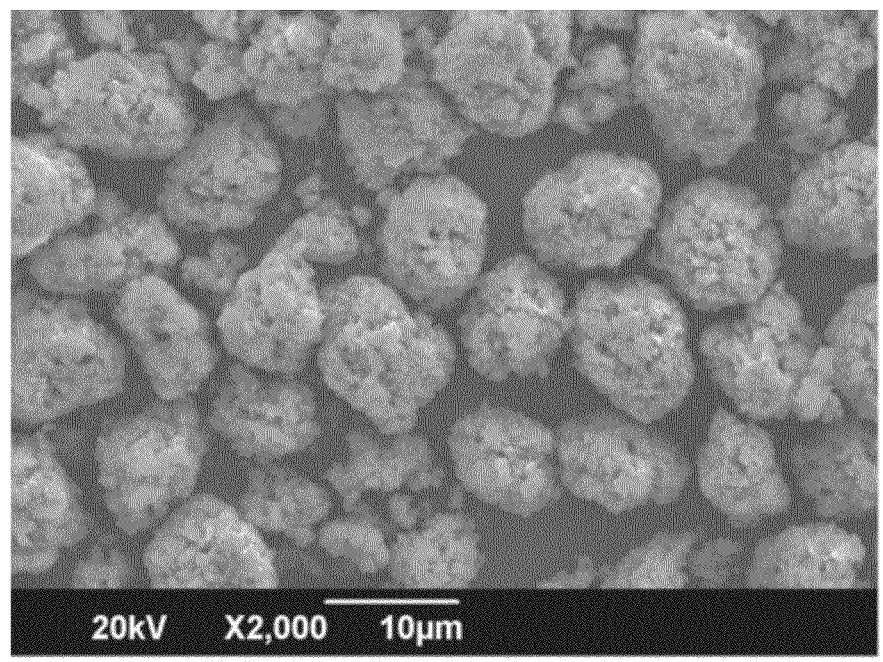
FIG. 7 is a scanning electron micrograph (2,000× magnification) of the manganese oxide obtained in Example 1-2.

The reaction slurry was kept at a temperature of 90° C. while stirring for 1 hour, for ageing of the reaction slurry. After completion of ageing of the reaction slurry, the reaction slurry in the reaction tank was filtered and rinsed to obtain a product. The obtained product was dried at 100° C. and used as manganese oxide for Example 1-2. The results of the evaluation are shown in Table 1. FIG. 7 is a scanning electron micrograph (2,000× magnification) of the manganese oxide obtained in Example 1-2.

Figure 4:
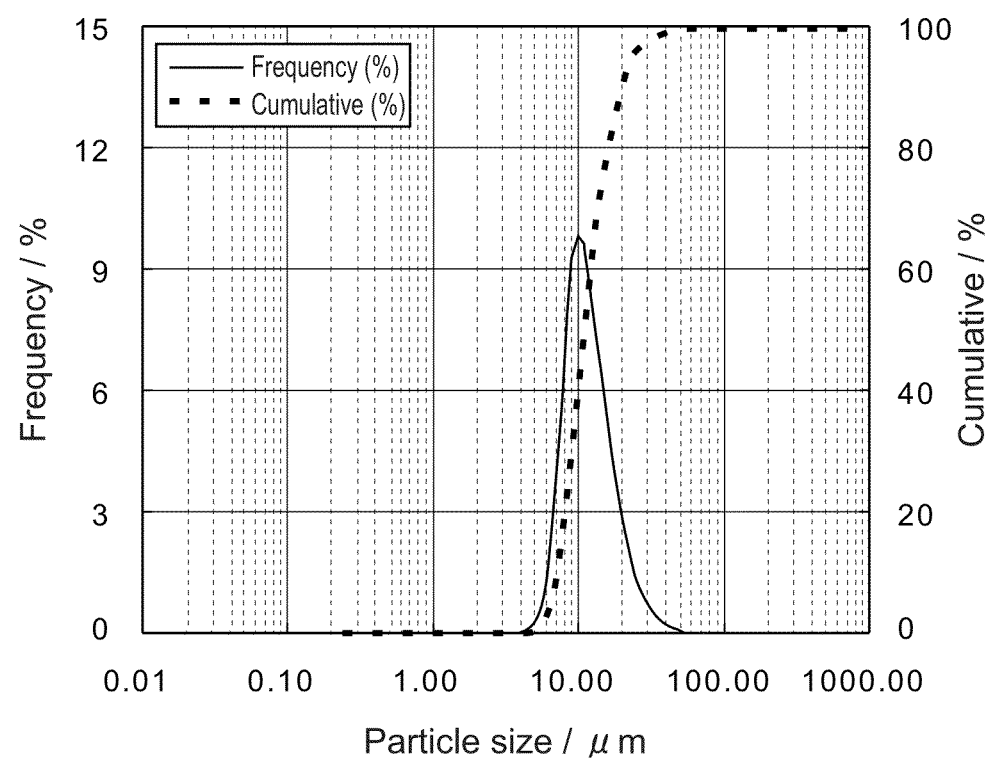
FIG. 4 is a graph showing the particle size distribution of the manganese oxide obtained in Example 1-2.
Figure 5:
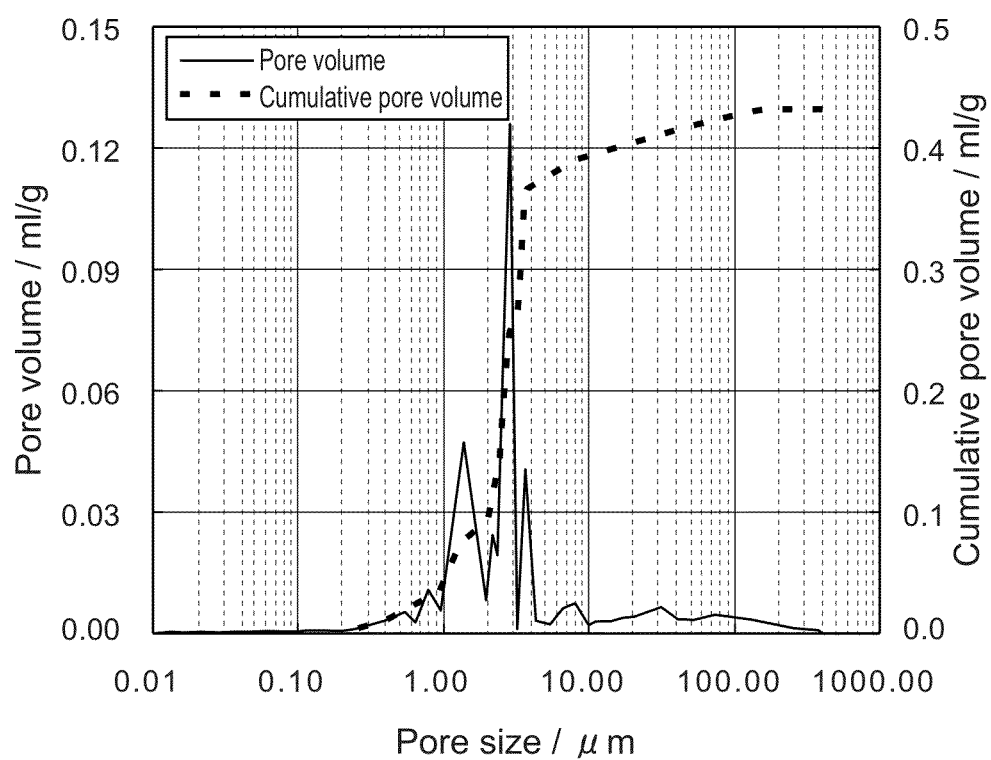
FIG. 5 is a graph showing the pore size and pore volume distribution of the manganese oxide obtained in Example 1-2.
Figure 6:
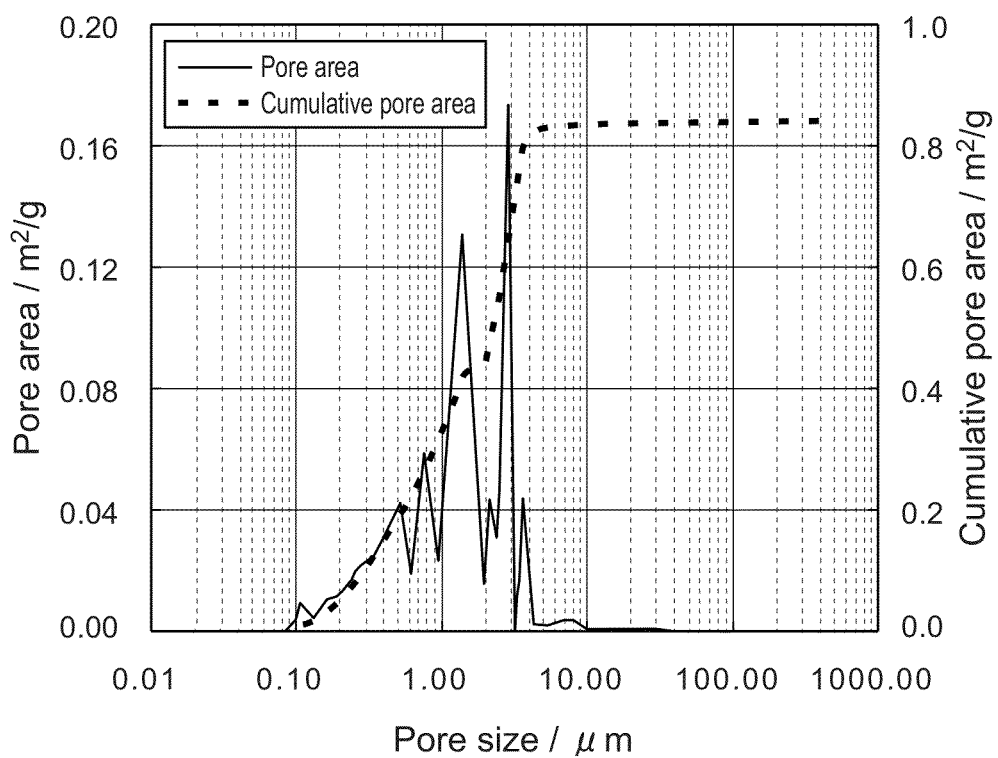
FIG. 6 is a graph showing the pore size and pore area distribution of the manganese oxide obtained in Example 1-2.

The X-ray diffraction pattern of the obtained manganese oxide was the same pattern as the X-ray diffraction pattern of JCPDS pattern No. 24-734. The crystal structure of the manganese oxide was a spinel structure. The oxidation number of manganese in the manganese oxide, as represented by $MnO_x$, was x=1.34. This demonstrated that the obtained trimanganese tetraoxide was a monophase of trimanganese tetraoxide. The particle size distribution of the trimanganese tetraoxide is shown in FIG. 4, the pore size and pore volume distribution are shown in FIG. 5, and the pore size and pore area distribution are shown in FIG. 6. The pore volume fraction of the manganese oxide for diameters of up to 2 μm was 21.3%. The HS density of the manganese oxide was 2.09 g/cm³.

Example 1-3

The same procedure was carried out as in Example 1-1, except for keeping the pH of the reaction slurry at 8.0 and the reaction temperature at 70° C. during supply of the starting solutions, to obtain manganese oxide for Example 1-3. The evaluation results are shown in Table 1.

Figure 8:
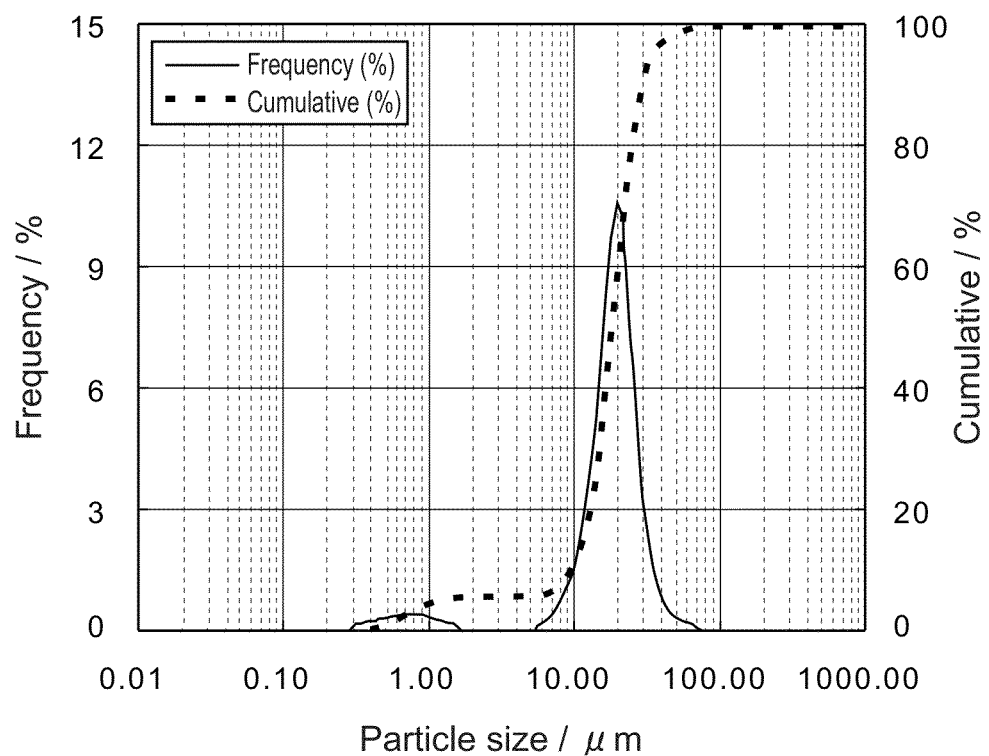
FIG. 8 is a graph showing the particle size distribution of the manganese oxide obtained in Example 1-3.
Figure 9:
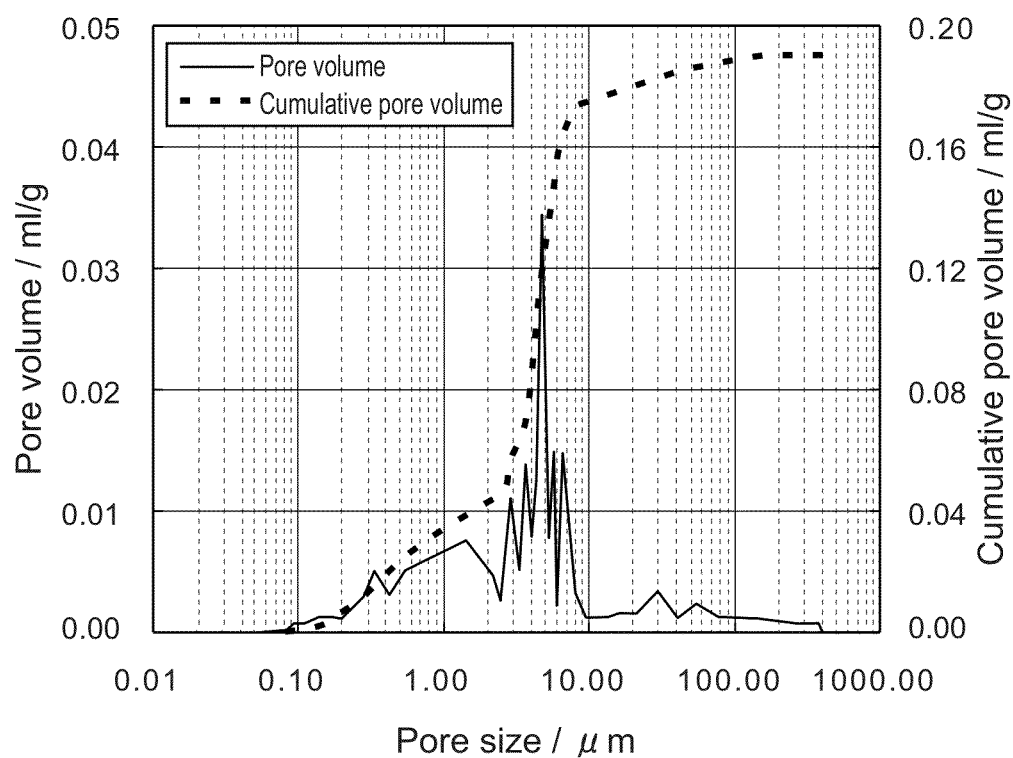
FIG. 9 is a graph showing the pore size and pore volume distribution of the manganese oxide obtained in Example 1-3.
Figure 10:
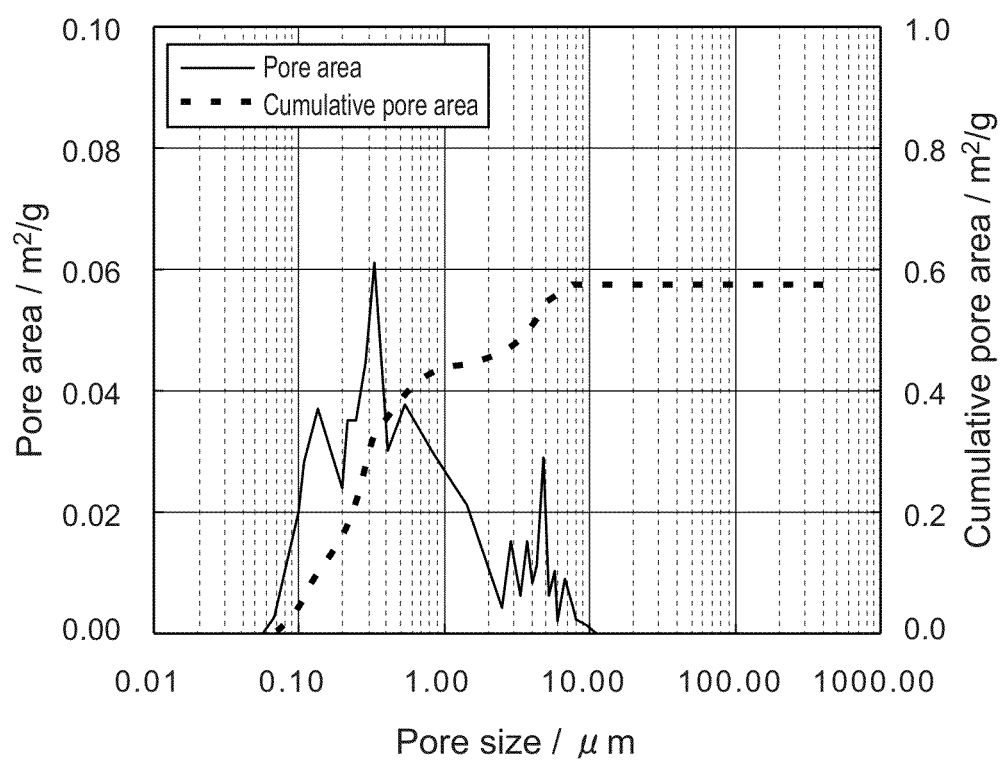
FIG. 10 is a graph showing the pore size and pore area distribution of the manganese oxide obtained in Example 1-3.

The X-ray diffraction pattern of the obtained manganese oxide was the same pattern as the X-ray diffraction pattern of JCPDS pattern No. 24-734, indicating that the manganese oxide structure was a spinel structure. The oxidation number of manganese in the manganese oxide, as represented by $MnO_x$, was x=1.34. These results indicated that the obtained manganese oxide was a monophase of trimanganese tetraoxide. The particle size distribution of the trimanganese tetraoxide is shown in FIG. 8, the pore size and pore volume distribution are shown in FIG. 9, and the pore size and pore area distribution are shown in FIG. 10. The pore volume fraction of the manganese oxide for diameters of up to 2 μm was 27.6%. The tap density of the manganese oxide was 2.2 g/cm³, and the JIS density was 2.42 g/cm³. Thus, the MS density of the manganese oxide of Example 1-3 was 1.1 times the tap density.

Example 1-4

The same procedure was carried out as in Example 1-1, except for keeping the pH of the reaction slurry at 7 during supply of the starting solutions, to obtain manganese oxide for Example 1-4. The evaluation results are shown in Table 1.

Figure 11:
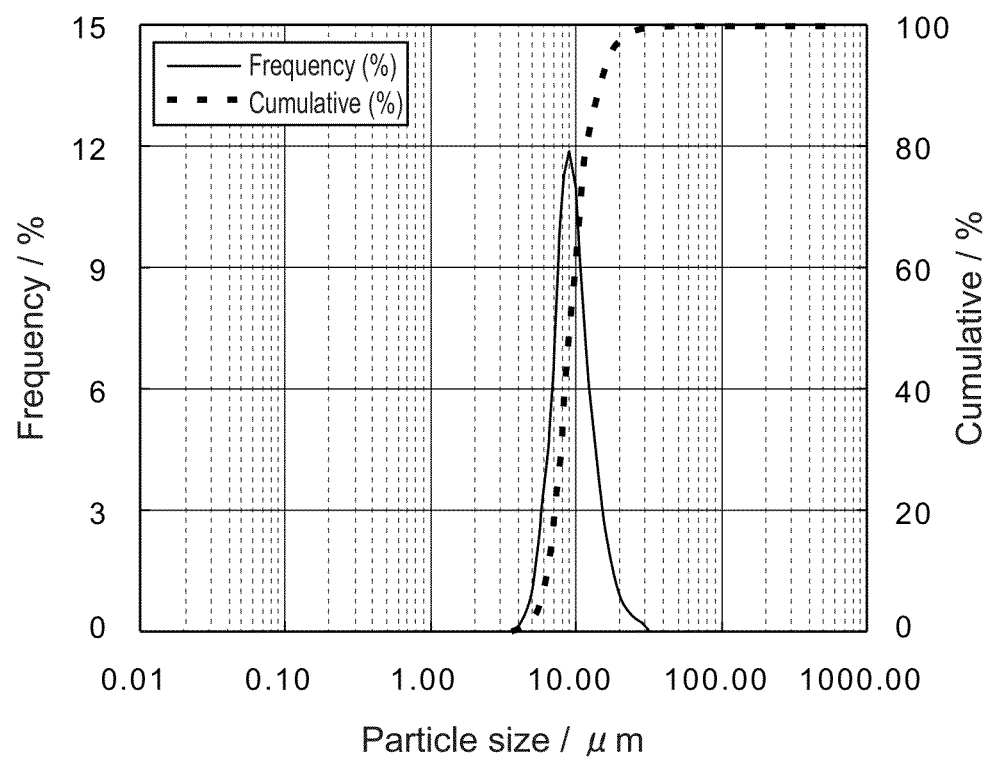
FIG. 11 is a graph showing the particle size distribution of the manganese oxide obtained in Example 1-4.
Figure 12:
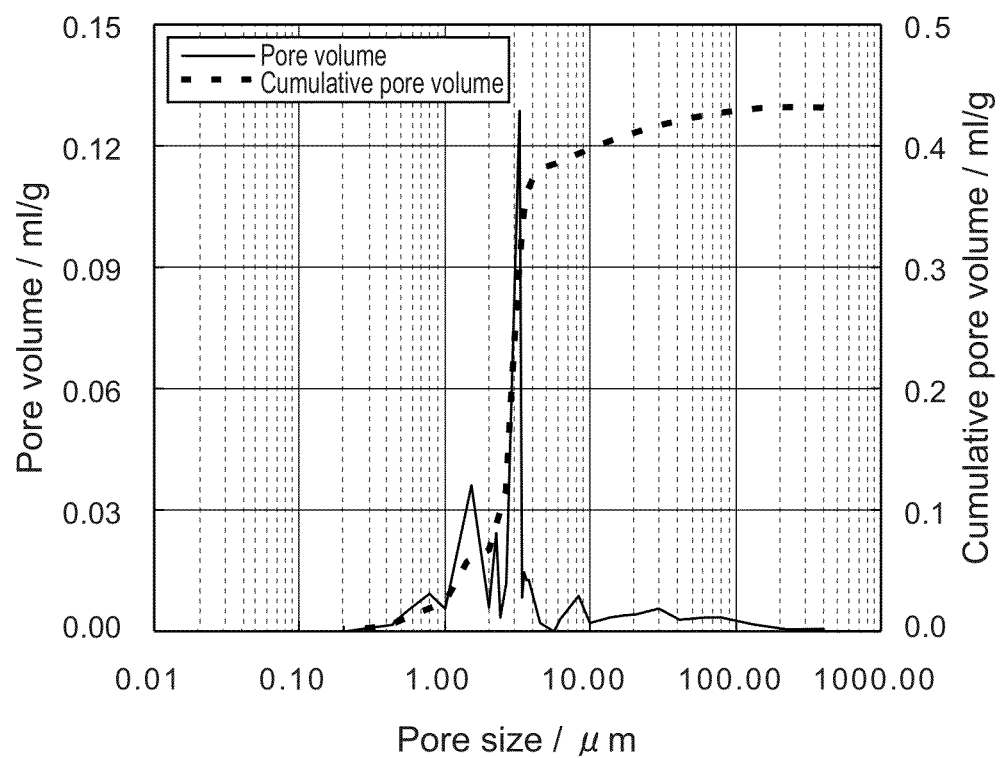
FIG. 12 is a graph showing the pore size and pore volume distribution of the manganese oxide obtained in Example 1-4.
Figure 13:
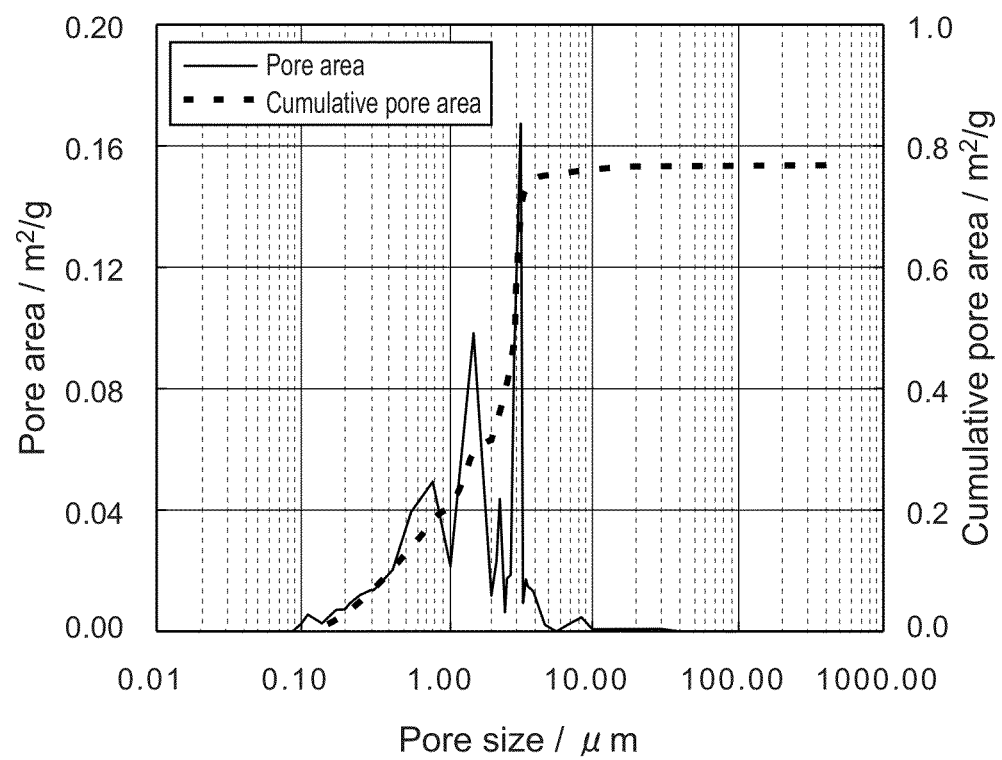
FIG. 13 is a graph showing the pore size and pore area distribution of the manganese oxide obtained in Example 1-4.

The X-ray diffraction pattern of the obtained manganese oxide was the same pattern as the X-ray diffraction pattern of JCPDS pattern No. 24-734. The structure of the manganese oxide was a spinel structure. The oxidation number of manganese in the manganese oxide, as represented by $MnO_x$, was x=1.34. This demonstrated that the obtained manganese oxide was a monophase of trimanganese tetraoxide. The particle size distribution of the trimanganese tetraoxide is shown in FIG. 11, the pore size and pore volume distribution are shown in FIG. 12, and the pore size and pore area distribution are shown in FIG. 13.

Also, the obtained trimanganese tetraoxide had a Mg content of 3 ppm by weight, a Ca content of 25 ppm by weight, a Na content of 41 ppm by weight, an Fe content of 3 ppm by weight and a $SO_4^{2-}$ content of 0.54 wt %. The results demonstrated that the trimanganese tetraoxide of Example 4 has a low impurity content.

Example 1-5

The same procedure was carried out as in Example 1-1, except for keeping the pH of the reaction slurry at 7.5, to obtain manganese oxide for Example 5. The evaluation results are shown in Table 1.

Figure 14:
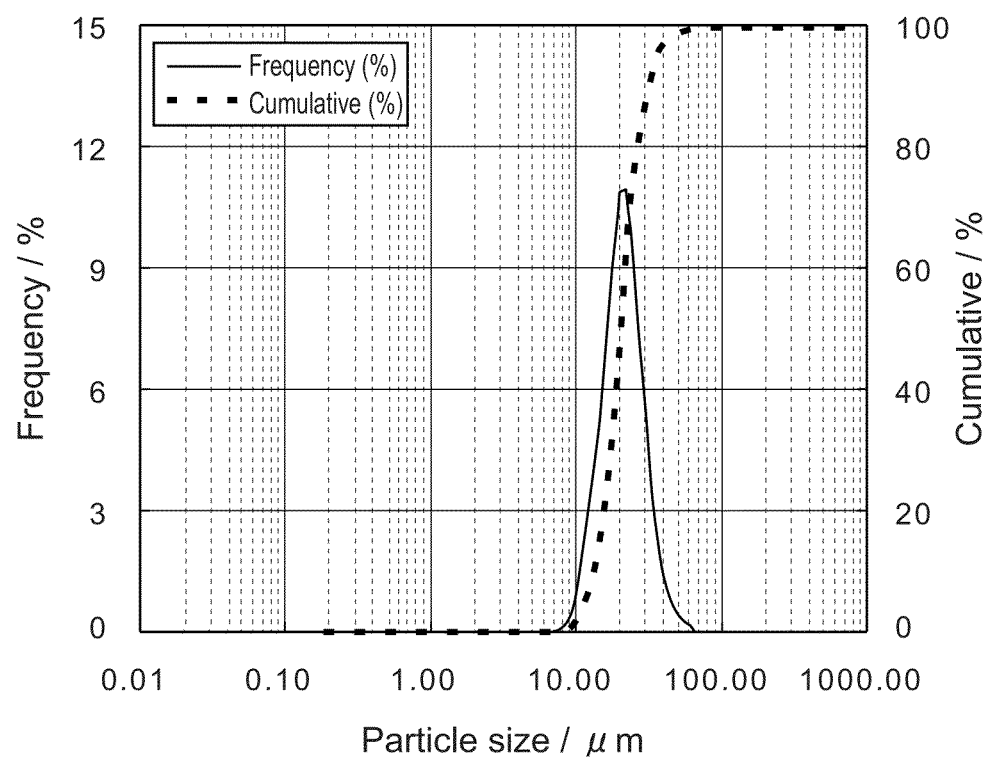
FIG. 14 is a graph showing the particle size distribution of the manganese oxide obtained in Example 1-5.
Figure 15:
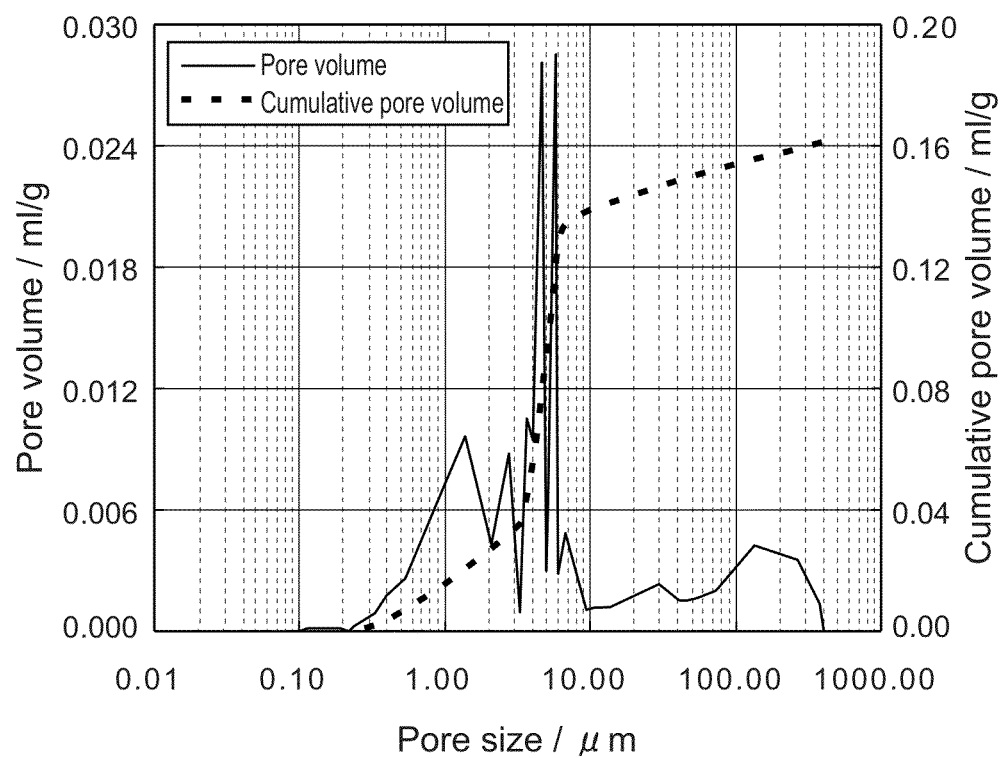
FIG. 15 is a graph showing the pore size and pore volume distribution of the manganese oxide obtained in Example 1-5.
Figure 16:
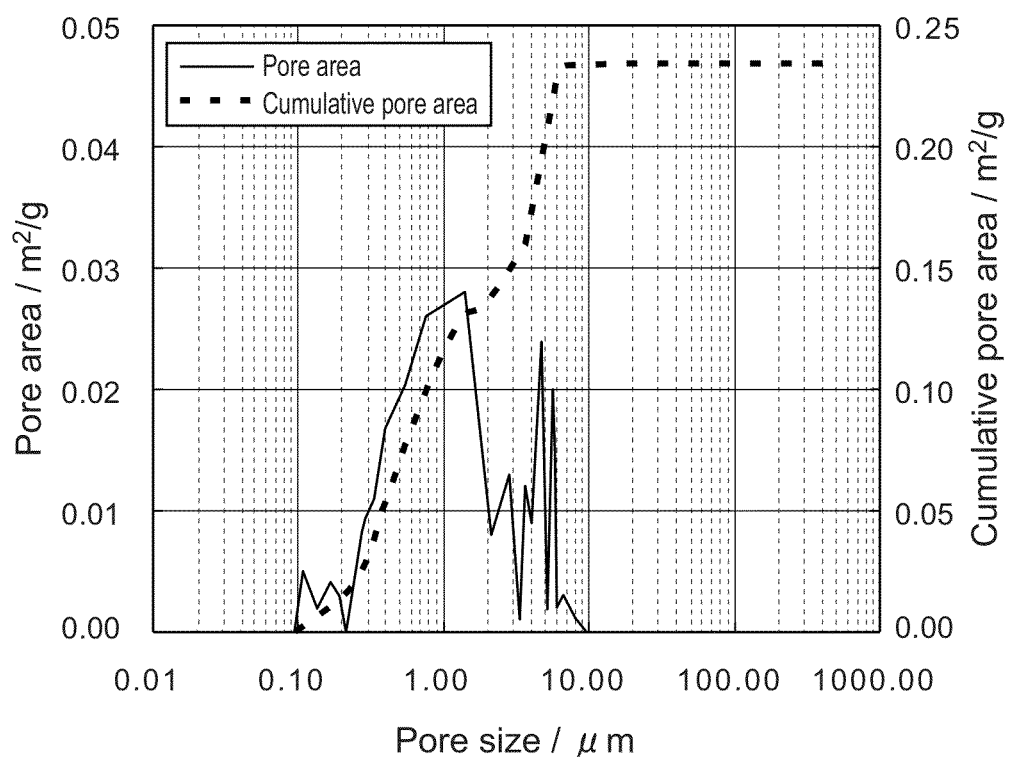
FIG. 16 is a graph showing the pore size and pore area distribution of the manganese oxide obtained in Example 1-5.

The X-ray diffraction pattern of the obtained manganese oxide was the same pattern as the X-ray diffraction pattern of JCPDS pattern No. 24-734. The structure of the manganese oxide was a spinel structure. The oxidation number of manganese in the manganese oxide, as represented by $MnO_x$, was x=1.33. This demonstrated that the obtained manganese oxide was a monophase of trimanganese tetraoxide. The particle size distribution of the trimanganese tetraoxide is shown in FIG. 14, the pore size and pore volume distribution are shown in FIG. 15, and the pore size and pore area distribution are shown in FIG. 16.

Also, the obtained trimanganese tetraoxide had a Mg content of 25 ppm by weight, a Ca content of 76 ppm by weight, a Na content of 110 ppm by weight and an Fe content of 1 ppm by weight. The results demonstrated that the trimanganese tetraoxide of Example 1-5 has a low impurity content.

Example 1-6

The same procedure was carried out as in Example 1-1, except for keeping the pH of the reaction slurry at 8 during supply of the starting solutions, to obtain manganese oxide for Example 1-6. The evaluation results are shown in Table 1.

Figure 17:
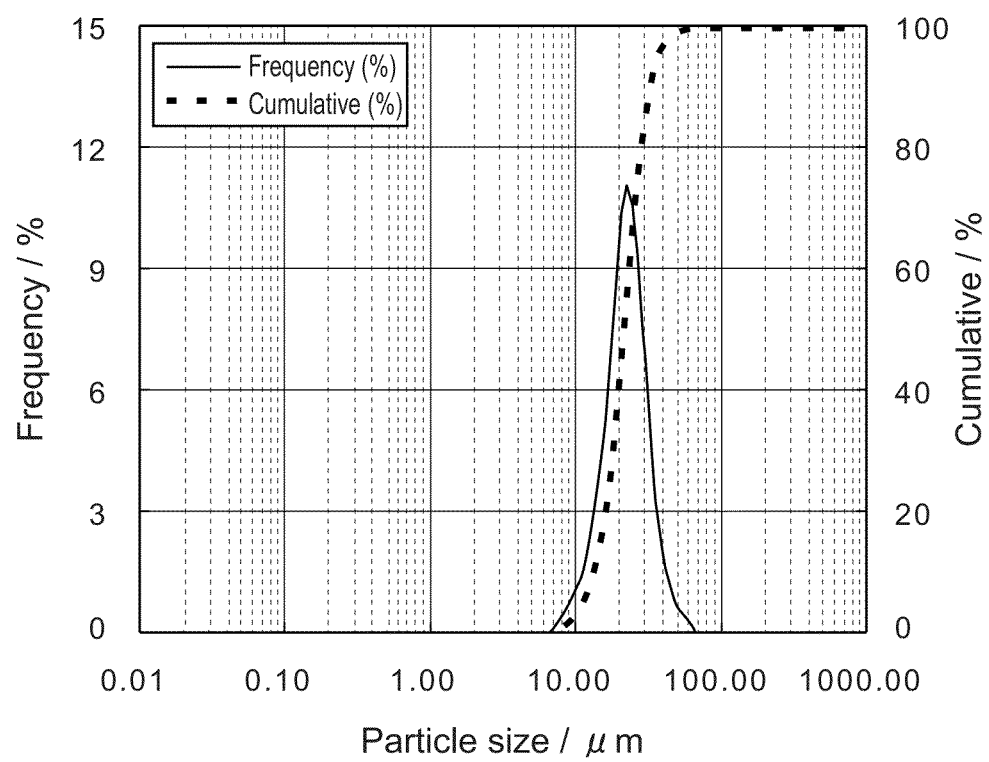
FIG. 17 is a graph showing the particle size distribution of the manganese oxide obtained in Example 1-6.
Figure 18:
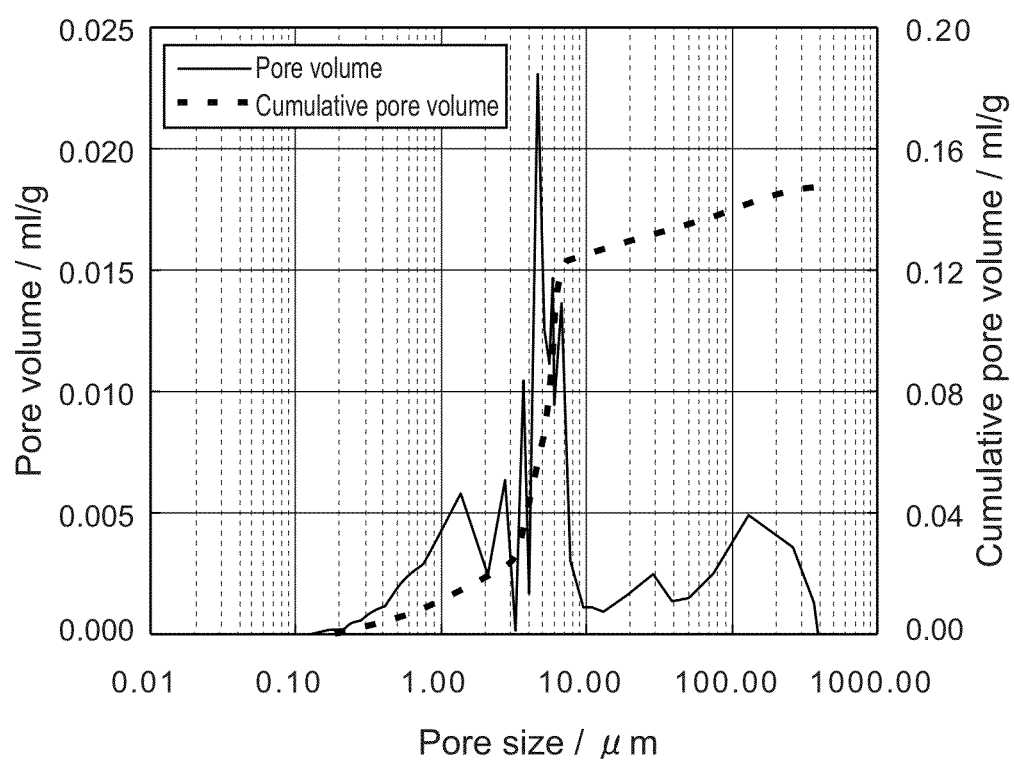
FIG. 18 is a graph showing the pore size and pore volume distribution of the manganese oxide obtained in Example 1-6.
Figure 19:
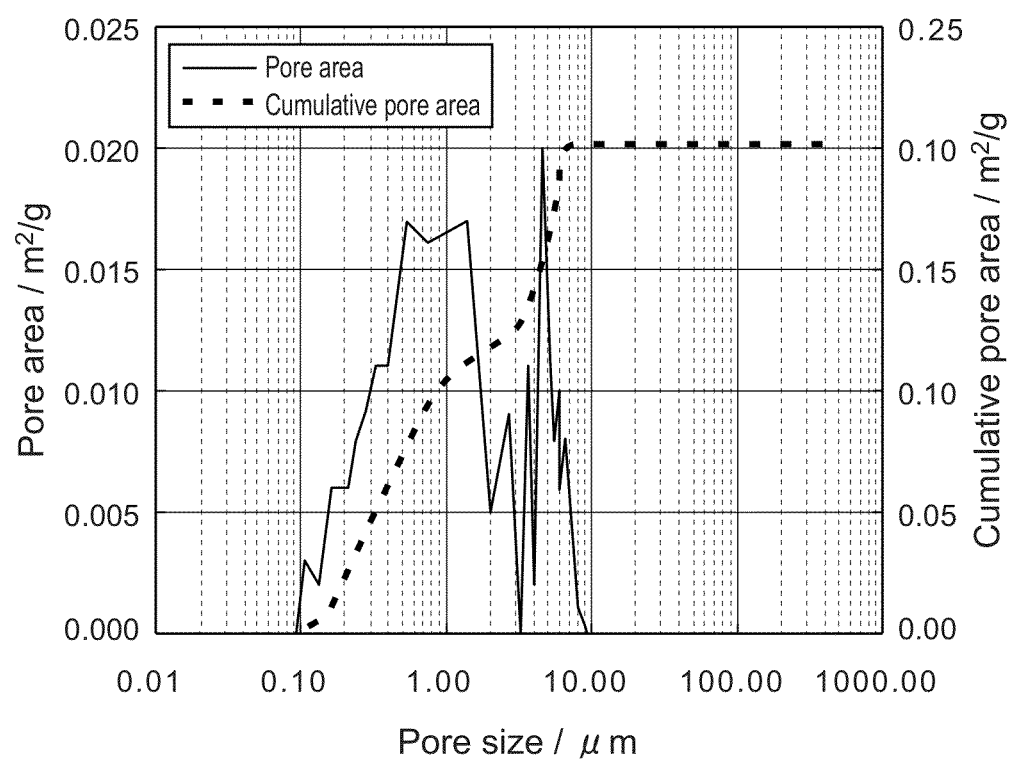
FIG. 19 is a graph showing the pore size and pore area distribution of the manganese oxide obtained in Example 1-6.

The X-ray diffraction pattern of the obtained manganese oxide was the same pattern as the X-ray diffraction pattern of JCPDS pattern No. 24-734. The structure of the manganese oxide was a spinel structure. The oxidation number of manganese in the manganese oxide, as represented by $MnO_x$, was x=1.34. This demonstrated that the obtained manganese oxide was a monophase of trimanganese tetraoxide. The tap density of the manganese oxide of Example 1-6 was 2.4 g/cm³, and the JIS density was 2.62 g/cm³. Thus, the JIS density of the manganese oxide of Example 1-6 was 1.1 times the tap density. The particle size distribution of the trimanganese tetraoxide is shown in FIG. 17, the pore size and pore volume distribution are shown in FIG. 18, and the pore size and pore area distribution are shown in FIG. 19.

Also, the obtained trimanganese tetraoxide had a Mg content of 184 ppm by weight, a Ca content of 274 ppm by weight, a Na content of 188 ppm by weight, an Fe content of 1 ppm by weight and a $SO_4^{2-}$ content of 0.16 wt %. The results demonstrated that the trimanganese tetraoxide of Example 1-6 has a low impurity content.

Example 1-7

The same procedure was carried out as in Example 1-1, except for keeping the pH of the reaction slurry at 7 during supply of the starting solutions, and supplying the starting solutions while blowing in oxygen to maintain an oxidation-reduction potential of 50 mV. This yielded a manganese oxide for Example 1-7. The evaluation results are shown in Table 1.

Figure 20:
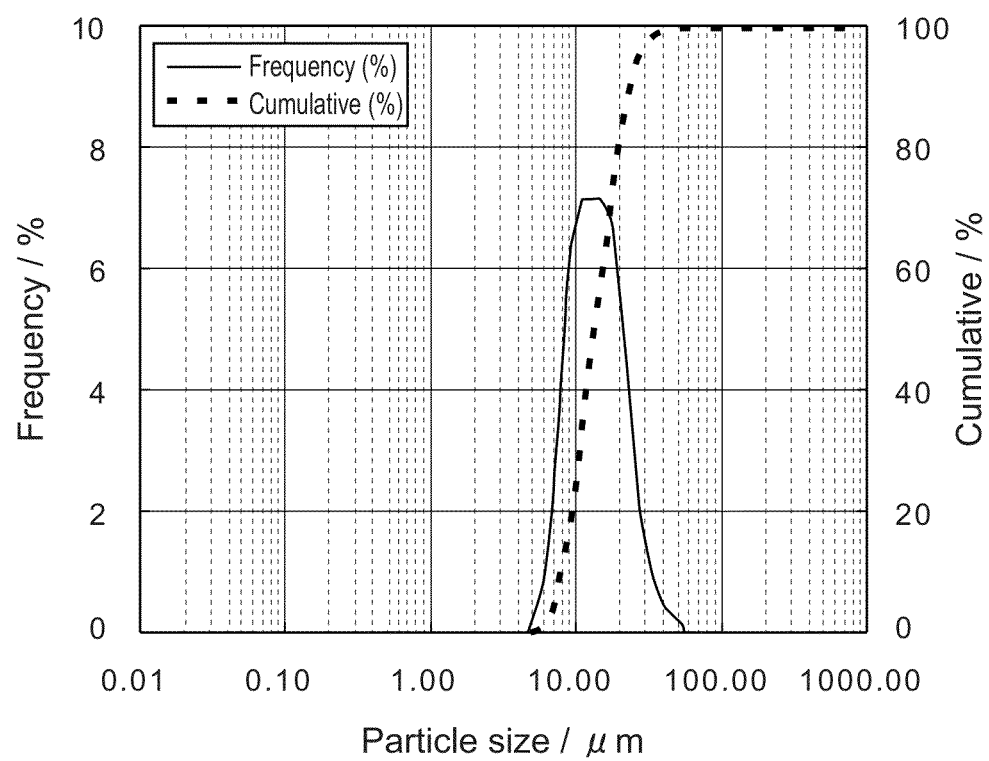
FIG. 20 is a graph showing the particle size distribution of the manganese oxide obtained in Example 1-7.
Figure 21:
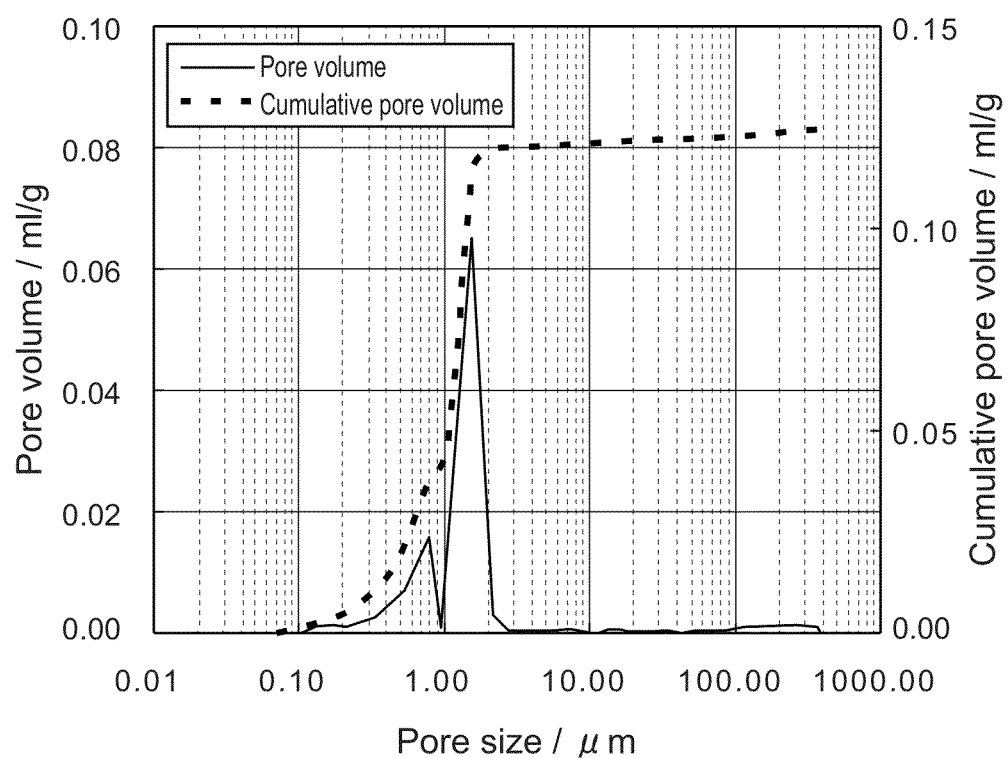
FIG. 21 is a graph showing the pore size and pore volume distribution of the manganese oxide obtained in Example 1-7.
Figure 22:
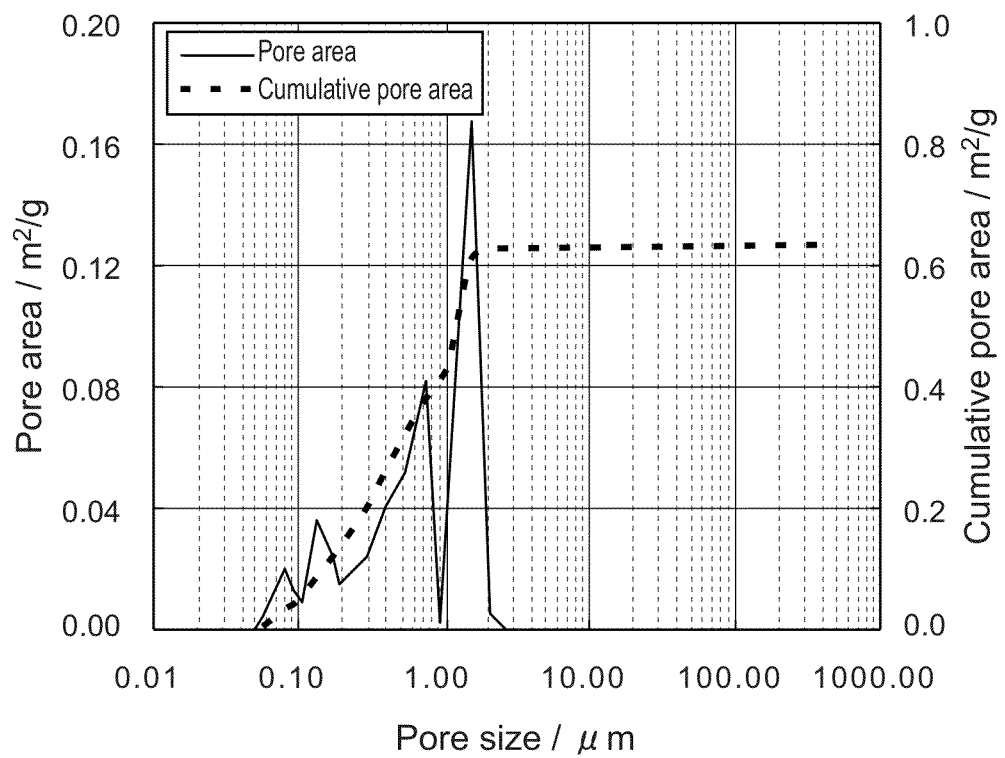
FIG. 22 is a graph showing the pore size and pore area distribution of the manganese oxide obtained in Example 1-7.

The X-ray diffraction pattern of the obtained manganese oxide was the same pattern as the X-ray diffraction pattern of JCPDS pattern No. 24-734. The structure of the manganese oxide was a spinel structure. The oxidation number of manganese in the manganese oxide, as represented by $MnO_x$, was x=1.33. This demonstrated that the obtained manganese oxide was a monophase of trimanganese tetraoxide. The particle size distribution of the trimanganese tetraoxide is shown in FIG. 20, the pore size and pore volume distribution are shown in FIG. 21, and the pore size and pore area distribution are shown in FIG. 22.

Also, the obtained trimanganese tetraoxide had a Mg content of 12 ppm by weight, a Ca content of 10 ppm by weight, a Na content of 274 ppm by weight and an Fe content of 2 ppm by weight. The results demonstrated that the trimanganese tetraoxide of Example 7 has a low impurity content.

Example 1-8

The same procedure was carried out as in Example 1, except for keeping the pH of the reaction slurry at 7 during supply of the starting solutions, and supplying the starting solutions while blowing in oxygen to maintain an oxidation-reduction potential of 150 mV. This yielded a manganese oxide for Example 1-8. The evaluation results are shown in Table 1.

Figure 23:
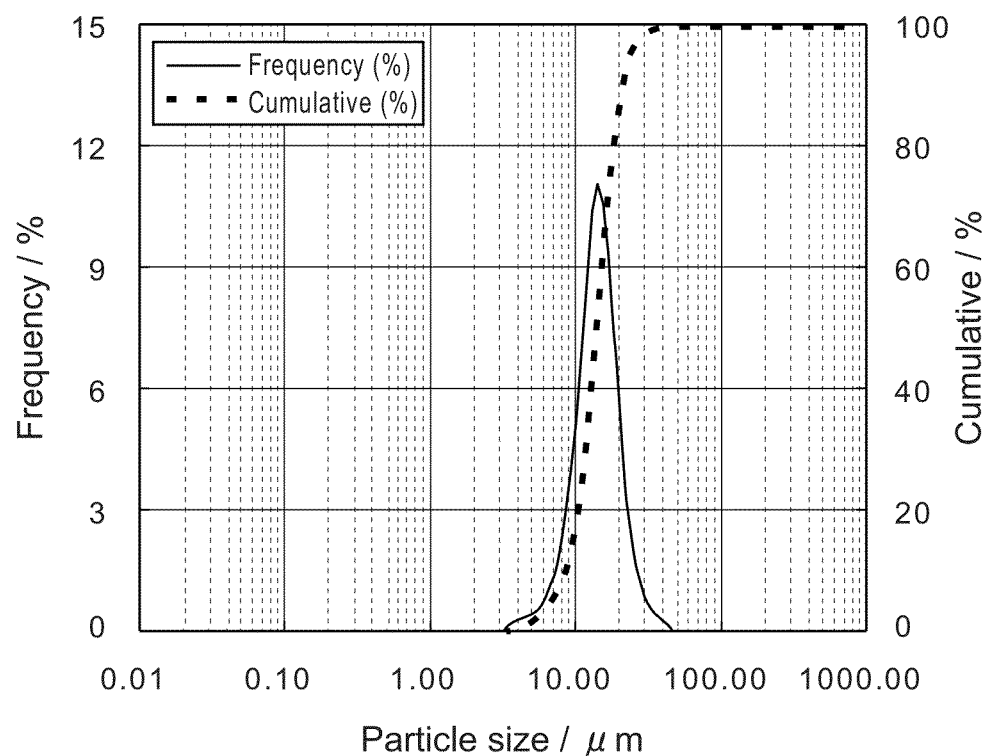
FIG. 23 is a graph showing the particle size distribution of the manganese oxide obtained in Example 1-8.
Figure 24:
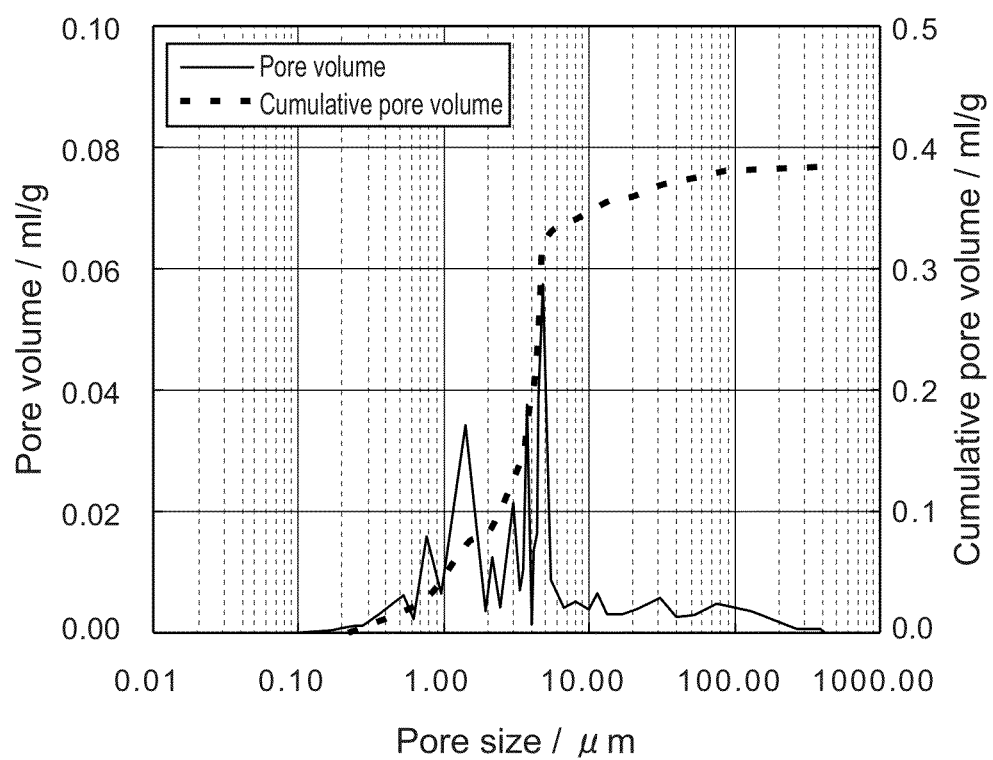
FIG. 24 is a graph showing the pore size and pore volume distribution of the manganese oxide obtained in Example 1-8.
Figure 25:
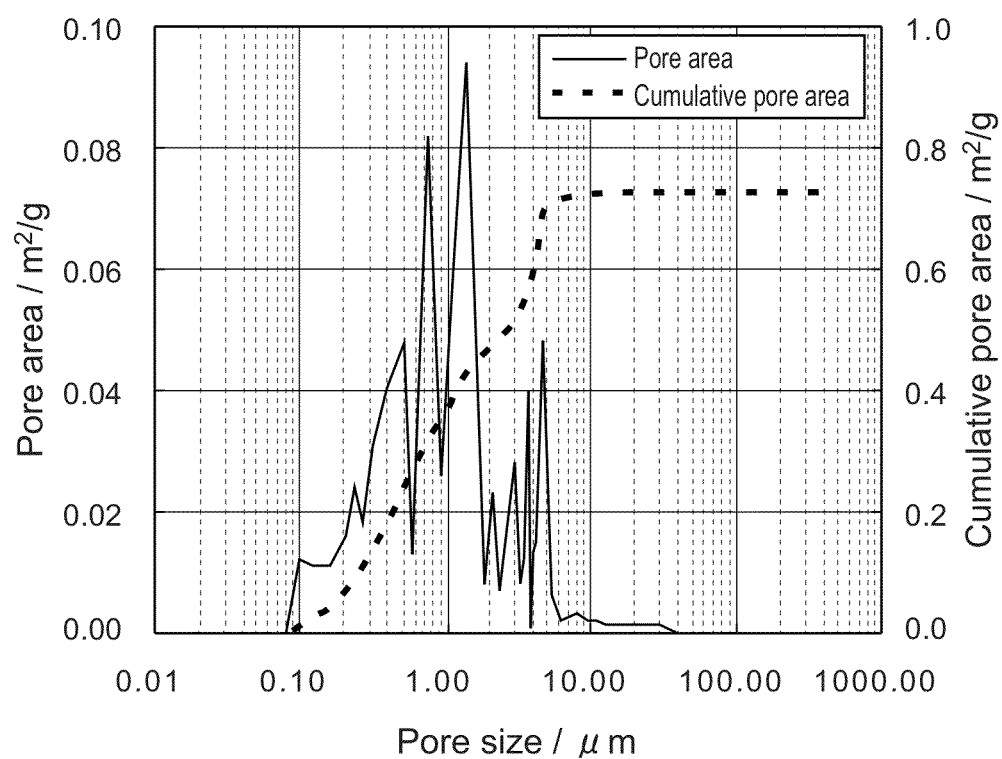
FIG. 25 is a graph showing the pore size and pore area distribution of the manganese oxide obtained in Example 1-8.

The X-ray diffraction pattern of the obtained manganese oxide was the same pattern as the X-ray diffraction pattern of JCPDS pattern No. 24-734. The structure of the manganese oxide was a spinel structure. This demonstrated that the obtained manganese oxide was a monophase of trimanganese tetraoxide. The particle size distribution of the trimanganese tetraoxide is shown in FIG. 23, the pore size and pore volume distribution are shown in FIG. 24, and the pore size and pore area distribution are shown in FIG. 25.

Also, the obtained trimanganese tetraoxide had a Mg content of 12 ppm by weight, a Ca content of 10 ppm by weight, a Na content of 274 ppm by weight and an Fe content of 2 ppm by weight. These values demonstrated that the trimanganese tetraoxide of Example 1-8 has a low impurity content.

Example 1-9

The same procedure was carried out as in Example 1-1, except that the reaction slurry pH was 7 and the starting solutions were supplied while blowing in oxygen to an oxidation-reduction potential of 180 mV. These results indicated that manganese oxide for Example 1-9 had been obtained. The evaluation results are shown in Table 1.

Figure 26:
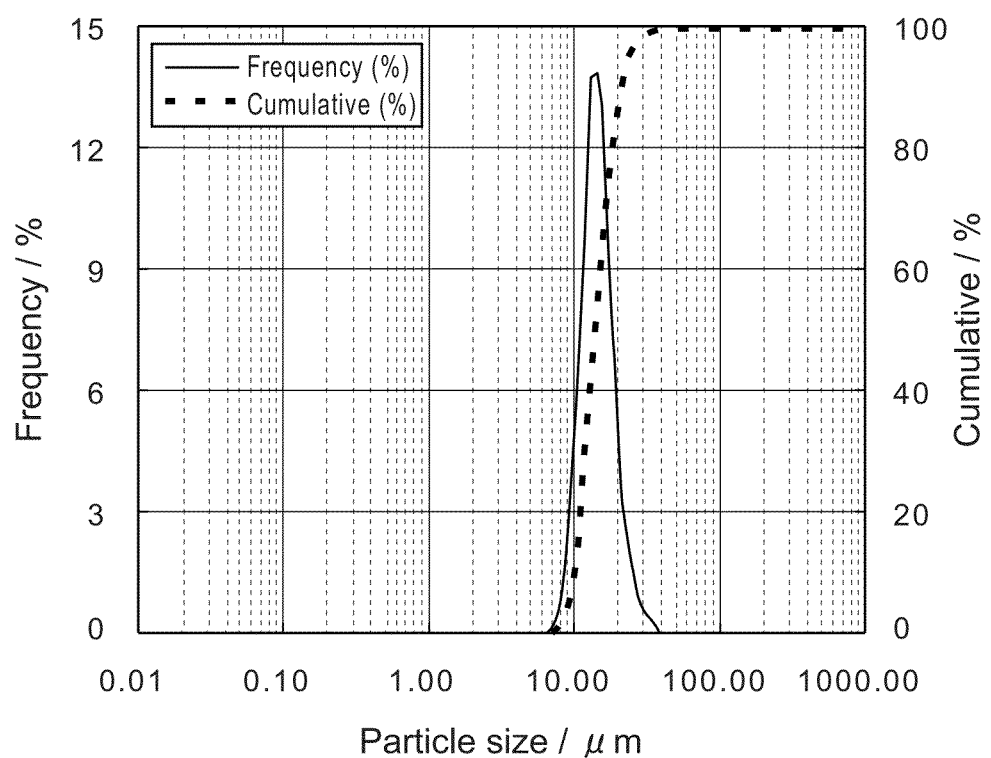
FIG. 26 is a graph showing the particle size distribution of the manganese oxide obtained in Example 1-9.
Figure 27:
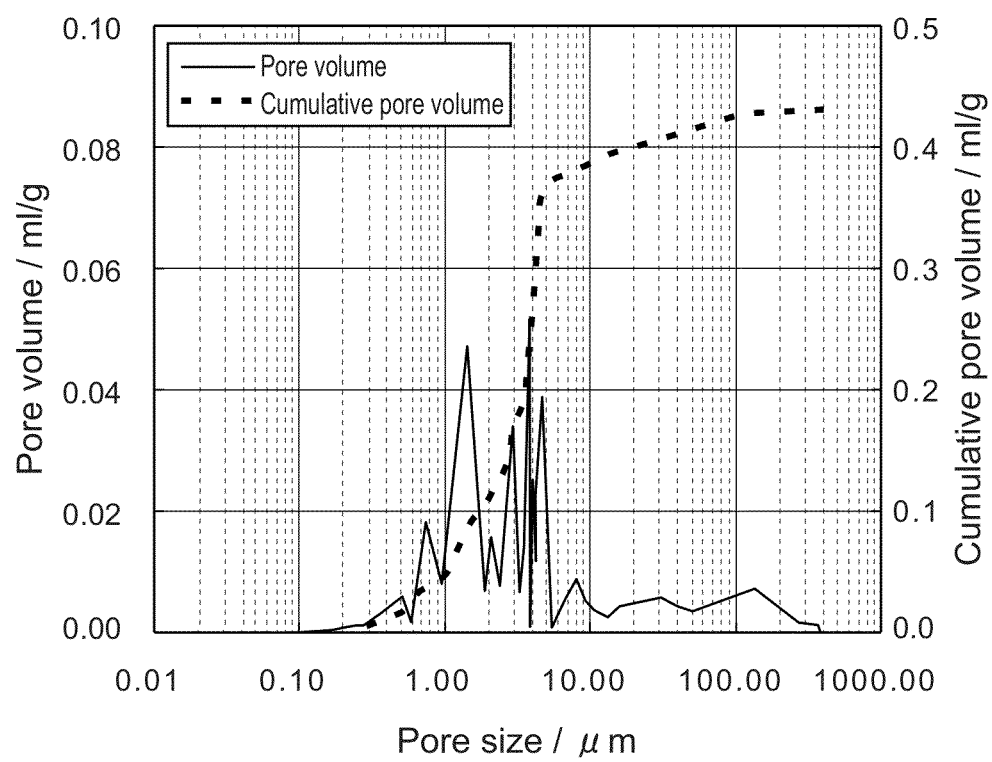
FIG. 27 is a graph showing the pore size and pore volume distribution of the manganese oxide obtained in Example 1-9.
Figure 28:
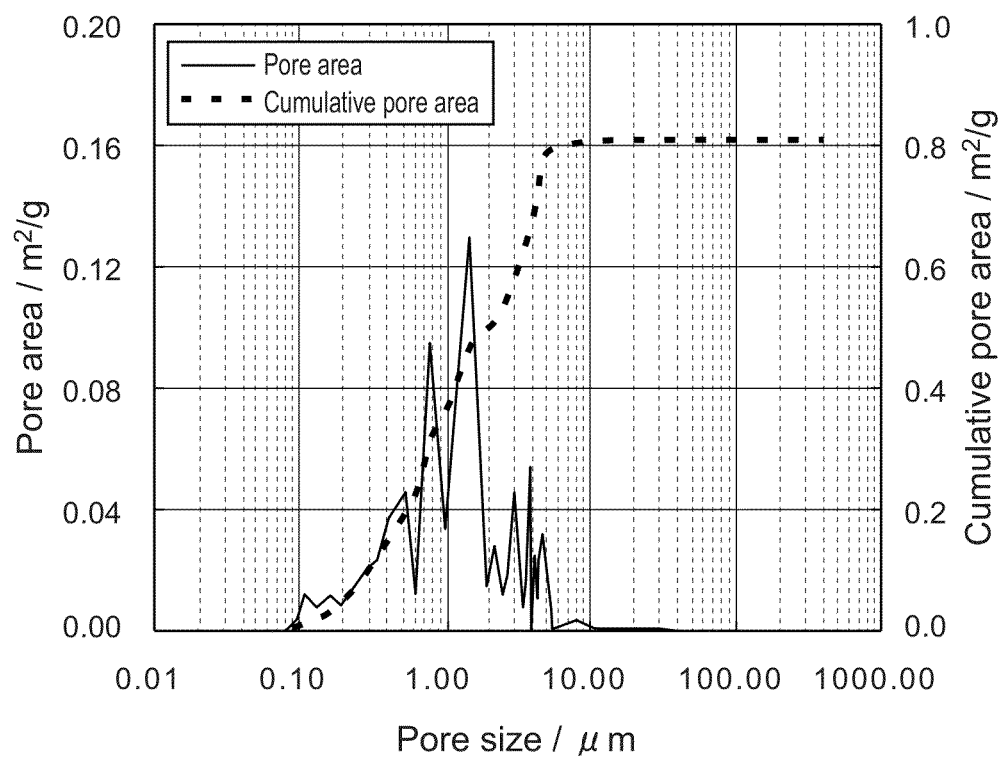
FIG. 28 is a graph showing the pore size and pore area distribution of the manganese oxide obtained in Example 1-9.

The X-ray diffraction pattern of the obtained manganese oxide was the same pattern as the X-ray diffraction pattern of JCPDS pattern No. 24-734. The structure of the manganese oxide was a spinel structure. The oxidation number of manganese in the manganese oxide, as represented by $MnO_x$, was $x=1.35$. This demonstrated that the obtained manganese oxide was a monophase of trimanganese tetraoxide. The pore volume fraction of the manganese oxide for diameters of up to 2 µm was 26.9%. The particle size distribution of the trimanganese tetraoxide is shown in FIG. 26, the pore size and pore volume distribution are shown in FIG. 27, and the pore size and pore area distribution are shown in FIG. 28.

Also, the obtained trimanganese tetraoxide had a Mg content of 12 ppm by weight, a Ca content of 81 ppm by weight, a Na content of 146 ppm by weight and an Fe content of 2 ppm by weight. The results demonstrated that the trimanganese tetraoxide of Example 1-9 has a low impurity content.

Example 1-10

The same procedure was carried out as in Example 1-1, except that the reaction temperature in the reaction tank was 50° C., the reaction slurry pH was 9 and the starting solutions were supplied while blowing in oxygen to an oxidation-reduction potential of 60 mV, to obtain manganese oxide for Example 1-10. The evaluation results are shown in Table 1.

Figure 29:
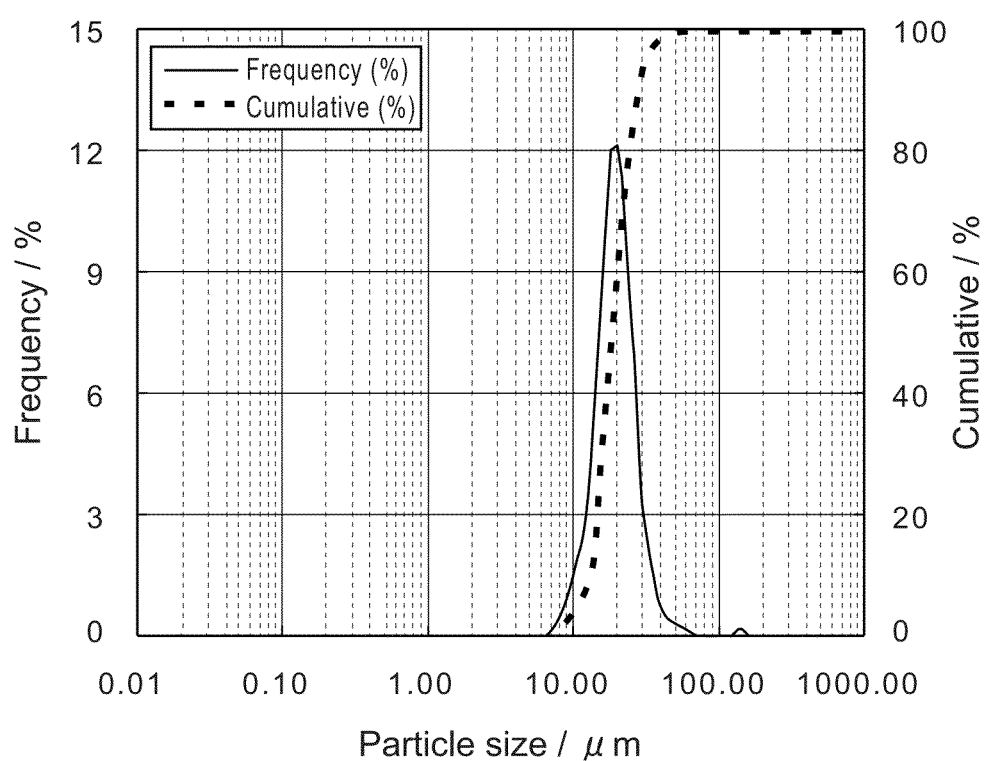
FIG. 29 is a graph showing the particle size distribution of the manganese oxide obtained in Example 1-10.
Figure 30:
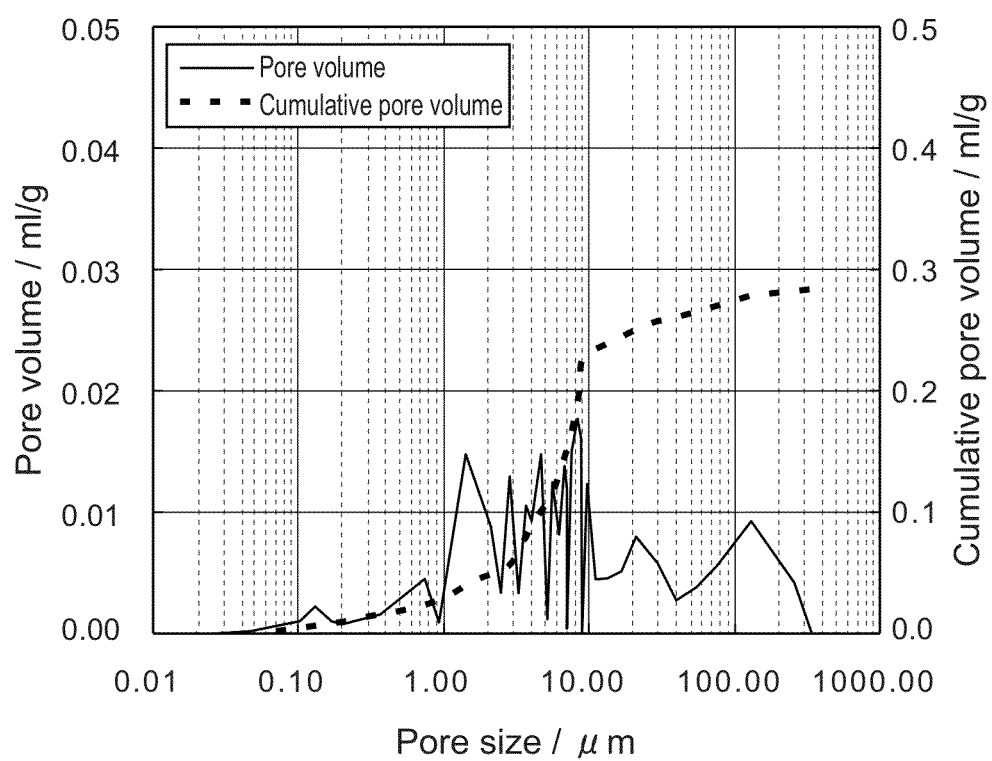
FIG. 30 is a graph showing the pore size and pore volume distribution of the manganese oxide obtained in Example 1-10.
Figure 31:
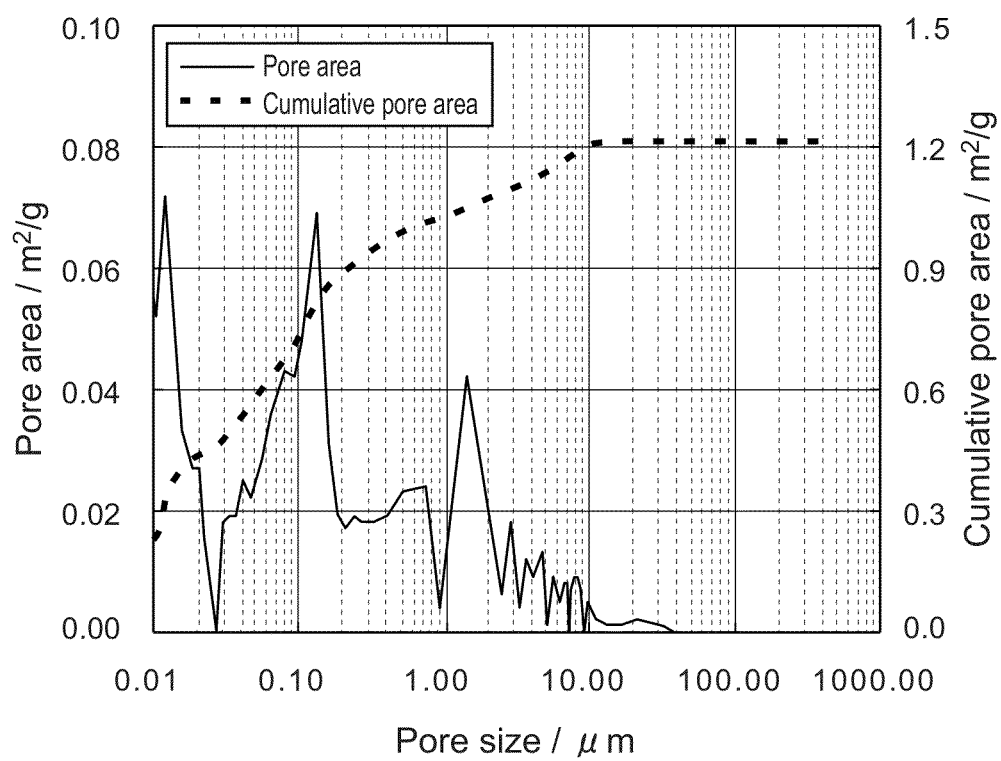
FIG. 31 is a graph showing the pore size and pore area distribution of the manganese oxide obtained in Example 1-10.

The X-ray diffraction pattern of the obtained manganese oxide was the same pattern as the X-ray diffraction pattern of JCPDS pattern No. 24-734. The structure of the manganese oxide was a spinel structure. The oxidation number of manganese in the manganese oxide, as represented by $MnO_x$, was $x=1.35$. This demonstrated that the manganese oxide was a monophase of trimanganese tetraoxide. The JIS density of the obtained trimanganese tetraoxide was 1.75 g/cm³. The particle size distribution of the trimanganese tetraoxide is shown in FIG. 29, the pore size and pore volume distribution are shown in FIG. 30, and the pore size and pore area distribution are shown in FIG. 31.

Also, the obtained trimanganese tetraoxide had a Mg content of 500 ppm by weight, a Ca content of 450 ppm by weight, a Na content of 205 ppm by weight and an Fe content of 7 ppm by weight. These values demonstrated that the trimanganese tetraoxide of Example 1-10 has a low impurity content.

Comparative Example 1-1

Commercially available electrolytic manganese dioxide (product of Tosoh Huge Corp.) was crushed and classified, to obtain electrolytic manganese dioxide particles with a mode diameter of 11 µm. The evaluation results are shown in Table 1. The tap density of the obtained electrolytic manganese dioxide particles was 1.9 g/cm³. The BET specific surface area was a high value of 40 m²/g.

Figure 32:
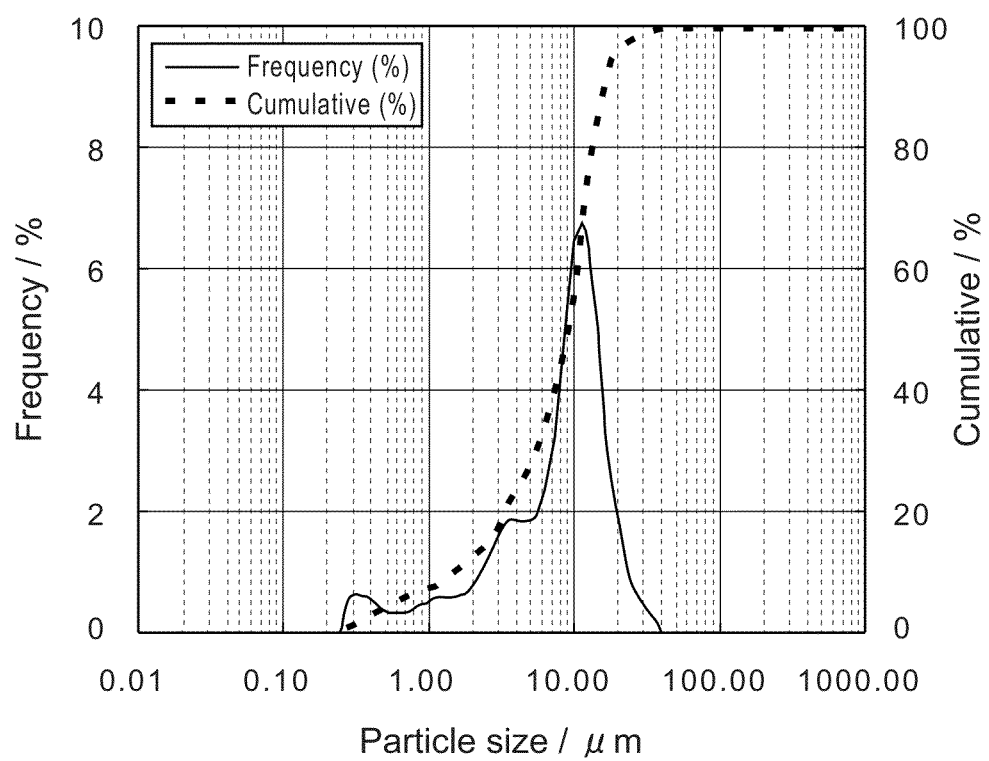
FIG. 32 is a graph showing the particle size distribution of the manganese oxide obtained in Comparative Example 1-1.
Figure 33:
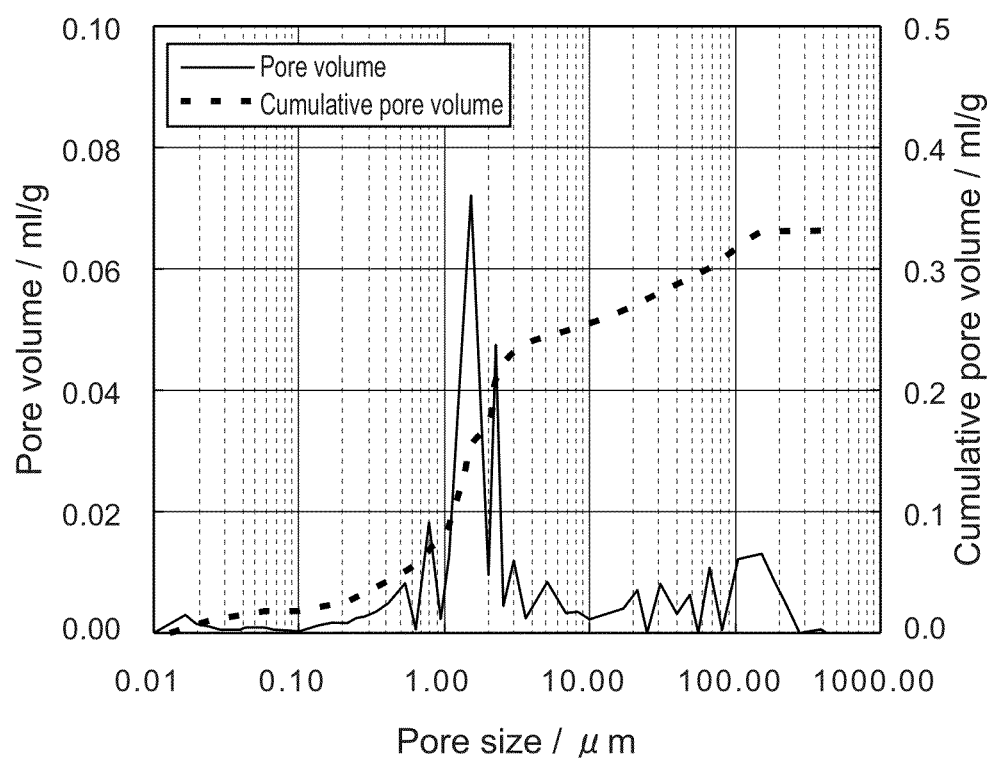
FIG. 33 is a graph showing the pore size and pore volume distribution of the manganese oxide obtained in Comparative Example 1-1.
Figure 34:
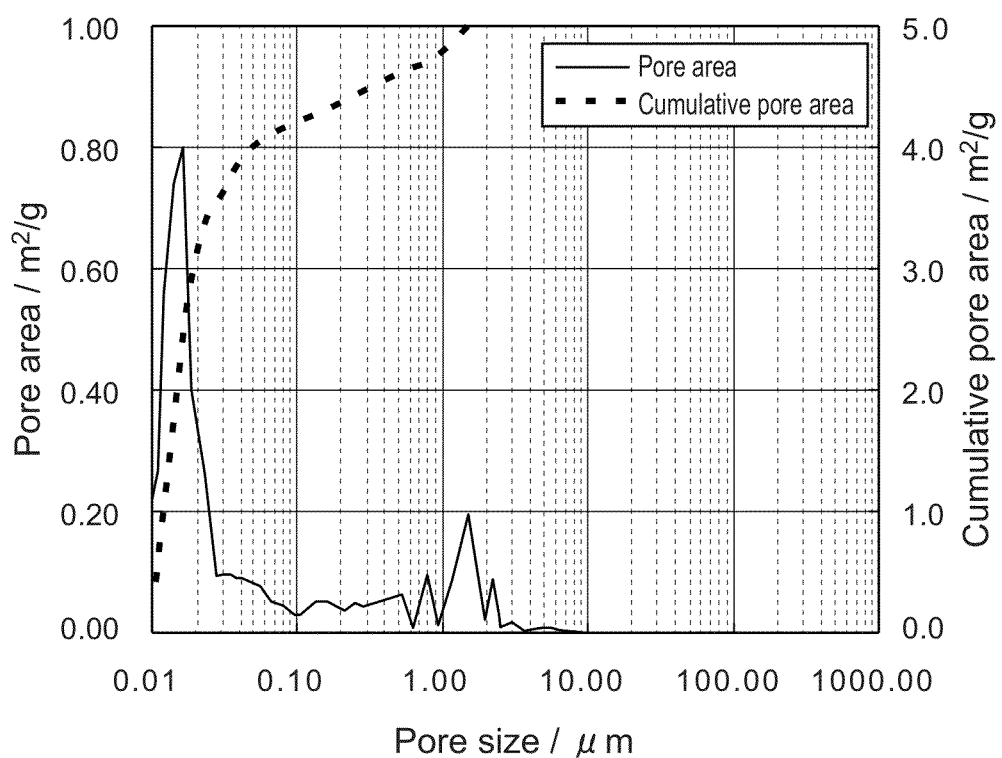
FIG. 34 is a graph showing the pore size and pore area distribution of the manganese oxide obtained in Comparative Example 1-1.

The electrolytic manganese dioxide particles had a pore volume fraction of 22.8% for pores with diameters of 10 µm or greater. The pore area ratio was 81.3% for pores with diameters of up to 0.1 µm. Also, the pore area ratio was 77.6% for pores with diameters of up to 0.05 µm. The particle size distribution of the electrolytic manganese dioxide particles is shown in FIG. 32, the pore size and pore volume distribution are shown in FIG. 33, and the pore size and pore area distribution are shown in FIG. 34.

Comparative Example 1-2

The electrolytic manganese dioxide particles of Comparative Example 1-1 were fired at 1050° C. to obtain manganese oxide for Comparative Example 1-2. The results are shown in Table 1.

The X-ray diffraction pattern of the obtained manganese oxide was the same pattern as JCPDS pattern No. 24-734 for trimanganese tetraoxide, and slightly similar to pattern No. 41-1442 for dimanganese trioxide. Thus, the obtained manganese oxide was a mixture of trimanganese tetraoxide and dimanganese trioxide. The oxidation number of manganese in the manganese oxide, as represented by $MnO_x$, was $x=1.35$.

Figure 35:
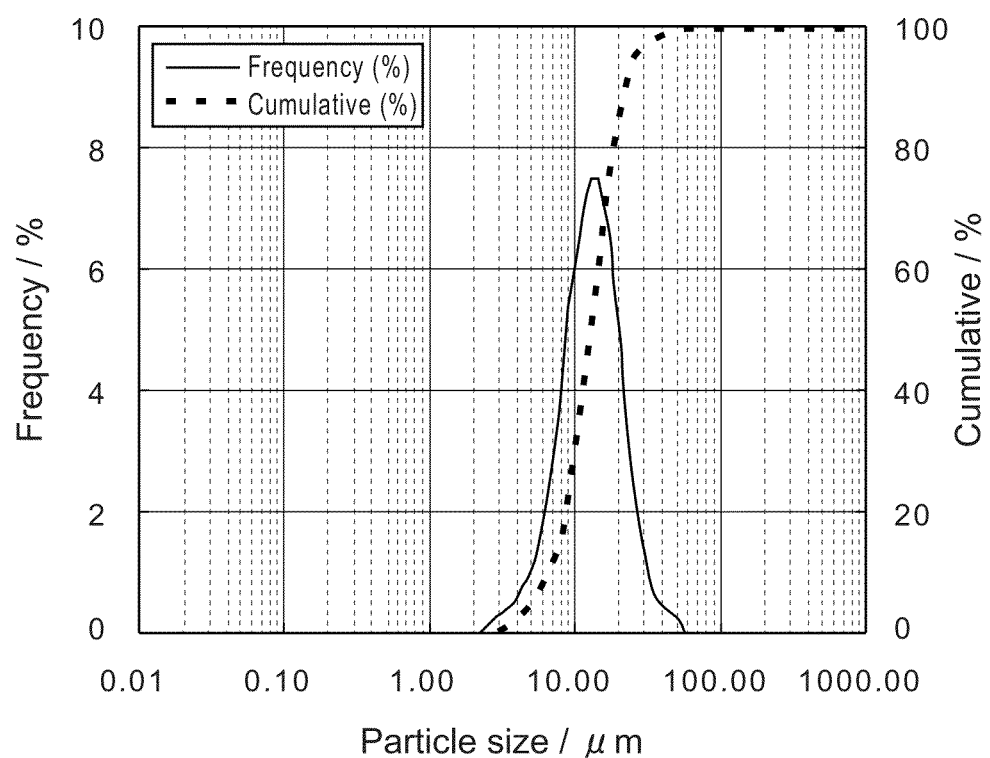
FIG. 35 is a graph showing the particle size distribution of the manganese oxide obtained in Comparative Example 1-2.
Figure 36:
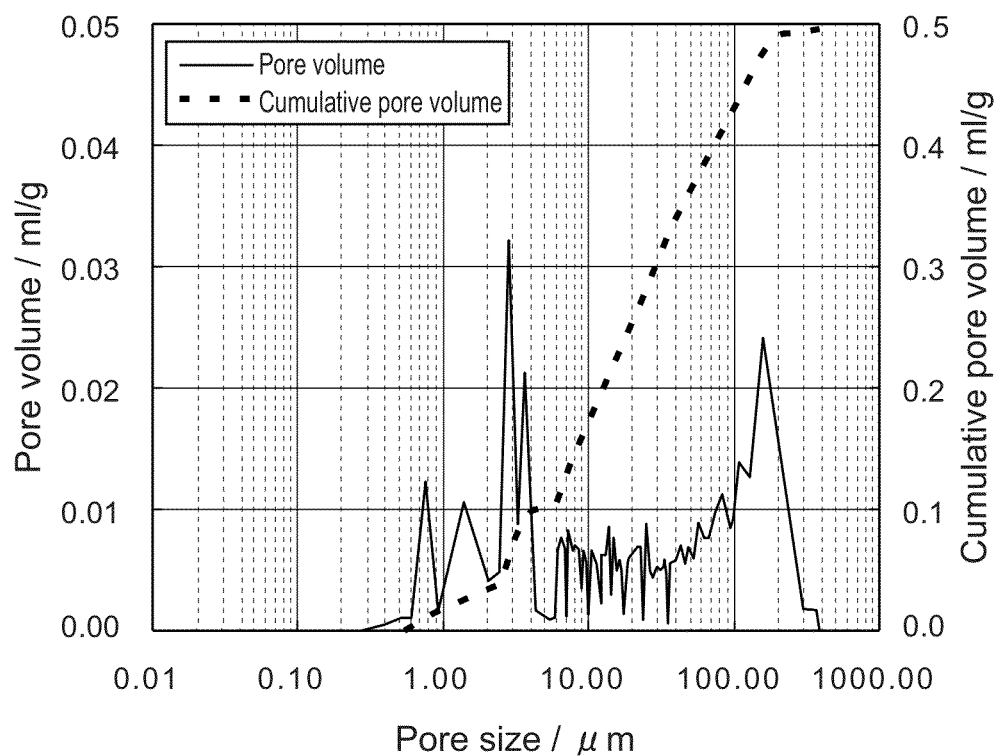
FIG. 36 is a graph showing the pore size and pore volume distribution of the manganese oxide obtained in Comparative Example 1-2.
Figure 37:
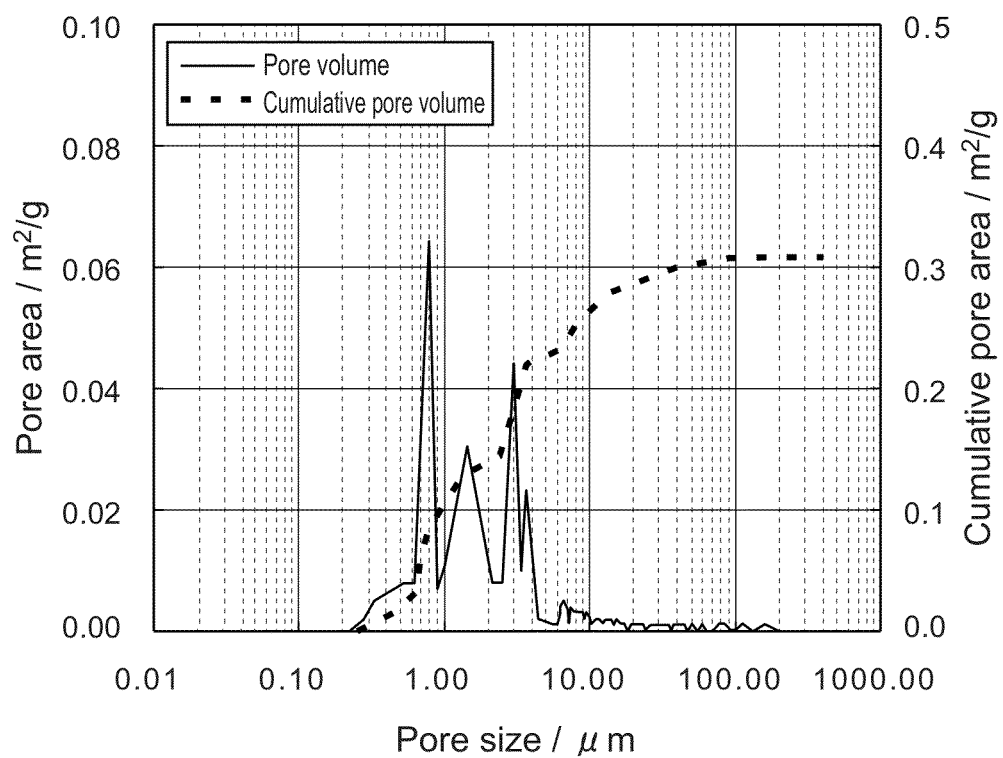
FIG. 37 is a graph showing the pore size and pore area distribution of the manganese oxide obtained in Comparative Example 1-2.

The BET specific surface area of the manganese oxide was 0.3 m²/g. The tap density was a low value of 1.4 g/cm³. The mode diameter of the manganese oxide was 13 µm, and the pore volume fraction was 66.1% for large pores with diameters of 10 µm or greater. The pore area ratio was 0% for pores with diameters of up to 0.1 µm. Also, the pore area ratio was 0% for pores with diameters of up to 0.05 µm. Thus, the trimanganese tetraoxide obtained by firing electrolytic manganese dioxide had numerous pores with diameters of 10 µm or greater. The particle size distribution of the electrolytic manganese dioxide particles is shown in FIG. 35, the pore size and pore volume distribution are shown in FIG. 36, and the pore size and pore area distribution are shown in FIG. 37.

Comparative Example 1-3

In a reaction tank with an internal volume of 1 L there was placed 500 mL of purified water. Nitrogen gas was blown into the purified water for 1 hour at a flow rate of 1 L/min. The purified water temperature was 25° C. while blowing in the nitrogen gas. The oxidation-reduction potential of the purified water into which the nitrogen gas had been blown in was −15 mV.

Next, a 2 mol/L aqueous manganese sulfate solution and a 2 mol/L aqueous sodium hydroxide solution were supplied and mixed as starting solutions with the purified water at the same flow rate so that the acid and alkali were equivalent, to obtain a reaction slurry. Mixing of the starting solutions was accomplished while blowing in nitrogen gas.

Mixing of the starting solutions was suspended when the volume of the reaction slurry reached 1000 mL. The time from initial supply of the starting solutions until completion was 30 hours. The pH of the reaction slurry during this time was 4 to 12, and the oxidation-reduction potential was −40 to −20 mV.

Also, 200 ml of a 6 wt % aqueous hydrogen peroxide solution was added over a period of 2 hours while stirring the reaction slurry at a temperature of 25° C., for oxidation of the reaction slurry. When addition of the aqueous hydrogen peroxide solution was complete, stirring was continued for 1 hour for ageing of the reaction slurry. After ageing, the reaction slurry in the reaction tank was filtered and rinsed to obtain a product. The obtained product was dried at 100° C. to obtain manganese oxide for Comparative Example 1-3. The evaluation results are shown in Table 1.

The X-ray diffraction pattern of the obtained manganese oxide was the same pattern as the X-ray diffraction pattern of JCPDS pattern No. 24-734. The structure of the manganese oxide was a spinel structure. The oxidation number of manganese, as represented by $MnO_x$, was x=1.33. These results indicated that the obtained manganese oxide was a monophase of trimanganese tetraoxide. However, the tap density of the manganese oxide was a low value of 1.0 g/cm$^3$. The BET specific surface area was 18.9 m$^2$/g.

The mode diameter of the manganese oxide was 6.5 μm. Peaks were observed near 1 μm and near 50 μm, and the particle size distribution was wide. The peak near 1 μm is attributed to ungrown particles during conversion from manganese hydroxide to trimanganese tetraoxide. The peak near 50 μm, on the other hand, is attributed to the backbone of the manganese hydroxide particles before oxidation, and to manganese oxide after oxidation.

The pore volume fraction was 23.6% for pores with diameters of 10 μm or greater, and the pore area ratio was 21.6% for pores with diameters of up to 0.1 μm. Also, the pore area ratio was 5.2% for pores with diameters of up to 0.05 μm.

Also, upon completing supply of the starting solutions, a portion of the reaction slurry before addition of the aqueous hydrogen peroxide solution was recovered and promptly filtered and rinsed, and dried at 80° C. to obtain a product. Upon measuring the XRD pattern of the product, peaks for the laminar manganese oxide β-MnOOH and for trimanganese tetraoxide were confirmed. The product was a mixture of β-MnOOH and trimanganese tetraoxide. These were produced by non-uniform oxidation of manganese hydroxide.

Figure 41:
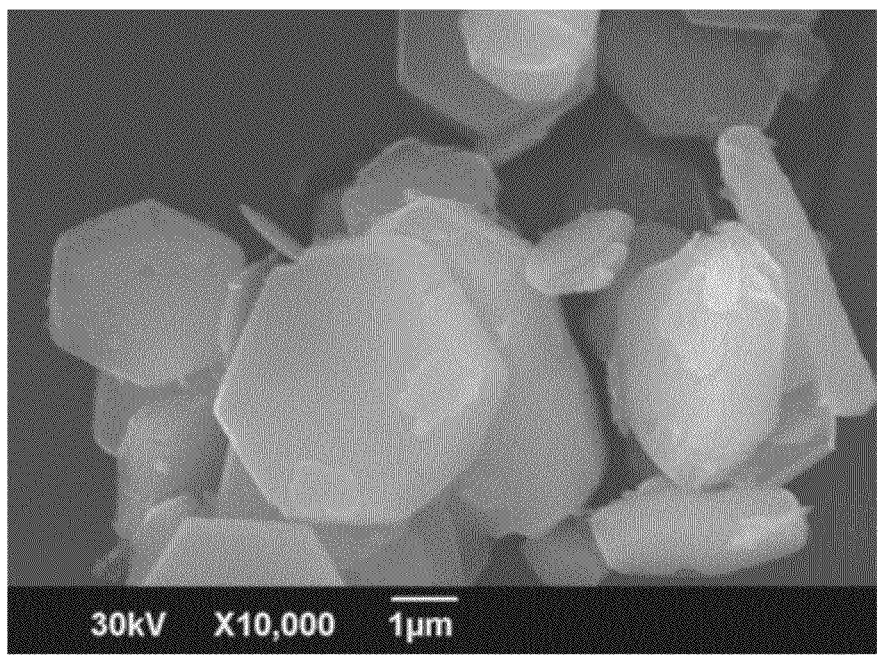
FIG. 41 is a scanning electron micrograph (10,000× magnification) of the product obtained by drying the reaction slurry before addition of hydrogen peroxide in Comparative Example 1-3.
Figure 42:
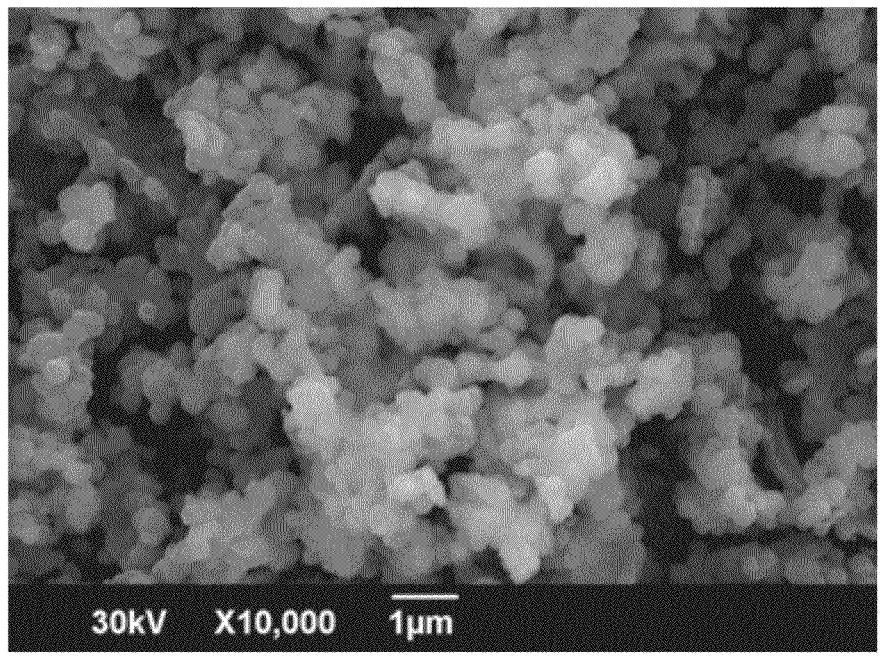
FIG. 42 is a scanning electron micrograph (10,000× magnification) of the manganese oxide obtained in Comparative Example 1-3.

FIG. 41 is a scanning electron micrograph (10,000× magnification) of the product obtained by drying the reaction slurry before addition of hydrogen peroxide. FIG. 42 is a scanning electron micrograph (10,000× magnification) of the manganese oxide obtained in Comparative Example 1-3. As shown in FIG. 42, SEM observation revealed hexagonal plate-like particles in the manganese oxide, derived from manganese hydroxide crystals. This result allowed confirmation that manganese hydroxide had precipitated.

Figure 38:
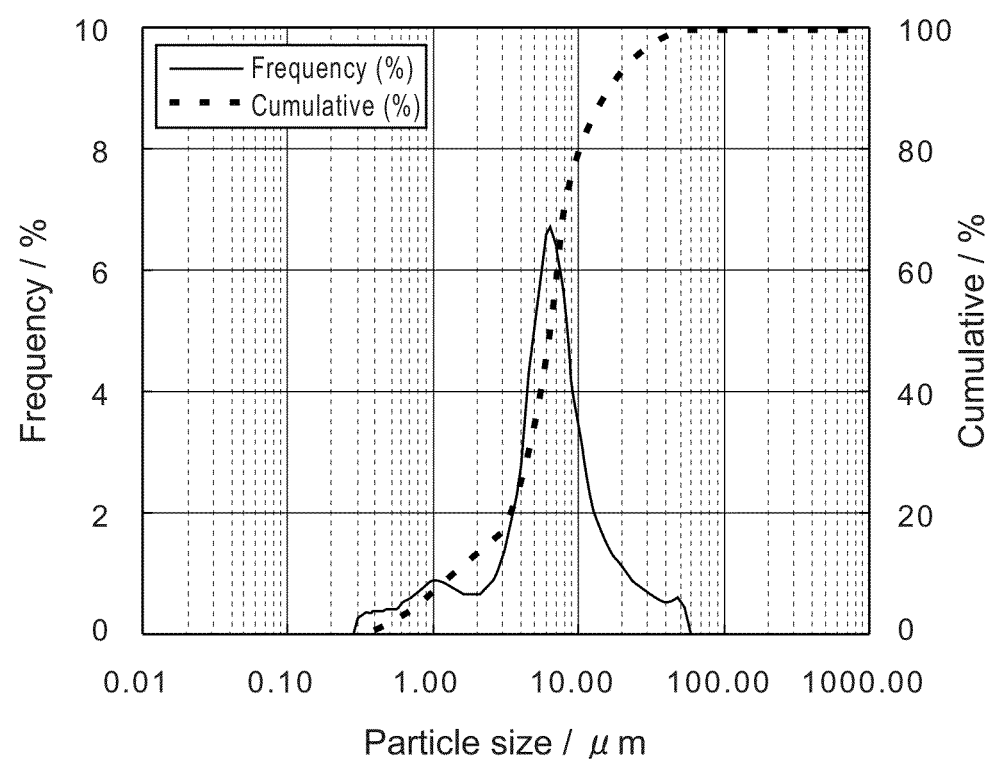
FIG. 38 is a graph showing the particle size distribution of the manganese oxide obtained in Comparative Example 1-3.
Figure 39:
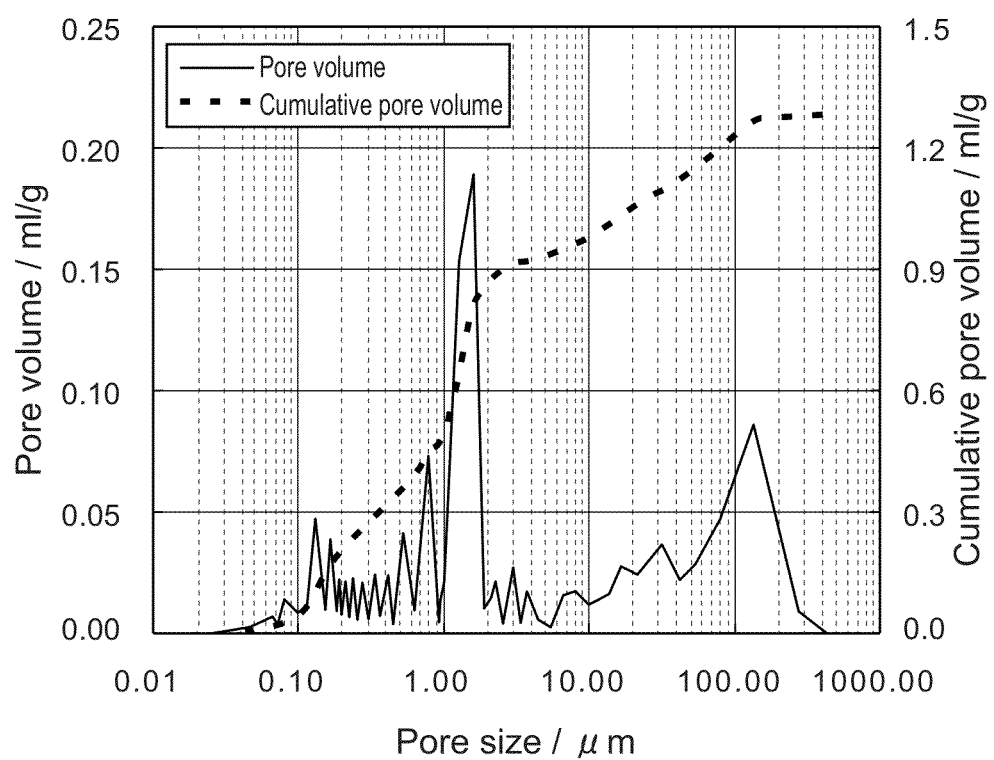
FIG. 39 is a graph showing the pore size and pore volume distribution of the manganese oxide obtained in Comparative Example 1-3.
Figure 40:
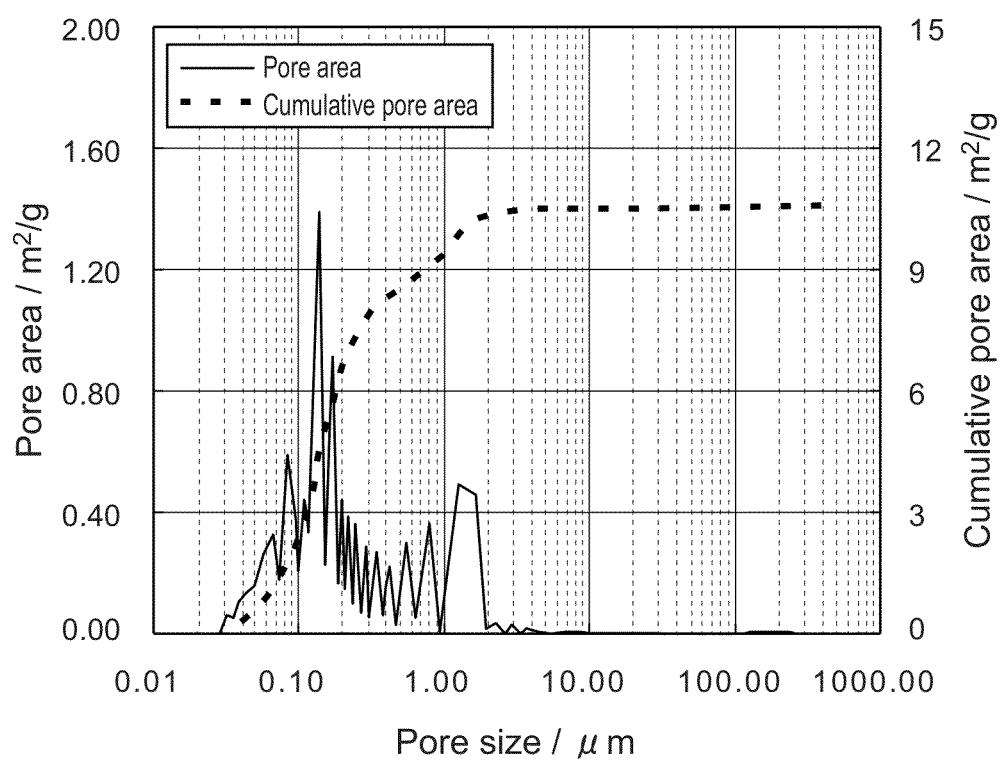
FIG. 40 is a graph showing the pore size and pore area distribution of the manganese oxide obtained in Comparative Example 1-3.

Thus, the manganese oxide of Comparative Example 1-3 was shown to be trimanganese tetraoxide obtained by oxidation of the precipitated laminar manganese hydroxide. The trimanganese tetraoxide obtained from manganese hydroxide thus had very low tap density and a wide pore distribution. The particle size distribution of the manganese oxide is shown in FIG. 38, the pore size and pore volume distribution are shown in FIG. 39, and the pore size and pore area distribution are shown in FIG. 40.

Comparative Example 1-4

Manganese oxide was obtained by the same method as Comparative Example 1-3, except that the temperature during oxidation of the reaction slurry with the aqueous hydrogen peroxide solution was 80° C. The evaluation results are shown in Table 1. The X-ray diffraction pattern of the obtained manganese oxide was the same pattern as the X-ray diffraction pattern of JCPDS pattern No. 24-734. The oxidation number of manganese, as represented by $MnO_x$, was x=1.34. These results indicated that the manganese oxide was a monophase of trimanganese tetraoxide.

The tap density of the manganese oxide was a low value of 0.9 g/cm$^3$, and the BET specific surface area was 37.0 m$^2$/g. The mode diameter of the manganese oxide was 0.4 μm. Peaks were observed near 3 μm and near 30 μm, and the manganese oxide had a wide particle size distribution.

The pore volume fraction was 30.5% for pores with diameters of 10 μm or greater, and the pore area ratio was 19.4% for pores with diameters of up to 0.1 μm. Also, the pore area ratio was 5.5% for pores with diameters of up to 0.05 μm.

Figure 43:
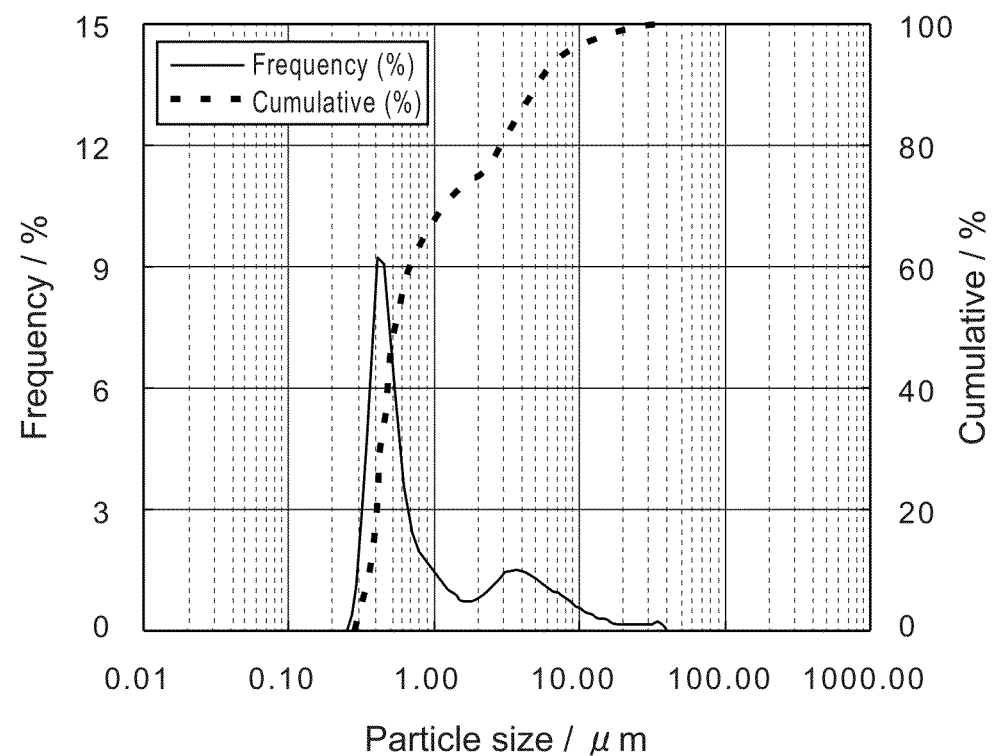
FIG. 43 is a graph showing the particle size distribution of the manganese oxide obtained in Comparative Example 1-4.
Figure 44:
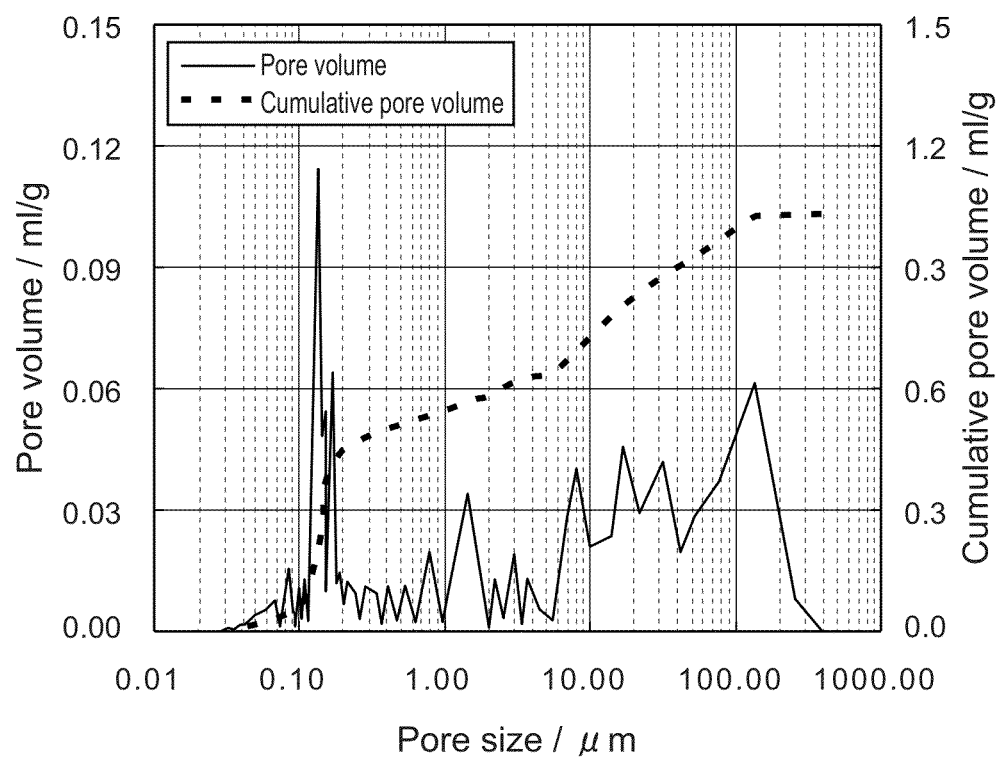
FIG. 44 is a graph showing the pore size and pore volume distribution of the manganese oxide obtained in Comparative Example 1-4.
Figure 45:
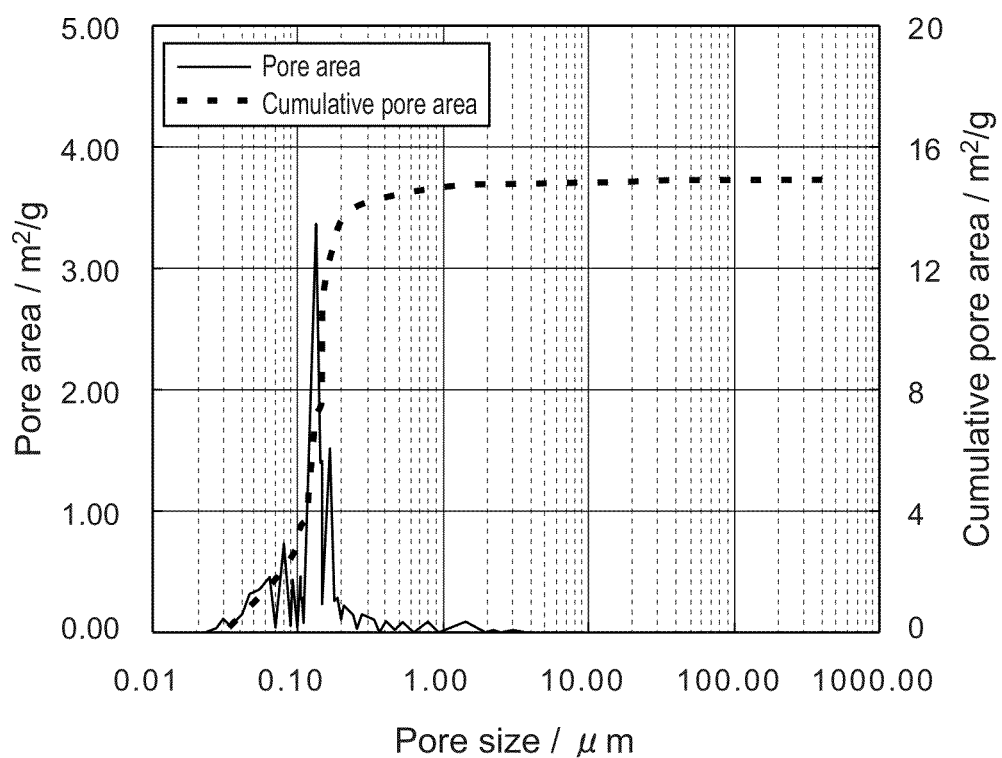
FIG. 45 is a graph showing the pore size and pore area distribution of the manganese oxide obtained in Comparative Example 1-4.

Thus, the manganese oxide was trimanganese tetraoxide obtained by oxidation of manganese hydroxide, as in Comparative Example 1-3. The packing density was therefore low and the pore distribution was wide. The particle size distribution of the manganese oxide is shown in FIG. 43, the pore size and pore volume distribution are shown in FIG. 44, and the pore size and pore area distribution are shown in FIG. 45.

Comparative Example 1-5

Manganese oxide was obtained in the same manner as Example 1-1, except for keeping the pH of the reaction slurry at 7 during supply of the starting solutions, and supplying the starting solutions while blowing in oxygen to maintain an oxidation-reduction potential of 50 mV.

Figure 46:
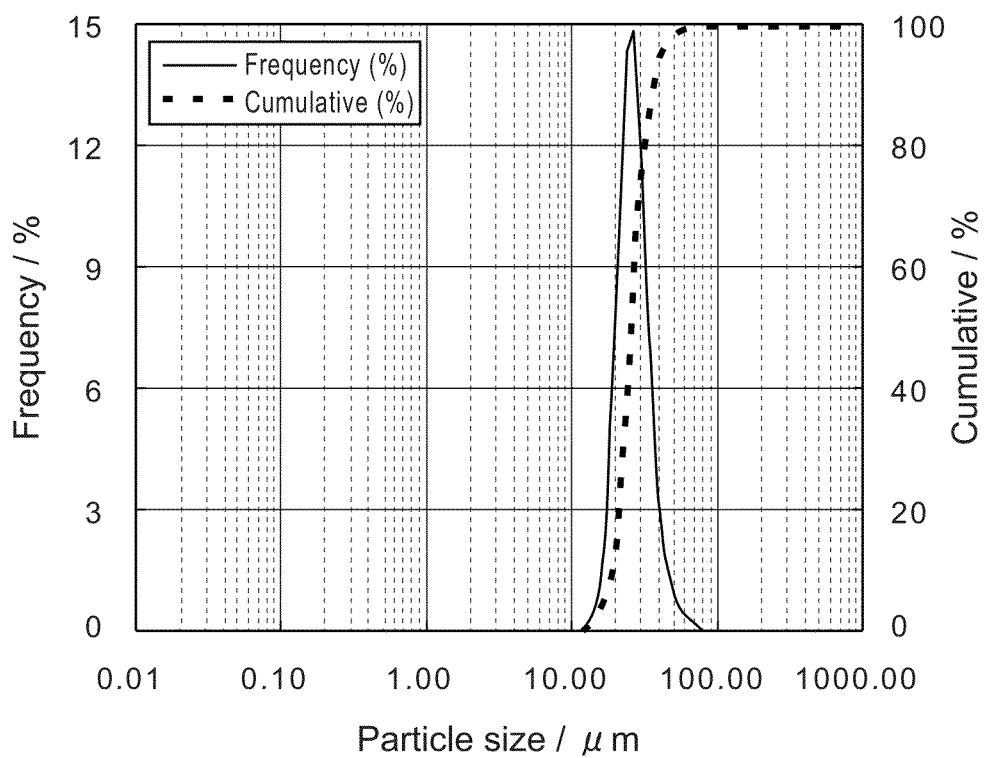
FIG. 46 is a graph showing the particle size distribution of the manganese oxide obtained in Comparative Example 1-5.
Figure 47:
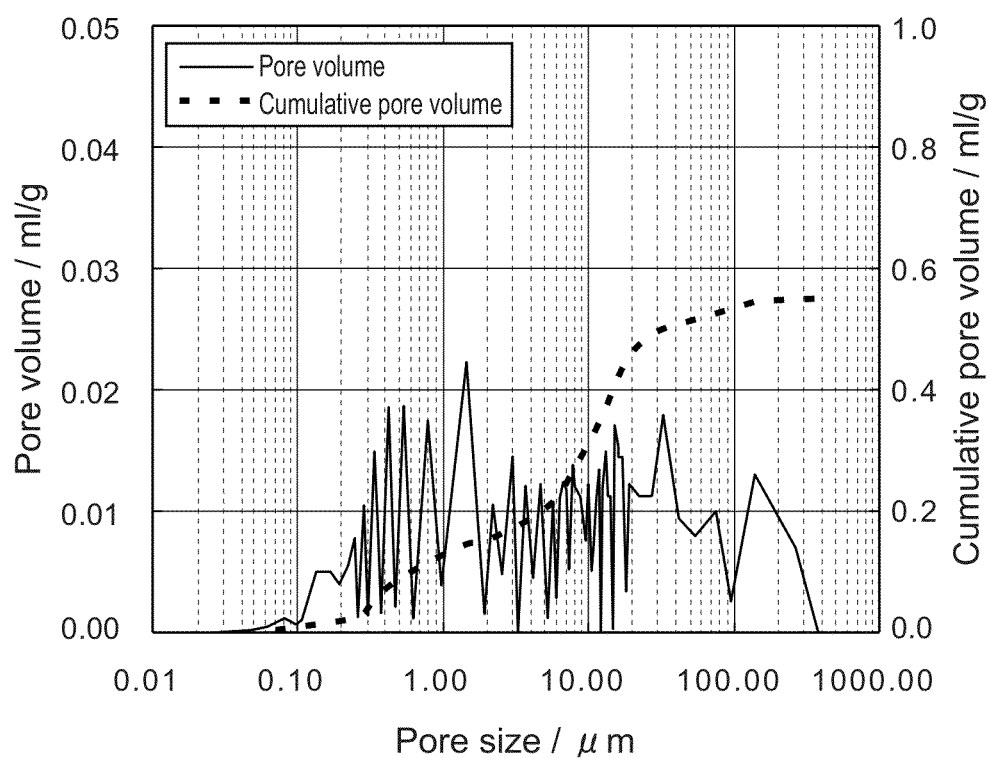
FIG. 47 is a graph showing the pore size and pore volume distribution of the manganese oxide obtained in Comparative Example 1-5.
Figure 48:
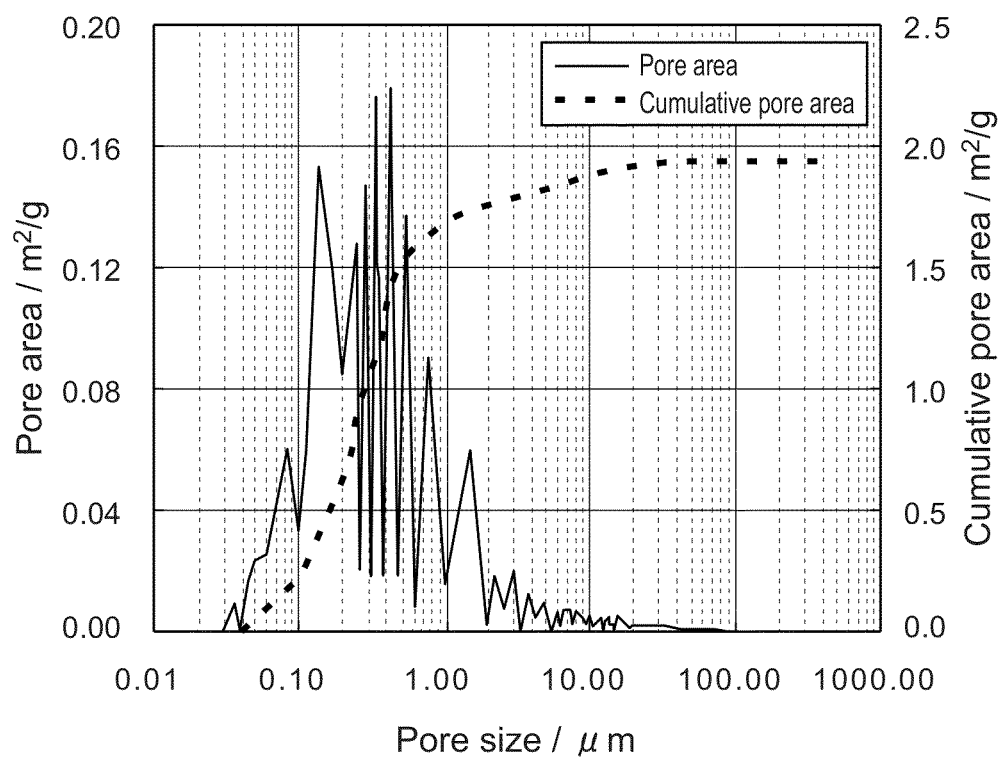
FIG. 48 is a graph showing the pore size and pore area distribution of the manganese oxide obtained in Comparative Example 1-5.

The obtained manganese oxide had low density, and the crystal phase was a multiphase of $Mn_3O_4$ and birnessite. Birnessite is manganese oxide formed by oxidation of manganese hydroxide. It was thus demonstrated that the manganese oxide of Comparative Example 1-5 was obtained via manganese hydroxide. The particle size distribution of the manganese oxide of Comparative Example 1-5 is shown in FIG. 46, the pore size and pore volume distribution are shown in FIG. 47, and the pore size and pore area distribution are shown in FIG. 48.

Comparative Example 1-6

Figure 49:
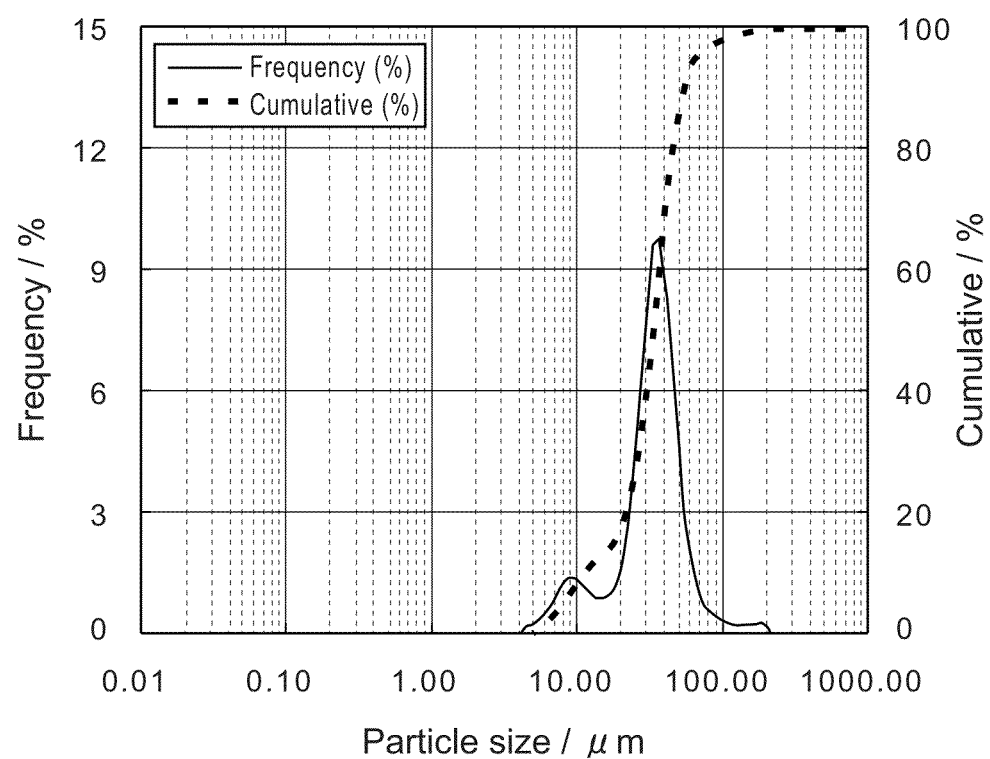
FIG. 49 is a graph showing the particle size distribution of the manganese oxide obtained in Comparative Example 1-6.
Figure 50:
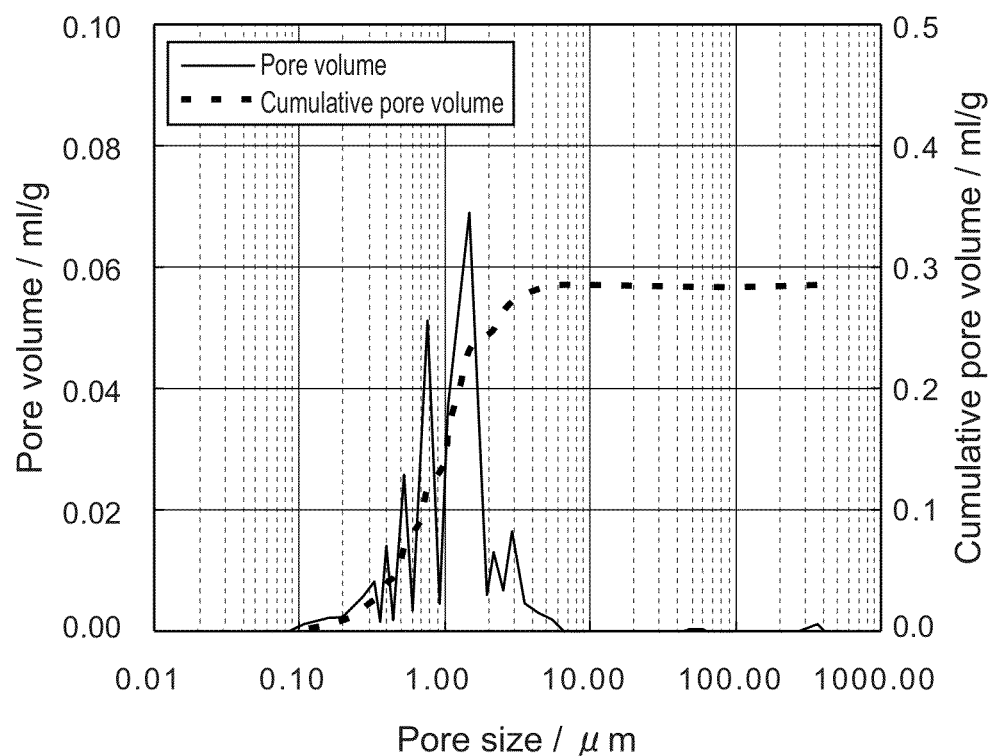
FIG. 50 is a graph showing the pore size and pore volume distribution of the manganese oxide obtained in Comparative Example 1-6.
Figure 51:
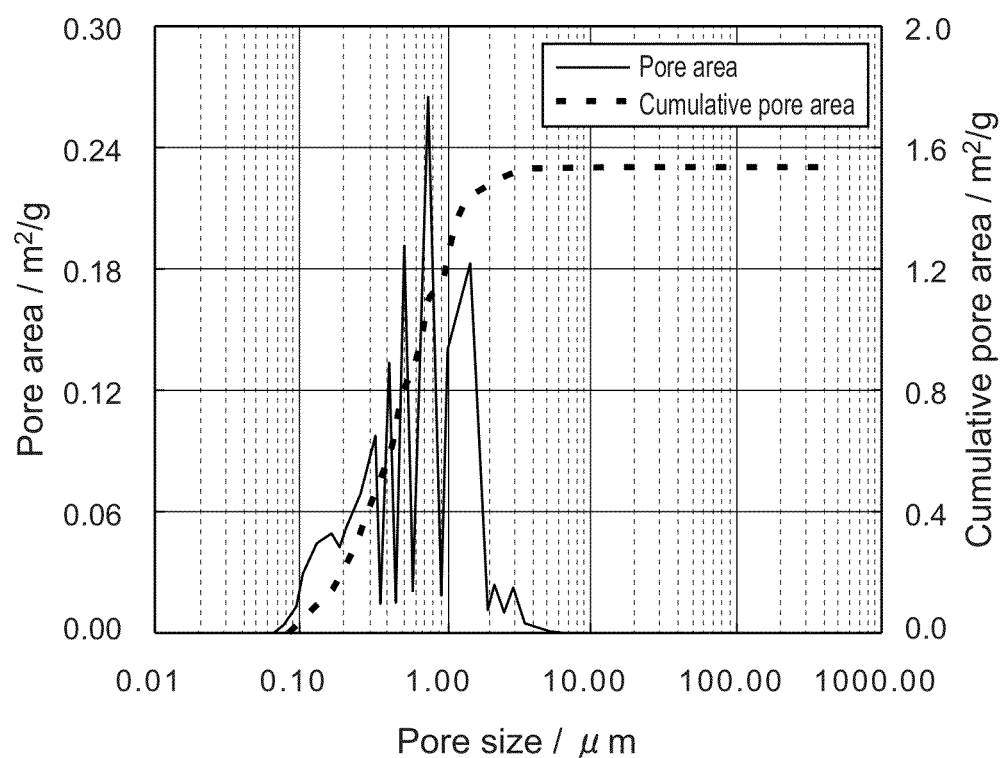
FIG. 51 is a graph showing the pore size and pore area distribution of the manganese oxide obtained in Comparative Example 1-6.

Manganese oxide was obtained in the same manner as Example 1-1, except for keeping the temperature of the reaction slurry at 50° C. during supply of the starting solutions, keeping the pH at 8, and using ammonia water as the aqueous alkali solution. The obtained manganese oxide was a monophase of $Mn_3O_4$. However, due to the co-presence of ammonia, it was obtained via manganese hydroxide without direct crystallization of $Mn_3O_4$ from manganese sulfate. The packing density of the obtained manganese oxide was therefore low. The particle size distribution of the manganese oxide of Comparative Example 1-6 is shown in FIG. 49, the pore size and pore volume distribution are shown in FIG. 50, and the pore size and pore area distribution are shown in FIG. 51.

TABLE 1

| Sample | x in $MnO_x$ | Crystal phase | BET specific surface area ($m^2/g$) | Tap density ($g/cm^3$) | Mode diameter ($\mu m$) | Volume fraction of pores $\geq 10\ \mu m$ (%) | Area ratio of pores $\leq 0.1\ \mu m$ (%) | Area ratio of pores $\leq 0.05\ \mu m$ (%) |
|---|---|---|---|---|---|---|---|---|
| Example 1-1 | 1.33 | $Mn_3O_4$ | 1.5 | 1.8 | 8 | 9.6 | 1.2 | 0 |
| Example 1-2 | 1.34 | $Mn_3O_4$ | 1.4 | 1.9 | 10 | 8.6 | 1.7 | 0 |
| Example 1-3 | 1.34 | $Mn_3O_4$ | 1.0 | 2.2 | 20 | 9.1 | 5.1 | 0 |
| Example 1-4 | 1.34 | $Mn_3O_4$ | 1.1 | 1.7 | 9 | 7.7 | 0 | 0 |
| Example 1-5 | 1.33 | $Mn_3O_4$ | 0.4 | 2.3 | 20 | 13.8 | 0 | 0 |
| Example 1-6 | 1.34 | $Mn_3O_4$ | 0.3 | 2.4 | 22 | 15.3 | 0 | 0 |
| Example 1-7 | 1.33 | $Mn_3O_4$ | 0.6 | 1.8 | 12 | 7.5 | 0 | 0 |
| Example 1-8 | 1.38 | $Mn_3O_4$ | 1.3 | 1.7 | 14 | 10.0 | 0 | 0 |
| Example 1-9 | 1.35 | $Mn_3O_4$ | 2.0 | 2.4 | 14 | 10.0 | 0 | 0 |
| Example 1-10 | 1.35 | $Mn_3O_4$ | 1.0 | 1.6 | 19 | 18.1 | 0 | 0 |
| Comp. Ex. 1-1 | 1.98 | EMD | 40.0 | 1.9 | 11 | 22.8 | 81.3 | 77.6 |
| Comp. Ex. 1-2 | 1.35 | $Mn_3O_4$ + $Mn_2O_3$ | 0.3 | 1.4 | 13 | 66.1 | 0 | 0 |
| Comp. Ex. 1-3 | 1.33 | $Mn_3O_4$ | 18.9 | 1.0 | 6.5 | 23.6 | 21.6 | 5.2 |
| Comp. Ex. 1-4 | 1.33 | $Mn_3O_4$ | 37.0 | 0.9 | 0.4 | 30.5 | 19.4 | 5.5 |
| Comp. Ex. 1-5 | — | $Mn_3O_4$ + birnessite | 1.8 | 1.4 | 26 | 42.2 | 14 | 2.9 |
| Comp. Ex. 1-6 | 1.35 | $Mn_3O_4$ | 1.7 | 1.5 | 31 | 0.3 | 0 | 0 |

[Synthesis of Lithium Manganese-based Oxide]

Example 1-11

The trimanganese tetraoxide obtained in Example 1-1 was mixed with lithium carbonate in a mortar, and the mixture was fired in an air stream at 800° C. for 12 hours, to obtain a complex oxide comprising Li and Mn as constituent elements. The obtained lithium manganese composite oxide was a monophase spinel structure, with the composition $Li_{1.12}Mn_{1.88}O_4$. Table 2 shows the evaluation results for the obtained lithium manganese composite oxide.

Comparative Example 1-7

A complex oxide comprising Li and Mn as constituent elements was obtained by the same method as Example 1-11, except that the trimanganese tetraoxide obtained in Comparative Example 1-1 was used. The obtained lithium manganese composite oxide was a monophase spinel structure, with the composition $Li_{1.12}Mn_{1.88}O_4$. Table 2 shows the evaluation results for the obtained lithium manganese composite oxide.

TABLE 2

| Sample | Crystal phase | Composition | Lattice constant (Å) | BET specific surface area ($m^2/g$) | Mode diameter ($\mu m$) | Tap density ($g/cm^3$) |
|---|---|---|---|---|---|---|
| Example 1-11 | LiMn spinel monophase | $Li_{1.12}Mn_{1.78}O_4$ | 8.21 | 0.4 | 11 | 1.73 |
| Comp. Ex. 1-7 | LiMn spinel monophase | $Li_{1.12}Mn_{1.78}O_4$ | 8.21 | 1.5 | 10 | 1.70 |

[Fabrication of Lithium Secondary Battery]

The lithium manganese composite oxides obtained in Example 1-11 and Comparative Example 1-7 were mixed with acetylene black as a conductive agent, polyvinylidene fluoride as a binder and N-methylpyrrolidone as a solvent. The mixing ratio was as follows.

Lithium manganese composite oxide:acetylene black: polyvinylidene fluoride=66 wt %:17 wt %:17 wt %

The obtained slurry mixture was coated onto an aluminum foil and vacuum dried at a temperature of 150° C. for 16 hours, to prepare a positive electrode mixture sheet. The thickness of the dried positive electrode mixture sheet without the aluminum foil was approximately 40 μm.

The positive electrode mixture sheet was punched into a circle with a diameter of 16 mm, to fabricate a positive electrode for a battery. The model lithium secondary battery shown in FIG. 52 was constructed using a negative electrode comprising the obtained positive electrode for a battery and a metal lithium foil (thickness: 0.2 mm), and an electrolyte solution. The electrolyte solution was prepared by dissolving lithium hexafluoride phosphate in a mixed solvent of ethylene carbonate and diethyl carbonate to a concentration of 1 mol/$dm^3$.

Figure 52:
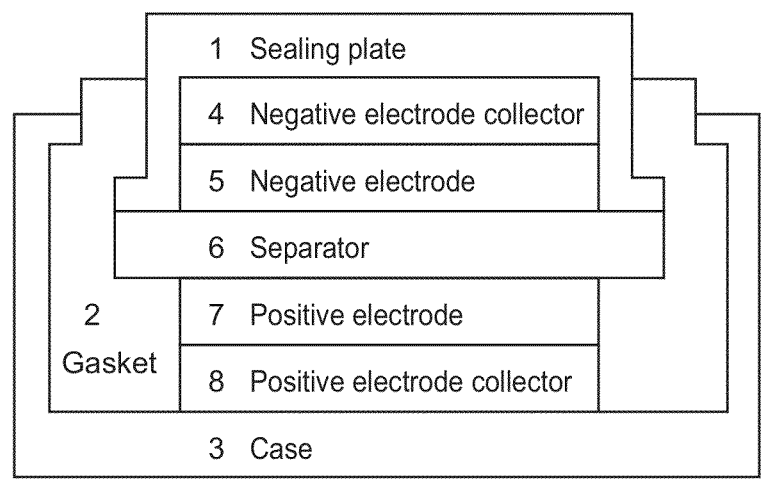
FIG. 52 is a schematic diagram showing the cross-sectional structure of a lithium secondary battery fabricated for the examples.

The lithium secondary battery shown in FIG. 52 has a layered structure comprising a separator 6, a negative electrode 5 and a negative electrode collector 4 layered on one side of the separator 6, in that order from the separator 6 side, and a positive electrode 7 and a positive electrode collector 8 layered on the other side of the separator 6, in that order from the separator 6 side. The lithium battery also has a sealing plate 1 formed on one side of the separator 6 and covering the negative electrode 5 and negative electrode collector 4, and a gasket 2 covering the edges of the separator 6, positive electrode 7 and positive electrode collector 8, and a part of the sealing plate 1.

[Evaluation of Lithium Secondary Battery Performances]

This model battery was used to evaluate the cell performance under the following conditions. The service capacity $C_{0.1}$ (mAh/g) was measured with the discharge current per 1 g of lithium manganese composite oxide, as the positive electrode active substance, set to a constant 0.1 A/g, and constant current discharge at a voltage of 4.5-3.0 V. Separately, constant current discharge was conducted with a discharge current of 5 A/g and a voltage of 4.5-1.0 V, and the service capacity with respect to the discharge curve during constant current discharge at 0.1 A/g was recorded as $C_5$. The obtained service capacity percentage (%) was determined and recorded as the utilization factor. Also, charge-discharge was repeated with a voltage of 3.0-4.5 V and a charge-discharge current of 0.1 A/g, and the ratio of the service capacity at the 1000the discharge with respect to the service capacity at the 10the discharge was determined as the cycle performance (%).

For measurement of the utilization factor, measurement was repeated at 0.1 A/g after measurement of $C_5$, and it was confirmed that each of the lithium manganese composite oxides had no change in service capacity, and no deterioration in the lithium manganese composite oxide during measurement of the utilization factor. The evaluation results are shown in Table 3.

TABLE 3

| Sample | Initial capacity (mAh/g) | Cycle performance (%, $1000^{th}/10^{th}$) | Rate capability (%, $C_5$[5 A/g]/ $C_{0.1}$[0.1 A/g]) |
|---|---|---|---|
| Example 1-11 | 100 | 84 | 15 |
| Comp. Ex. 1-7 | 102 | 72 | 13 |

A lithium secondary battery employing the lithium manganese composite oxide of Example 1-11 as the positive electrode active material exhibited satisfactory cell performance. The cycle performance and rate capability were particularly excellent.

[Production of Manganese Oxide]

Example 2-1

<Production of Trimanganese Tetraoxide>

To 300 ml of purified water there were added a 2 mol/L aqueous manganese sulfate solution and a 2 mol/L aqueous sodium hydroxide solution, and reaction was conducted while blowing in oxygen. The reaction was conducted with a temperature of 80° C. and a pH kept at 6.5±0.5.

During the reaction, the reaction mixture was appropriately sampled and the reaction product was observed by electron microscope and X-ray diffraction. The reaction product contained no $Mn(OH)_2$-derived hexagonal plate-like particles, and no γ-MnOOH-derived needle-like particles. These results confirmed that the reaction product of Example 2-1 was produced without conversion via manganese hydroxide.

After 100 hours of reaction, the reaction mixture was recovered, filtered and rinsed to obtain a product. The obtained product was dried at 100° C. to obtain trimanganese tetraoxide. The crystal phase of the obtained trimanganese tetraoxide was equivalent to JCPDS pattern No. 24-734, and it was a $Mn_3O_4$ monophase. The oxidation number of trimanganese tetraoxide, as represented by $MnO_x$, was x=1.33. The physical properties of the obtained trimanganese tetraoxide are shown in Table 4.

<Production of Dimanganese Trioxide>

Figure 53:
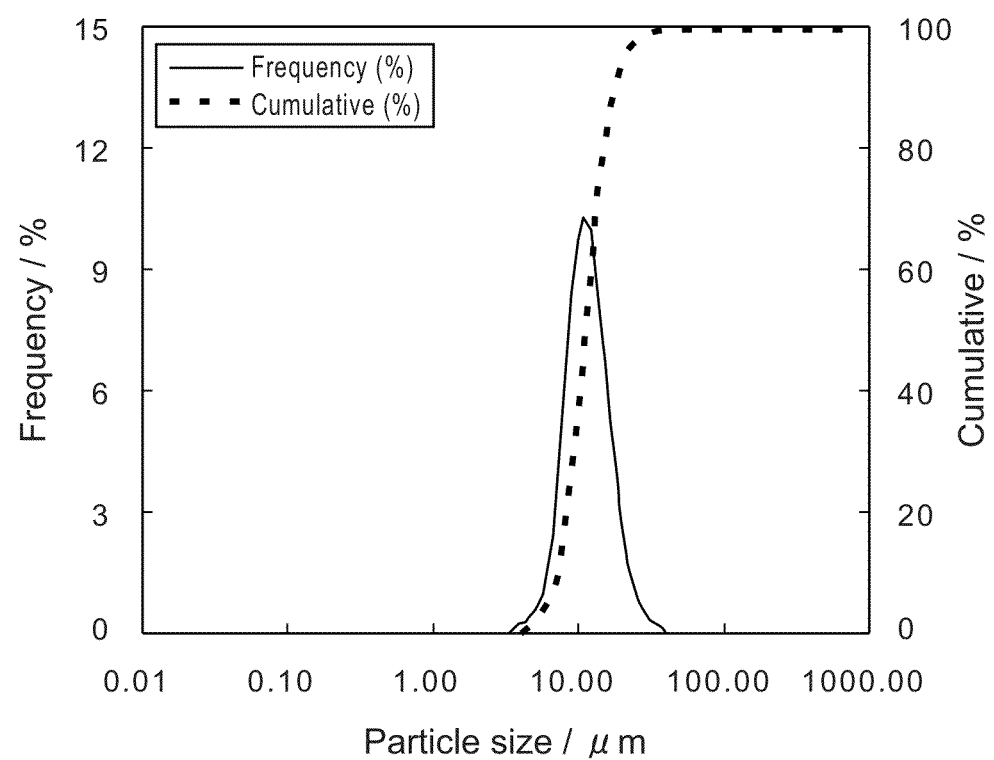
FIG. 53 is a graph showing the particle size distribution of the manganese oxide obtained in Example 2-1.
Figure 54:
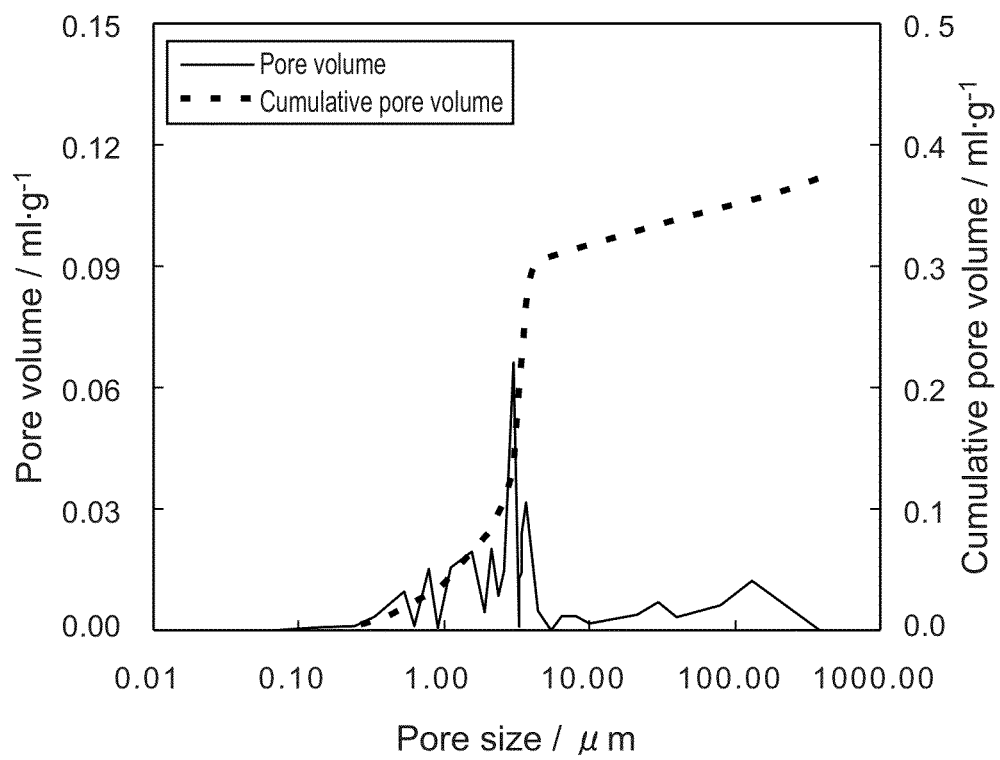
FIG. 54 is a graph showing the pore size and pore volume distribution of the manganese oxide obtained in Example 2-1.
Figure 55:
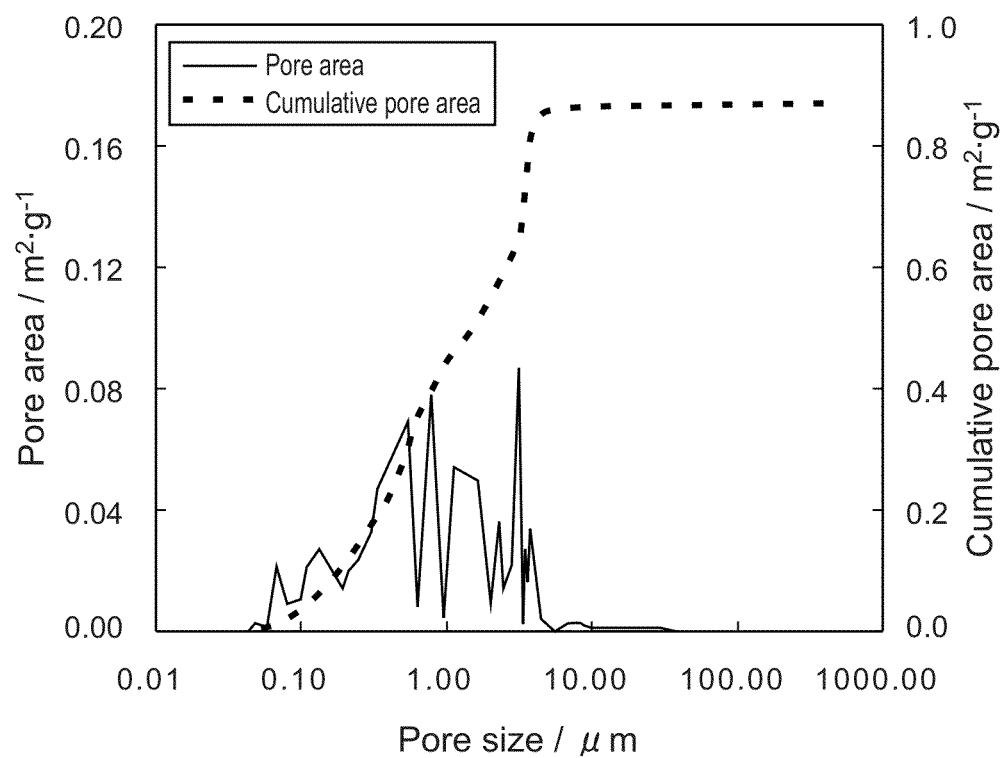
FIG. 55 is a graph showing the pore size and pore area distribution of the manganese oxide obtained in Example 2-1.

The obtained trimanganese tetraoxide was fired in air at 600° C. for 6 hours to obtain dimanganese trioxide. The evaluation results are shown in Table 5. The X-ray diffraction pattern of the obtained dimanganese trioxide was the same pattern as the X-ray diffraction pattern of JCPDS pattern No. 41-1442. The dimanganese trioxide of Example 2-1 was an α-dimanganese trioxide monophase. The particle size distribution of the dimanganese trioxide is shown in FIG. 53, the pore size and pore volume distribution are shown in FIG. 54, and the pore size and pore area distribution are shown in FIG. 55.

Example 2-2

The same procedure was carried out as in Example 2-1 to obtain manganese oxide, except that the pH was kept at 7.5±0.3 and the reaction temperature at 70° C. during the reaction. During the reaction, the reaction mixture was appropriately sampled and the reaction product was observed by electron microscope and X-ray diffraction. The reaction product contained no $Mn(OH)_2$-derived hexagonal plate-like particles, and no γ-MnOOH-derived needle-like particles. These results confirmed that the reaction product of Example 2-1 was produced without conversion via manganese hydroxide.

The crystal phase of the obtained manganese oxide was equivalent to JCPDS pattern No. 24-734, and it was a $Mn_3O_4$ monophase. The oxidation number of trimanganese tetraoxide, as represented by $MnO_x$, was x=1.34. The evaluation results for the obtained trimanganese tetraoxide are shown in Table 4.

Figure 56:
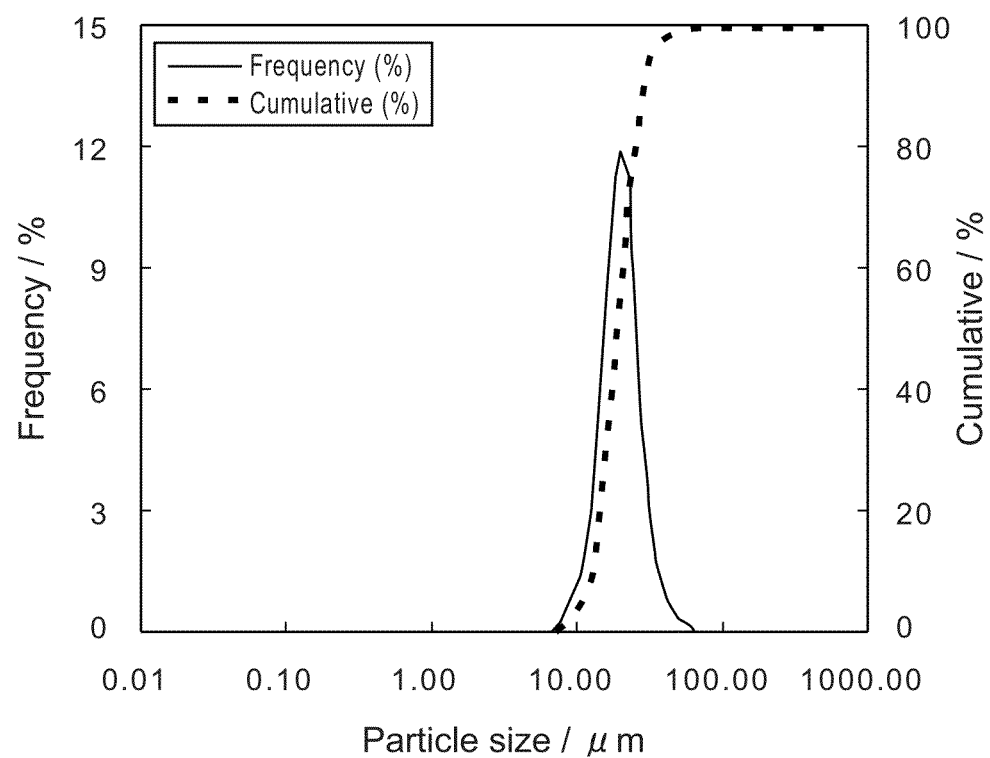
FIG. 56 is a graph showing the particle size distribution of the manganese oxide obtained in Example 2-2.
Figure 57:
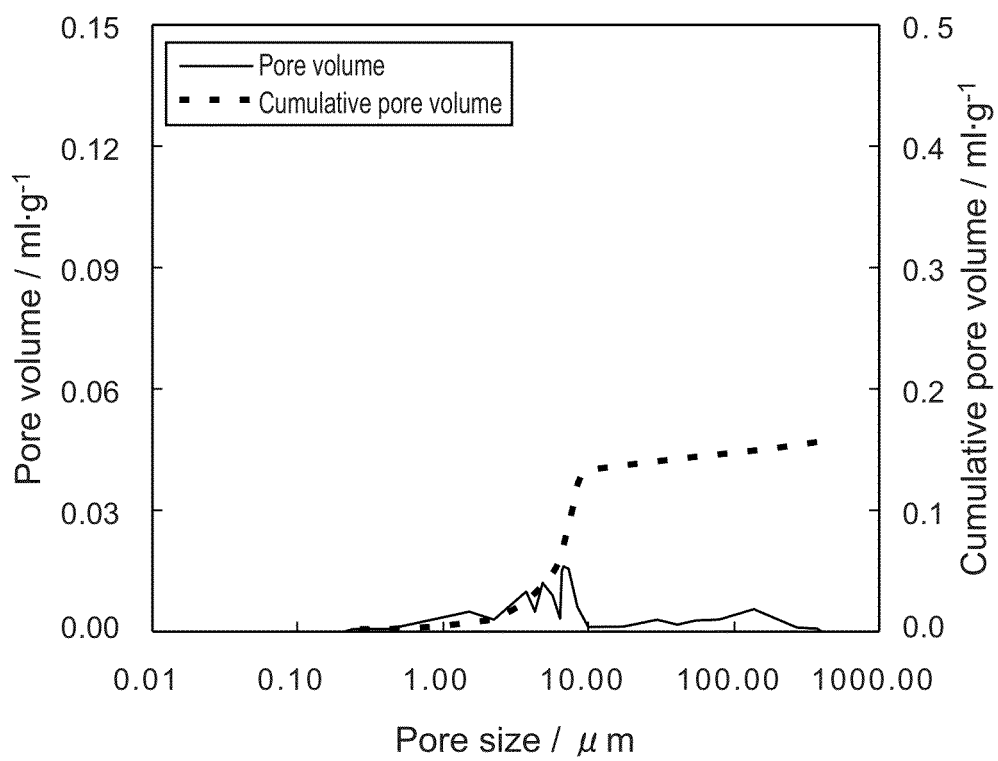
FIG. 57 is a graph showing the pore size and pore volume distribution of the manganese oxide obtained in Example 2-2.
Figure 58:
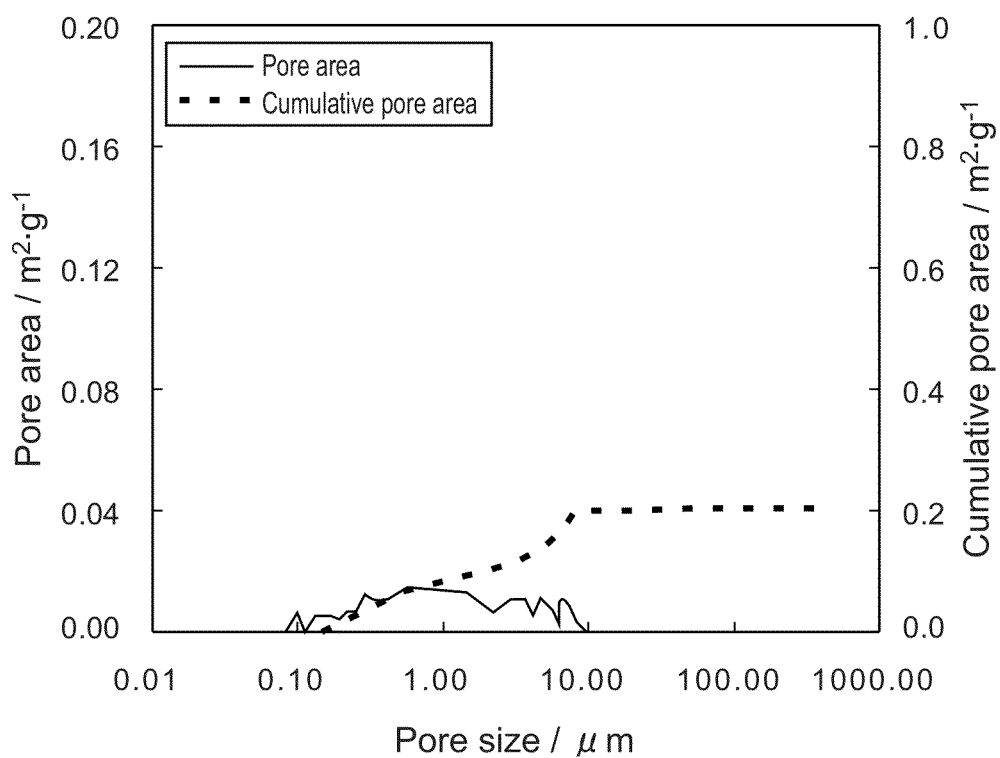
FIG. 58 is a graph showing the pore size and pore area distribution of the manganese oxide obtained in Example 2-2.

The obtained trimanganese tetraoxide was fired under the same conditions as Example 2-1 to obtain dimanganese trioxide. The evaluation results are shown in Table 5. The X-ray diffraction pattern of the obtained dimanganese trioxide was the same pattern as the X-ray diffraction pattern of JCPDS pattern No. 41-1442. The dimanganese trioxide of Example 2-2 was an α-dimanganese trioxide monophase. The particle size distribution of the dimanganese trioxide is shown in FIG. 56, the pore size and pore volume distribution are shown in FIG. 57, and the pore size and pore area distribution are shown in FIG. 58.

Example 2-3

Figure 59:
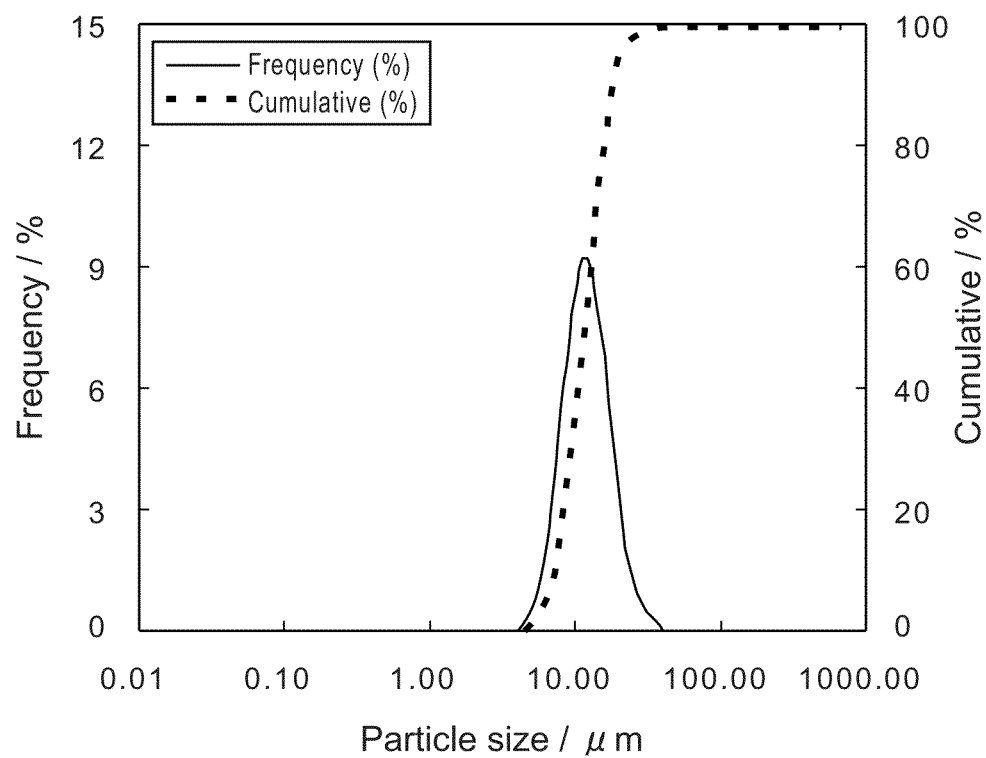
FIG. 59 is a graph showing the particle size distribution of the manganese oxide obtained in Example 2-3.
Figure 60:
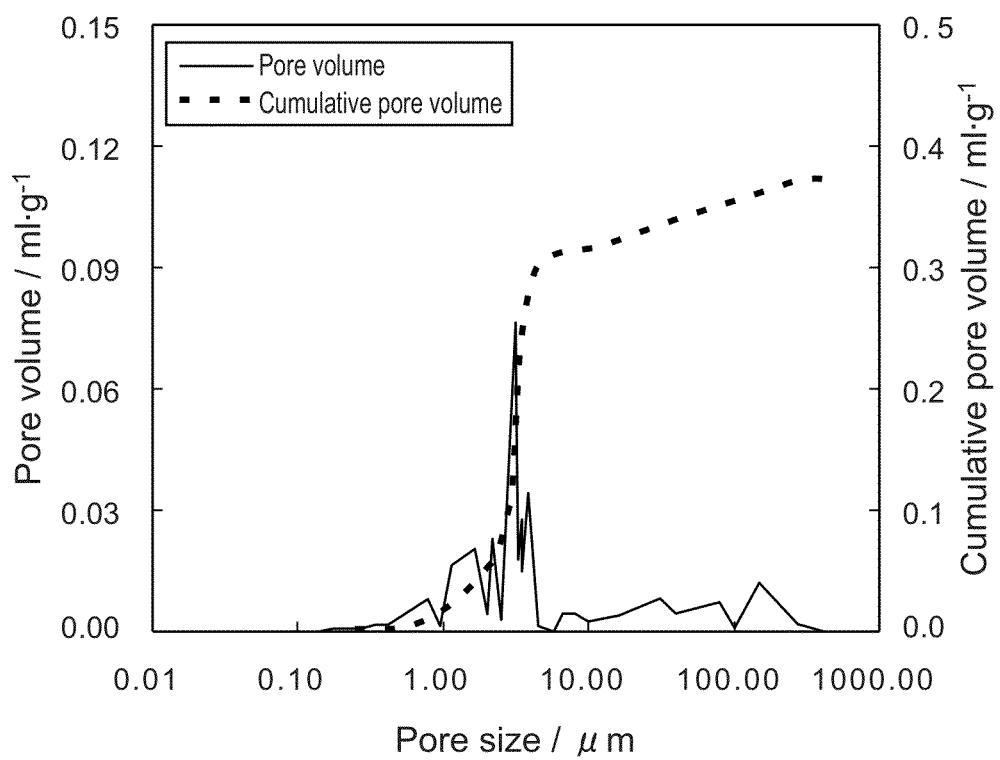
FIG. 60 is a graph showing the pore size and pore volume distribution of the manganese oxide obtained in Example 2-3.
Figure 61:
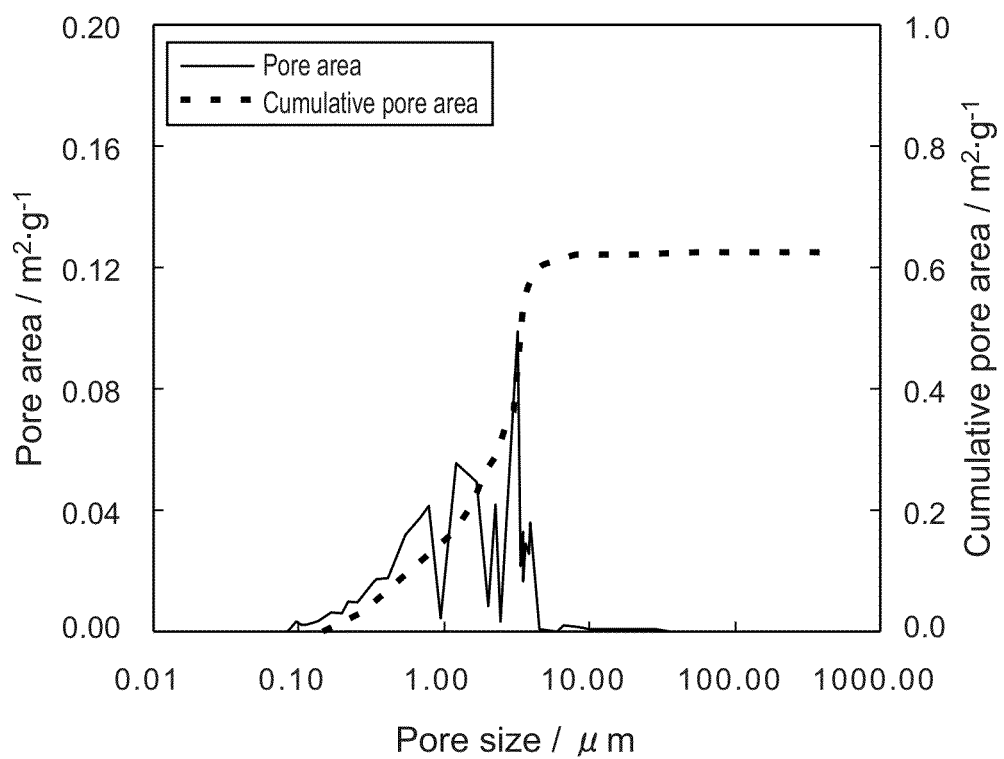
FIG. 61 is a graph showing the pore size and pore area distribution of the manganese oxide obtained in Example 2-3.

Trimanganese tetraoxide obtained by the same method as Example 2-1 was fired in air at 800° C. for 6 hours to obtain dimanganese trioxide. The evaluation results are shown in Table 5. The X-ray diffraction pattern of the obtained dimanganese trioxide was the same pattern as the X-ray diffraction pattern of JCPDS pattern No. 41-1442. The dimanganese trioxide of Example 2-3 was an α-dimanganese trioxide monophase. The particle size distribution of the dimanganese trioxide is shown in FIG. 59, the pore size and pore volume distribution are shown in FIG. 60, and the pore size and pore area distribution are shown in FIG. 61.

Example 2-4

Dimanganese trioxide was obtained by the same method as Example 2-1, except that the pH was kept at 7.5±0.3 and the reaction temperature at 50° C. during the reaction, and trimanganese tetraoxide was synthesized. The evaluation results are shown in Table 5.

Example 2-5

Dimanganese trioxide was obtained by the same method as Example 2-1, except that the pH was kept at 7.5±0.3 and the reaction temperature at 60° C. during the reaction, and trimanganese tetraoxide was synthesized. The evaluation results are shown in Table 5.

Comparative Example 2-1

Commercially available electrolytic manganese dioxide (product of Tosoh Huge Corp.) was crushed to obtain electrolytic manganese dioxide particles with a mode diameter of 10 The obtained electrolytic manganese dioxide was fired in air at 600° C. for 6 hours to obtain dimanganese trioxide. The evaluation results are shown in Table 5.

Figure 62:
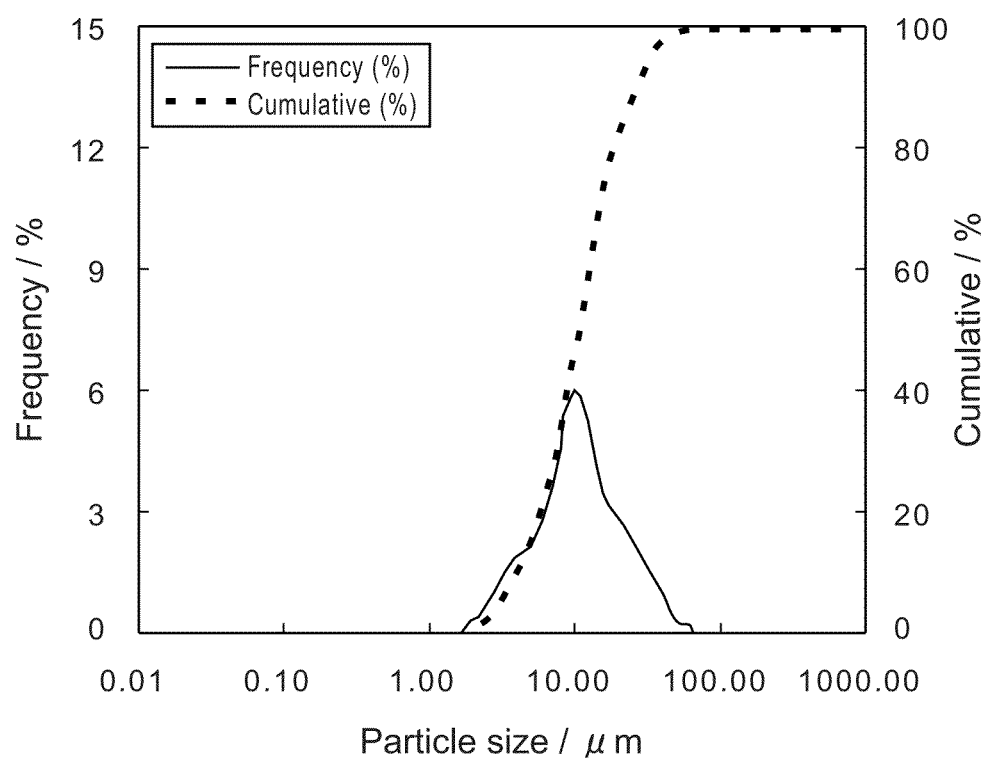
FIG. 62 is a graph showing the particle size distribution of the manganese oxide obtained in Comparative Example 2-1.
Figure 63:
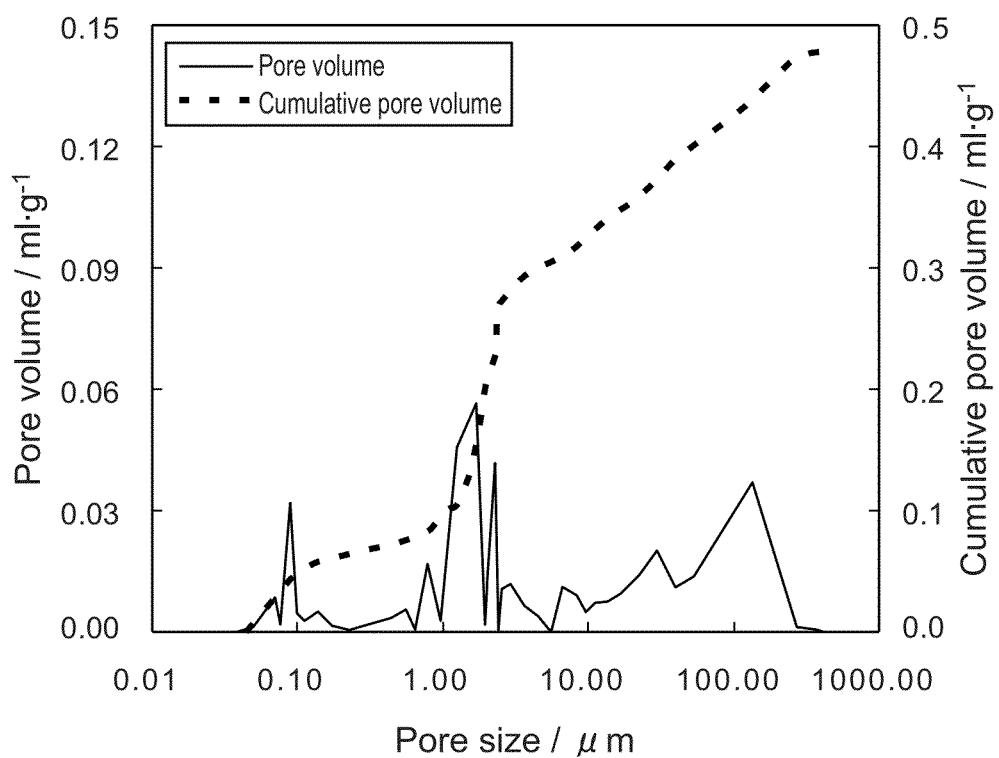
FIG. 63 is a graph showing the pore size and pore volume distribution of the manganese oxide obtained in Comparative Example 2-1.
Figure 64:
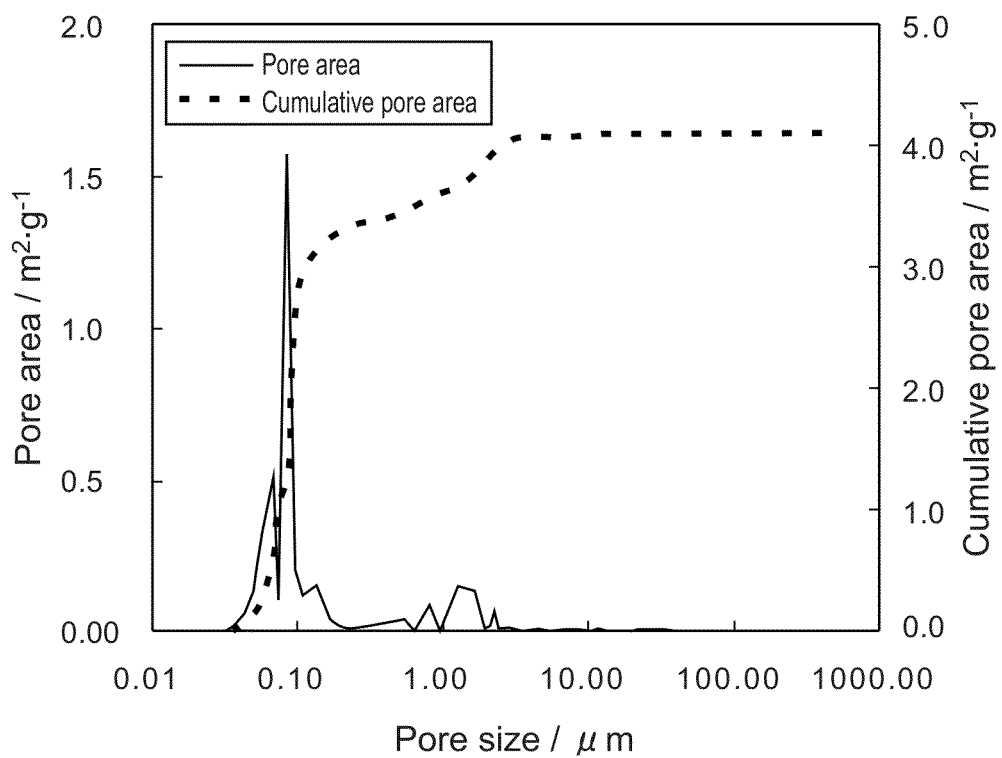
FIG. 64 is a graph showing the pore size and pore area distribution of the manganese oxide obtained in Comparative Example 2-1.

The X-ray diffraction pattern of the obtained dimanganese trioxide was the same pattern as the X-ray diffraction pattern of JCPDS pattern No. 41-1442. The dimanganese trioxide of Comparative Example 2-1 was an α-dimanganese trioxide monophase. The dimanganese trioxide had a high volume fraction for pores with diameters of 10 μm or greater, and a low tap density. The particle size distribution of the dimanganese trioxide is shown in FIG. 62, the pore size and pore volume distribution are shown in FIG. 63, and the pore size and pore area distribution are shown in FIG. 64.

Comparative Example 2-2

Commercially available electrolytic manganese dioxide (product of Tosoh Huge Corp.) was crushed to obtain electrolytic manganese dioxide particles with a mode diameter of 20 μm. The obtained electrolytic manganese dioxide was also fired in air at 600° C. for 6 hours to obtain dimanganese trioxide. The evaluation results are shown in Table 5.

The X-ray diffraction pattern of the obtained dimanganese trioxide was the same pattern as the X-ray diffraction pattern of JCPDS pattern No. 41-1442. The dimanganese trioxide of Comparative Example 2-2 was an α-dimanganese trioxide monophase.

Figure 65:
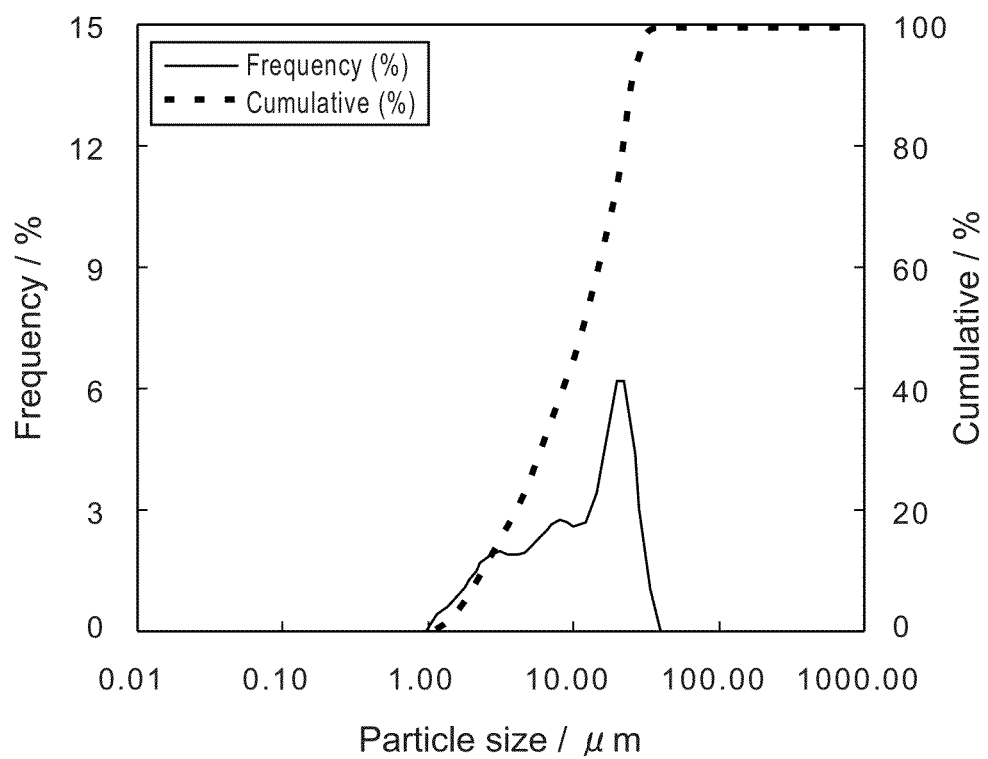
FIG. 65 is a graph showing the particle size distribution of the manganese oxide obtained in Comparative Example 2-2.
Figure 66:
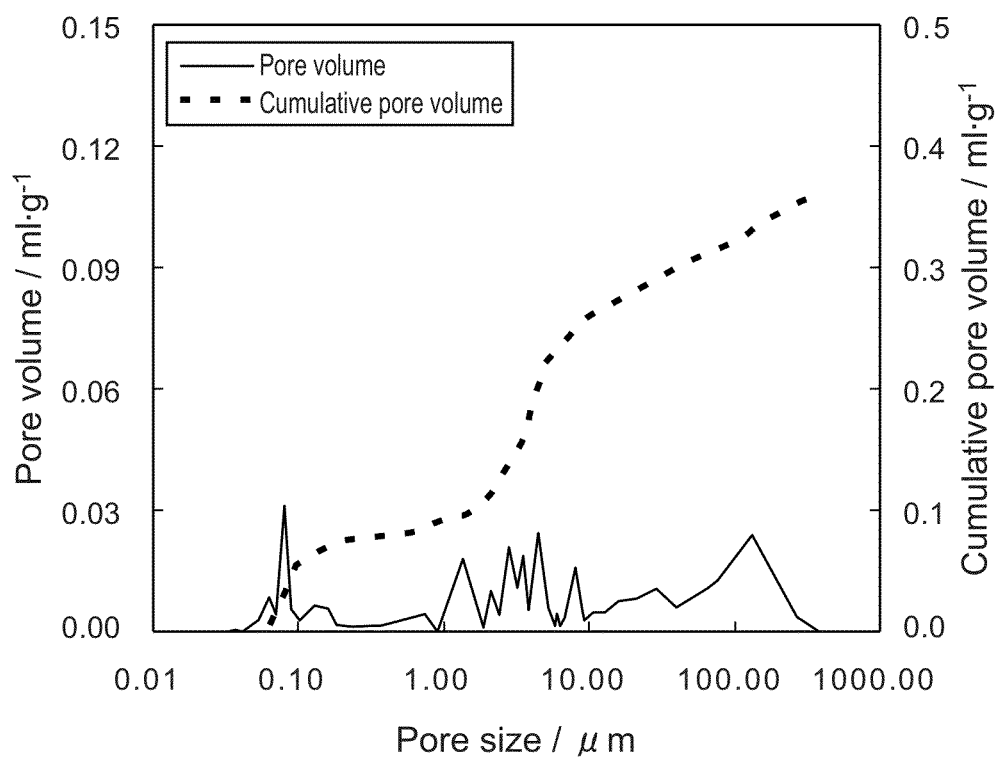
FIG. 66 is a graph showing the pore size and pore volume distribution of the manganese oxide obtained in Comparative Example 2-2.
Figure 67:
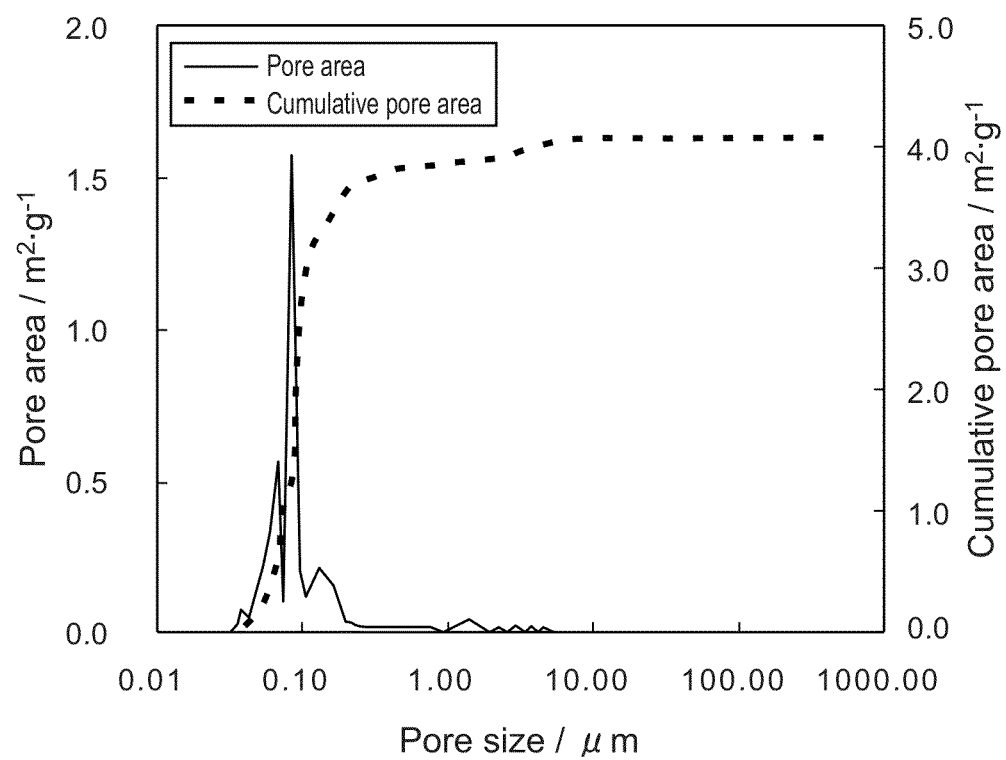
FIG. 67 is a graph showing the pore size and pore area distribution of the manganese oxide obtained in Comparative Example 2-2.

The dimanganese trioxide had a pore volume fraction of 27% for pores with diameters of 10 μm or greater. Also, the pore area ratio was 71% for pores with diameters of up to 0.1 μm. Also, the pore area ratio was 4% for pores with diameters of up to 0.05 μm. Thus, although the tap density of the obtained dimanganese trioxide was high, the pore volume fraction for pores of 10 μm or greater and the pore area ratio for pores of up to 0.1 μm were also high. The particle size distribution of the dimanganese trioxide is shown in FIG. 65, the pore size and pore volume distribution are shown in FIG. 66, and the pore size and pore area distribution are shown in FIG. 67.

Comparative Example 2-3

To purified water at 80° C. there were added a 2 mol/L aqueous manganese sulfate solution and a 2 mol/L aqueous sodium hydroxide solution, and the pH was kept at 4 to 12 while blowing in nitrogen gas, to obtain a manganese hydroxide-containing reaction slurry. Next, 200 ml of a 6 wt % aqueous hydrogen peroxide solution was added to the reaction slurry, and the manganese hydroxide in the reaction slurry was oxidized.

The oxidized reaction slurry was filtered and rinsed, and then dried at 100° C. to obtain trimanganese tetraoxide with the manganese hydroxide oxidized. The evaluation results are shown in Table 4. The X-ray diffraction pattern of the obtained trimanganese tetraoxide was the same pattern as the X-ray diffraction pattern of JCPDS pattern No. 24-734. The trimanganese tetraoxide of Comparative Example 2-3 was a spinel structure monophase. The oxidation number of manganese, as represented by $MnO_x$, was x=1.33.

The trimanganese tetraoxide was fired in air at 600° C. for 6 hours to obtain dimanganese trioxide. The evaluation results are shown in Table 5. The X-ray diffraction pattern of the obtained dimanganese trioxide was the same pattern as the X-ray diffraction pattern of JCPDS pattern No. 41-1442. This was an α-dimanganese trioxide monophase.

Figure 68:
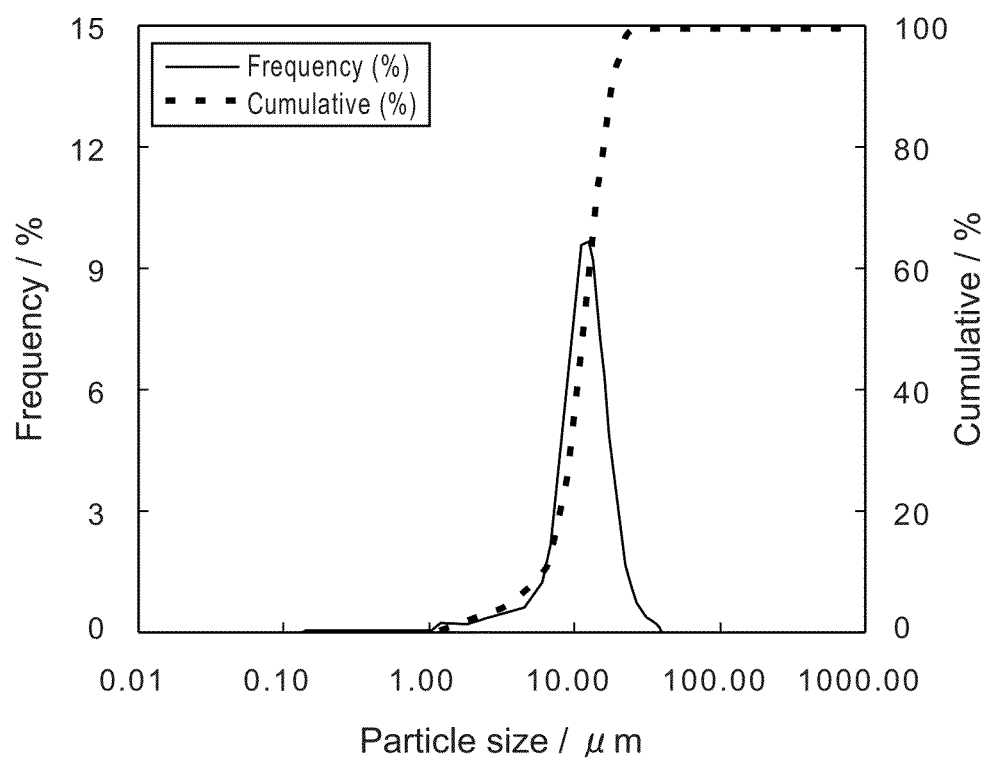
FIG. 68 is a graph showing the particle size distribution of the manganese oxide obtained in Comparative Example 2-3.
Figure 69:
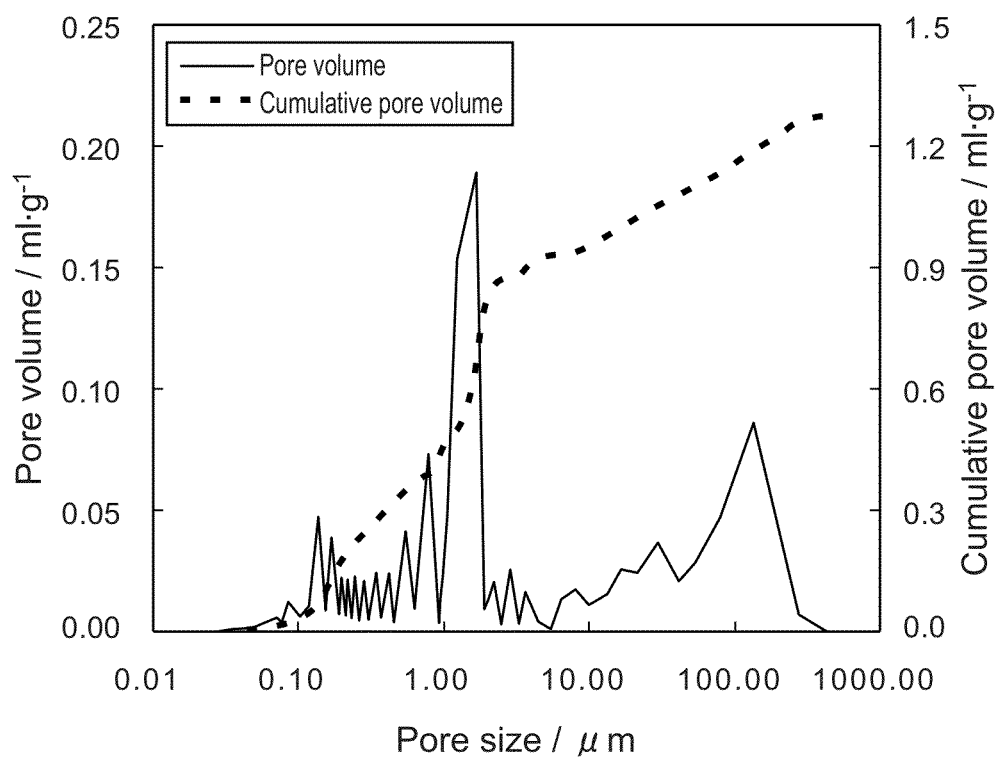
FIG. 69 is a graph showing the pore size and pore volume distribution of the manganese oxide obtained in Comparative Example 2-3.
Figure 70:
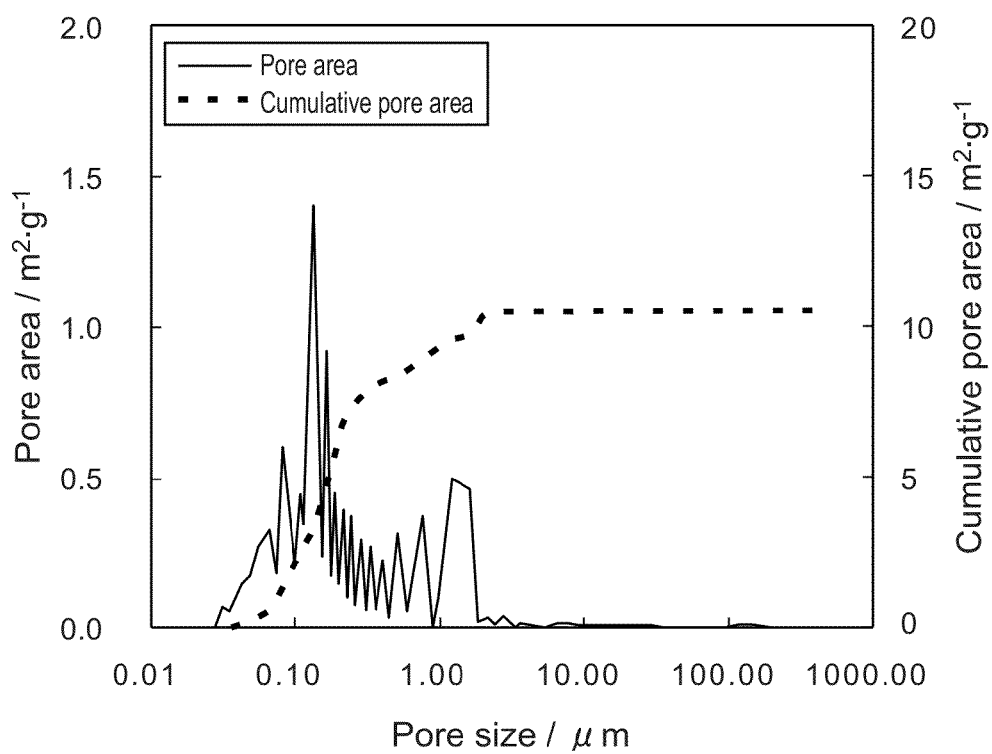
FIG. 70 is a graph showing the pore size and pore area distribution of the manganese oxide obtained in Comparative Example 2-3.

The dimanganese trioxide obtained using trimanganese tetraoxide with a pore volume fraction exceeding 15% for pores of 10 μm or greater as the starting material, not only had a high volume fraction of pores of 10 μm or greater, but also had a low tap density. The particle size distribution of the dimanganese trioxide is shown in FIG. 68, the pore size and pore volume distribution are shown in FIG. 69, and the pore size and pore area distribution are shown in FIG. 70.

Comparative Example 2-4

Figure 71:
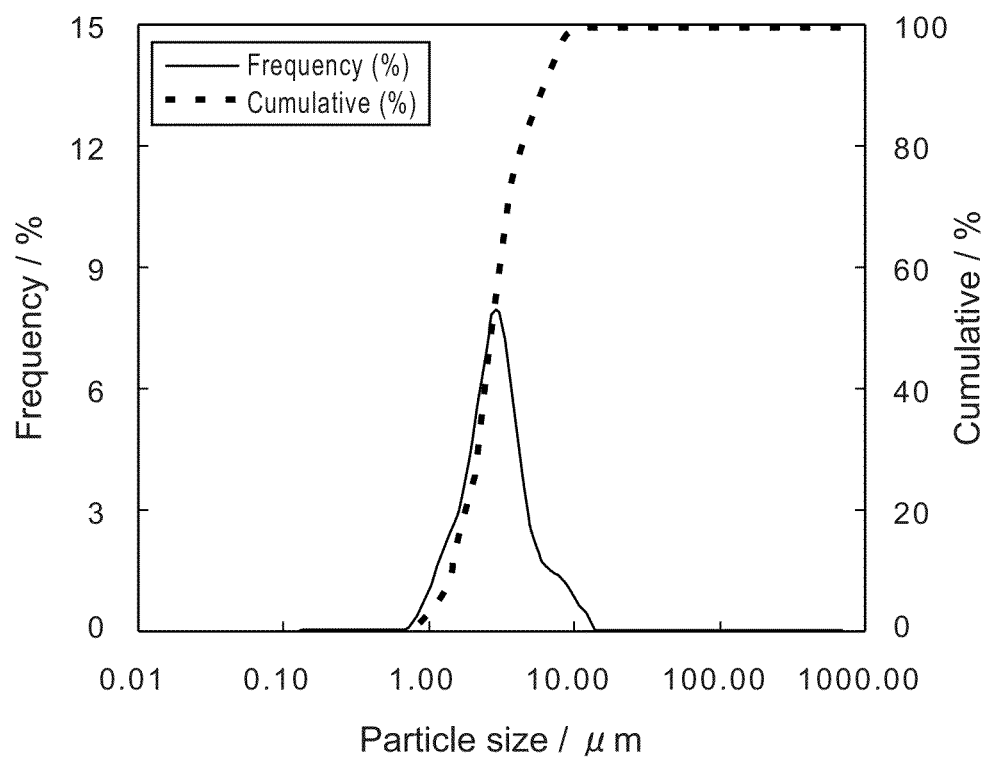
FIG. 71 is a graph showing the particle size distribution of the manganese oxide obtained in Comparative Example 2-4.
Figure 72:
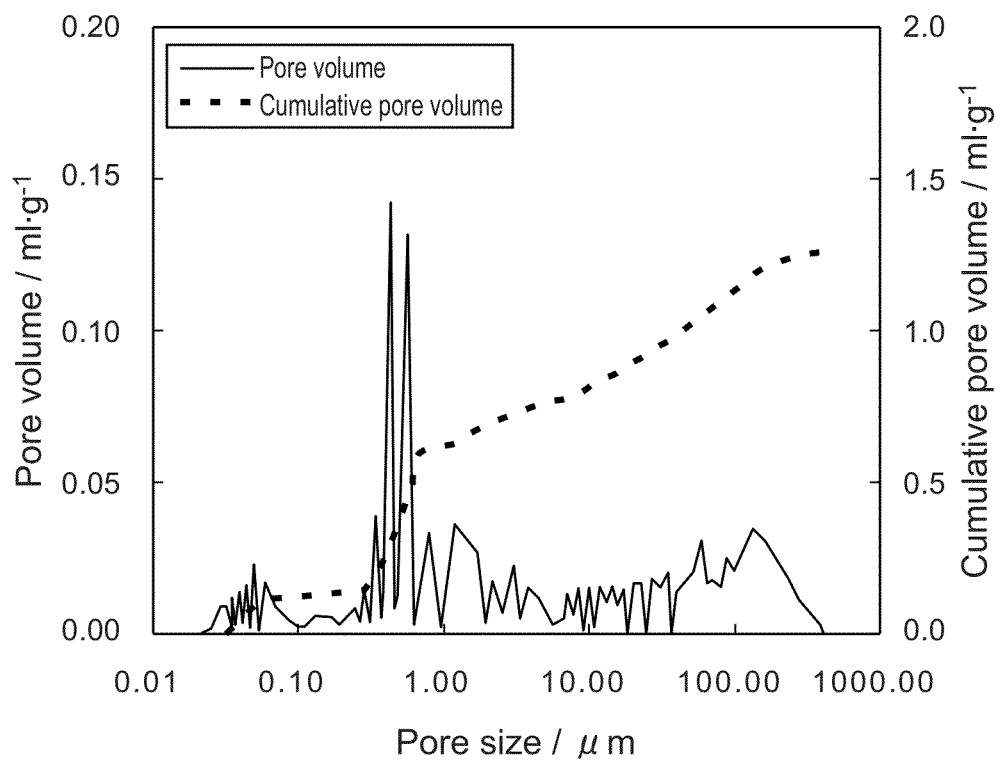
FIG. 72 is a graph showing the pore size and pore volume distribution of the manganese oxide obtained in Comparative Example 2-4.
Figure 73:
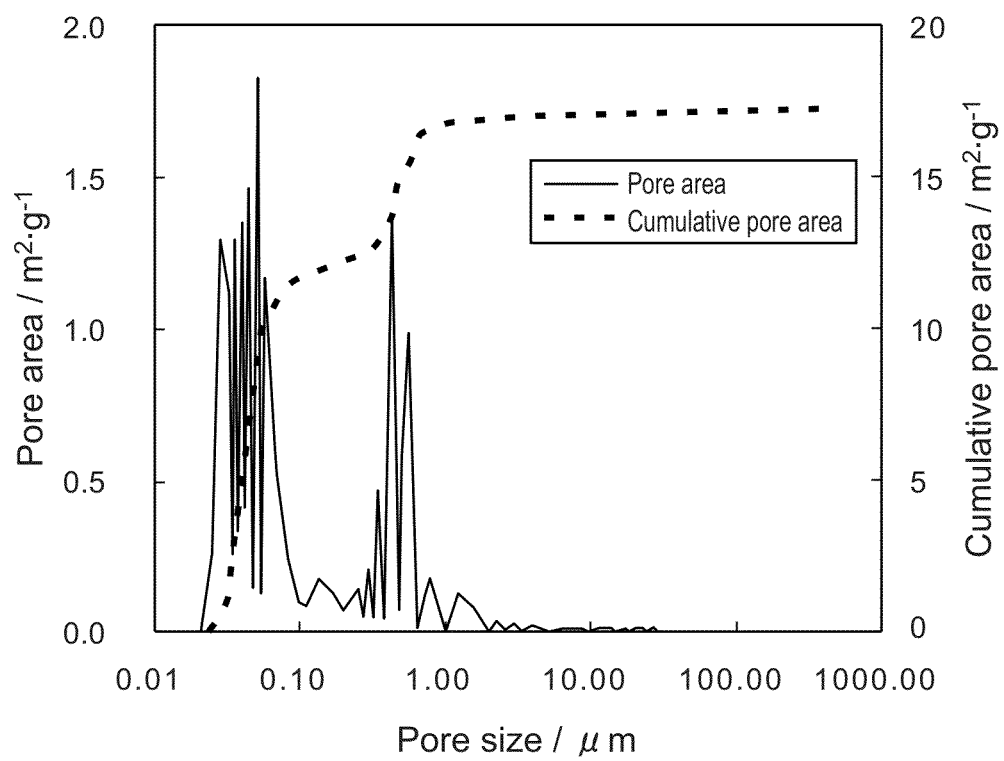
FIG. 73 is a graph showing the pore size and pore area distribution of the manganese oxide obtained in Comparative Example 2-4.

Manganese carbonate with a mode diameter of 2 μm and a tap density of 1.1 g/cm³ was fired in nitrogen (oxygen concentration of ≤1 vol %) at 650° C. for 1 hour. It was then fired in air (oxygen concentration: 21%) at 650° C. for 2 hours to obtain dimanganese trioxide. The particle size distribution of the dimanganese trioxide is shown in FIG. 71, the pore size and pore volume distribution are shown in FIG. 72, and the pore size and pore area distribution are shown in FIG. 73.

The X-ray diffraction pattern of the obtained dimanganese trioxide was the same pattern as the X-ray diffraction pattern of JCPDS pattern No. 41-1442. This was an α-dimanganese trioxide monophase.

The dimanganese trioxide had a pore volume fraction of 35% for pores with diameters of 10 μm or greater. Thus, dimanganese trioxide obtained by firing manganese carbonate in an oxygen concentration-regulated atmosphere had a high value of ≥30% as the volume fraction for pores with diameters of 10 μm or greater.

Comparative Example 2-5

Chemically synthesized manganese dioxide (International Common Sample No. 12) was crushed and classified, to obtain chemically synthesized manganese dioxide particles with a mode diameter of 26 μm. The chemically synthesized manganese dioxide was fired in air at 600° C. for 6 hours to obtain dimanganese trioxide. The evaluation results are shown in Table 5.

The X-ray diffraction pattern of the obtained dimanganese trioxide was the same pattern as the X-ray diffraction pattern of JCPDS pattern No. 41-1442. This was an α-dimanganese trioxide monophase.

Figure 74:
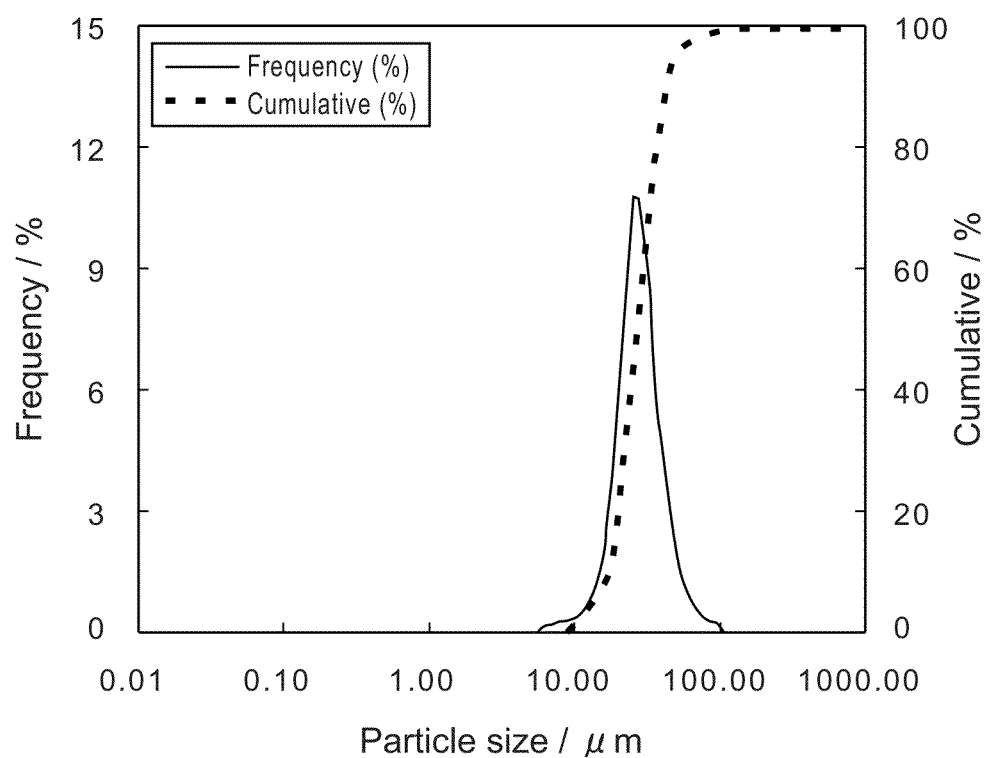
FIG. 74 is a graph showing the particle size distribution of the manganese oxide obtained in Comparative Example 2-5.
Figure 75:
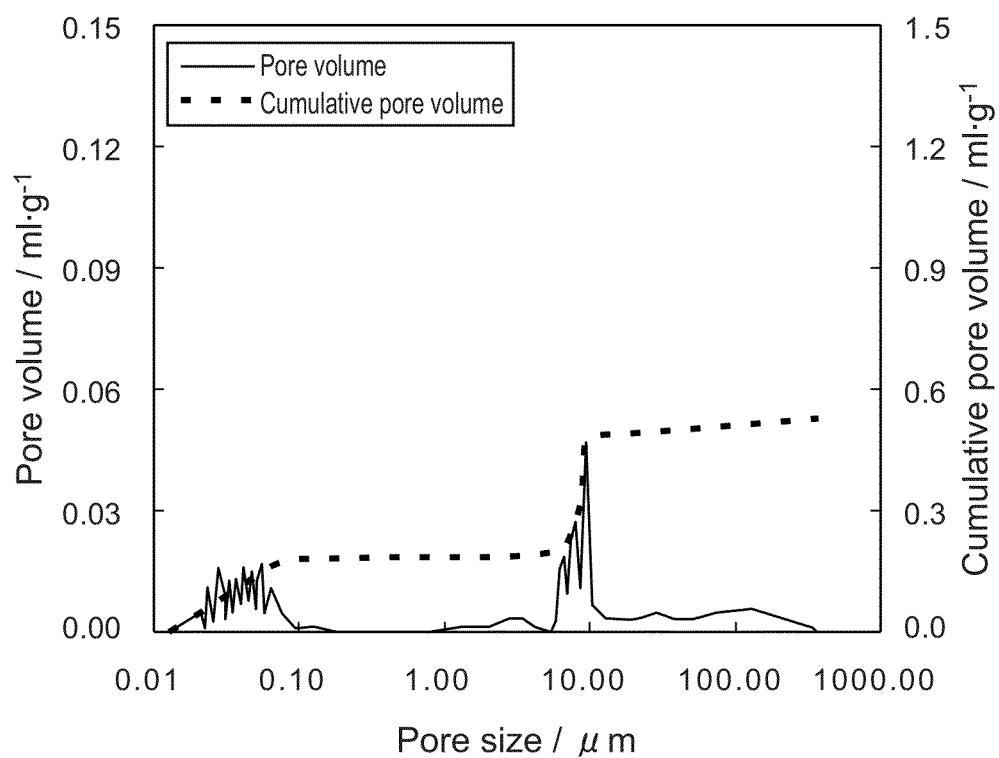
FIG. 75 is a graph showing the pore size and pore volume distribution of the manganese oxide obtained in Comparative Example 2-5.
Figure 76:
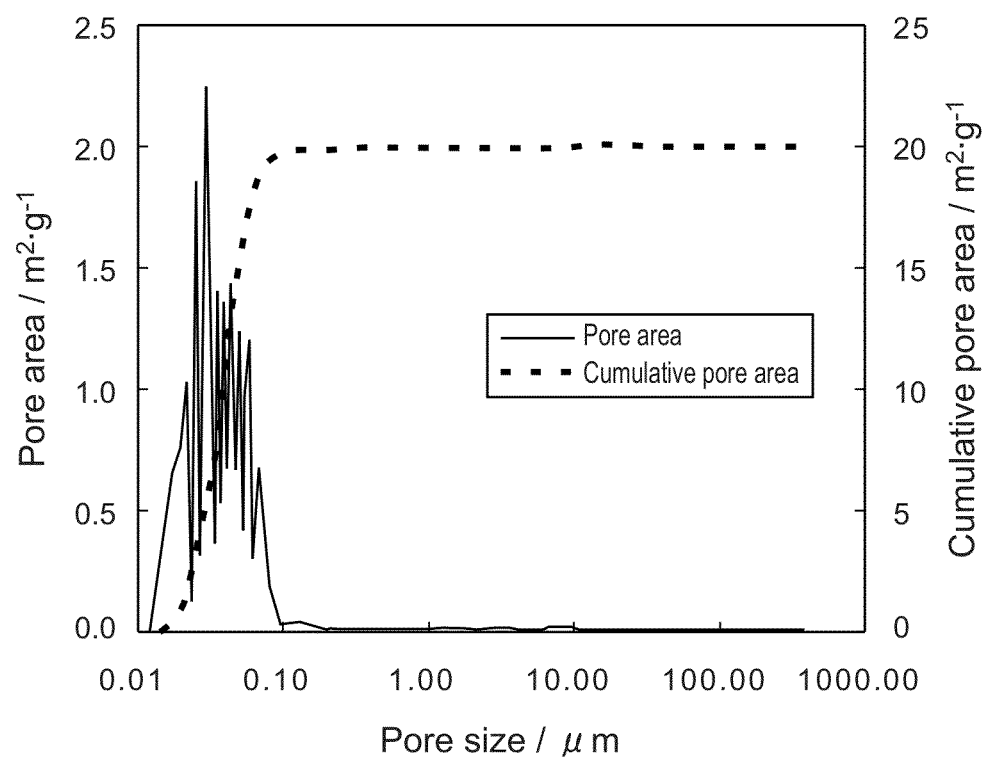
FIG. 76 is a graph showing the pore size and pore area distribution of the manganese oxide obtained in Comparative Example 2-5.

The dimanganese trioxide had a pore volume fraction of 8% for pores with diameters of 10 μm or greater. Dimanganese trioxide obtained by firing chemically synthesized manganese dioxide had a low pore volume fraction for pores with diameters of 10 μm or greater, but had a low tap density. In addition, most of the pores were fine pores with diameters of no greater than 0.1 μm, and even with diameters of no greater than 0.05 μm. The particle size distribution of the dimanganese trioxide is shown in FIG. 74, the pore size and pore volume distribution are shown in FIG. 75, and the pore size and pore area distribution are shown in FIG. 76.

TABLE 4

| Example/ Comp. Ex. | Crystal phase | Na content (ppm) | BET specific surface area (m²/g) | Tap density (g/cm³) | Mode diameter (μm) | Volume fraction of pores ≥ 10 μm (%) | Area ratio of pores ≤ 0.1 μm (%) | Area ratio of pores ≤ 0.05 μm (%) |
|---|---|---|---|---|---|---|---|---|
| Example 2-1 | $Mn_3O_4$ | 60 | 1.3 | 1.81 | 11 | 9 | 1 | 0 |
| Example 2-3 | | | | | | | | |
| Example 2-2 | $Mn_3O_4$ | 110 | 0.4 | 2.38 | 22 | 7 | 0 | 0 |
| Example 2-4 | $Mn_3O_4$ | 310 | 1.9 | 1.81 | 11 | 8 | 0 | 0 |
| Example 2-5 | $Mn_3O_4$ | 130 | 1.3 | 2.00 | 13 | 7 | 0 | 0 |
| Comp. Ex. 2-3 | $Mn_3O_4$ | 190 | 21.3 | 1.23 | 11 | 21 | 12 | 2 |

TABLE 5

| Example/ Comp. Ex. | Crystal phase | Na content (ppm) | BET specific surface area (m²/g) | Tap density (g/cm³) | Mode diameter (μm) | Volume fraction of pores ≥ 10 μm (%) | Area ratio of pores ≤ 0.1 μm (%) | Area ratio of pores ≤ 0.05 μm (%) |
|---|---|---|---|---|---|---|---|---|
| Example 2-1 | $\alpha$-$Mn_2O_3$ monophase | 70 | 1.0 | 1.83 | 11 | 14 | 5 | 0 |
| Example 2-2 | $\alpha$-$Mn_2O_3$ monophase | 100 | 0.2 | 2.48 | 22 | 15 | 0 | 0 |
| Example 2-3 | $\alpha$-$Mn_2O_3$ monophase | 70 | 0.6 | 1.84 | 11 | 15 | 0 | 0 |
| Example 2-4 | $\alpha$-$Mn_2O_3$ monophase | 340 | 0.8 | 1.84 | 11 | 12 | 0 | 0 |
| Example 2-5 | $\alpha$-$Mn_2O_3$ monophase | 140 | 0.5 | 2.03 | 13 | 15 | 0 | 0 |
| Comp. Ex. 2-1 | $\alpha$-$Mn_2O_3$ monophase | 230 | 4.1 | 1.51 | 10 | 31 | 68 | 7 |
| Comp. Ex. 2-2 | $\alpha$-$Mn_2O_3$ monophase | 220 | 4.4 | 1.81 | 20 | 27 | 71 | 4 |
| Comp. Ex. 2-3 | $\alpha$-$Mn_2O_3$ monophase | 180 | 9.9 | 1.23 | 11 | 23 | 18 | 4 |
| Comp. Ex. 2-4 | $\alpha$-$Mn_2O_3$ monophase | 20 | 18.3 | 1.22 | 3 | 35 | 69 | 57 |
| Comp. Ex. 2-5 | $\alpha$-$Mn_2O_3$ monophase | 380 | 24.4 | 1.44 | 26 | 8 | 99 | 74 |

[Synthesis of Lithium Manganese-based Oxide]

Example 2-6

The dimanganese trioxide obtained in Example 2-1 was mixed with lithium carbonate in a mortar, and the mixture was fired in an air stream at 800° C. for 12 hours, to obtain a lithium manganese composite oxide comprising Li and Mn as constituent elements. The obtained lithium manganese composite oxide was a spinel structure monophase. The composition was $Li_{1.12}Mn_{1.88}O_4$. Table 6 shows the evaluation results for the obtained lithium manganese composite oxide.

Comparative Example 2-6

A lithium manganese composite oxide comprising Li and Mn as constituent elements was obtained by the same method as Example 2-6, except for using the dimanganese trioxide obtained in Comparative Example 2-1 instead of the dimanganese trioxide obtained in Example 2-1. Table 6 shows the evaluation results for the obtained lithium manganese composite oxide.

Comparative Example 2-7

A lithium manganese composite oxide comprising Li and Mn as constituent elements was obtained by the same method as Example 2-6, except for using the dimanganese trioxide obtained in Comparative Example 2-2 instead of the dimanganese trioxide obtained in Example 2-1. Table 6 shows the evaluation results for the obtained lithium manganese composite oxide.

Comparative Example 2-8

A lithium manganese composite oxide comprising Li and Mn as constituent elements was obtained by the same method as Example 2-6, except for using the dimanganese trioxide obtained in Comparative Example 2-5 instead of the dimanganese trioxide obtained in Example 2-1. Table 6 shows the evaluation results for the obtained lithium manganese composite oxide.

TABLE 6

| Example/ Comp. Ex. | Crystal phase | Composition | Na content (ppm) | Lattice constant (Å) | BET specific surface area (m²/g) | Mode diameter (μm) | Tap density (g/cm³) |
|---|---|---|---|---|---|---|---|
| Example 2-6 | LiMn spinel monophase | $Li_{1.12}Mn_{1.88}O_4$ | 51 | 8.209 | 0.4 | 10 | 1.83 |

TABLE 6-continued

| Example/ Comp. Ex. | Crystal phase | Composition | Na content (ppm) | Lattice constant (Å) | BET specific surface area (m²/g) | Mode diameter (μm) | Tap density (g/cm³) |
|---|---|---|---|---|---|---|---|
| Comp. Ex. 2-6 | LiMn spinel monophase | $Li_{1.12}Mn_{1.88}O_4$ | 210 | 8.208 | 0.6 | 10 | 1.54 |
| Comp. Ex. 2-7 | LiMn spinel monophase | $Li_{1.12}Mn_{1.88}O_4$ | 220 | 8.210 | 0.6 | 20 | 1.76 |
| Comp. Ex. 2-8 | LiMn spinel monophase | $Li_{1.12}Mn_{1.88}O_4$ | 130 | 8.212 | 2.4 | 26 | 1.49 |

[Fabrication of Lithium Secondary Battery]

The lithium manganese composite oxides obtained in Example 2-6 and Comparative Examples 2-6 to 2-8 were mixed with a mixture of polytetrafluoroethylene and acetylene black as a conductive agent (trade name: TAB-2), in a weight ratio of 2:1. The mixed powder was molded into pellets at a pressure of 1 ton/cm² (98.0665 MPa). This was placed on a mesh (SUS316) and dried under reduced pressure at 150° C., to fabricate a positive electrode for a battery. The obtained positive electrode for a battery, a negative electrode made of a metal lithium foil (thickness: 0.2 mm) and an electrolyte solution obtained by dissolving lithium hexafluorophosphate in a mixed solvent of ethylene carbonate and dimethyl carbonate (volume ratio=1:2) at a concentration of 1 mol/dm³, were used to construct a CR2032 coin cell.

The battery was used for a single charge-discharge at a constant current of 0.4 mA/cm² (corresponding to a discharge rate of 0.3 hour), between a cell voltage of 4.3 V to 3.0 V, as the initial charge-discharge capacity. Next, charge-discharge was conducted 500 times at a charge-discharge rate of 0.3 hour between 4.3 V and 3.0 V. The ratio of the 500the service capacity with respect to the 10the service capacity was recorded as the service capacity maintenance factor. The temperature was 60° C. The evaluation results are shown in Table 7.

TABLE 7

| Example/Comp. Example | Initial capacity (mAh/g) | Cycle performance (%, 500th/10th) |
|---|---|---|
| Example 2-6 | 100 | 85 |
| Comp. Example 2-6 | 100 | 75 |
| Comp. Example 2-7 | 99 | 60 |
| Comp. Example 2-8 | 96 | 56 |

The results demonstrated that a lithium secondary battery employing the lithium manganese composite oxide of Example 2-6 as the positive electrode active material had more satisfactory cell performance, and especially a satisfactory service capacity maintenance factor at high temperature (cycle performance), compared to the comparative examples.

It was shown that lithium manganese composite oxide obtained using a starting material which was dimanganese trioxide with a high packing property but with a high pore volume fraction for pores with diameters of 10 μm or greater, exhibited remarkably low cycle performance, and especially cycle performance at high temperature.

It was also shown that lithium manganese composite oxide obtained using a starting material that was dimanganese trioxide with a low packing property, even when the pore volume fraction was lower than 10% for pores with diameters of 10 μm or greater, exhibited remarkably low cycle performance, and especially low cycle performance at high temperature.

Based on these examples and comparative examples, it was found that the cycle performance of lithium manganese composite oxide can be improved by using dimanganese trioxide with a high packing property and a low pore volume fraction for pores with diameters of 10 μm or greater, as the manganese starting material.

INDUSTRIAL APPLICABILITY

According to the invention, it is possible to provide manganese oxide that can be used as a starting material for a lithium manganese composite oxide to be used as a positive electrode active material for a lithium secondary battery, and especially a lithium manganese composite oxide with an excellent service capacity maintenance factor.

Explanation of Symbols

1: Sealing plate, 2: gasket, 3: case, 4: negative electrode collector, 5: negative electrode, 6: separator, 7: positive electrode, 8: positive electrode collector.

The invention claimed is:

1. A manganese oxide for making lithium manganese oxide for a positive electrode material, the manganese oxide having a pore volume fraction of 7% to 20% for pores with diameters of 10 μm or greater, as measured by mercury porosimetry, and a tap density of 1.6 g/cm³ or greater.

2. The manganese oxide according to claim 1, wherein the pore area ratio is no greater than 15% for pores with diameters of up to 0.1 μm as measured by the mercury porosimetry.

3. The manganese oxide according to claim 1, wherein the mode particle diameter is 10 μm or greater.

4. The manganese oxide according to claim 1, wherein the Na content is no greater than 300 ppm by weight.

5. The manganese oxide according to claim 1, wherein the BET specific surface area is no greater than 5 m²/g.

6. The manganese oxide according to claim 1, wherein the manganese oxide includes either or both trimanganese tetraoxide and dimanganese trioxide.

7. A method for producing a manganese oxide in which the manganese oxide according to claim 1 is obtained from a water-soluble manganese salt solution, the method comprising,
a crystallization step in which the manganese oxide is obtained by crystallizing a trimanganese tetraoxide from the water-soluble manganese salt solution, without conversion via a manganese hydroxide or without crystallization of a hexagonal plate-like manganese hydroxide.

8. The method for producing the manganese oxide according to claim 7, wherein in the crystallization step, the trimanganese tetraoxide is crystallized from the water-soluble manganese salt solution under conditions that satisfy either or both a pH of 6 to 9 and an oxidation-reduction potential of 0 to 300 mV.

9. The method for producing manganese oxide according to claim 7, wherein in the crystallization step, the trimanganese tetraoxide is crystallized while keeping a constant pH of the water-soluble manganese salt solution, or a constant oxidation-reduction potential, or both.

10. The method for producing the manganese oxide according to claim 7, wherein in the crystallization step, the trimanganese tetraoxide is crystallized while keeping the temperature of the water-soluble manganese salt solution at 40° C. or higher.

11. The method for producing manganese oxide according to claim 7, wherein in the crystallization step, oxygen-containing gas is blown into the water-soluble manganese salt solution.

12. The method for producing the manganese oxide according to claim 7, further comprising a firing step in which the trimanganese tetraoxide is fired, after the crystallization step.

13. The method for producing manganese oxide according to claim 12, wherein in the firing step, the trimanganese tetraoxide is fired at 530° C. to 940° C.

14. A method for producing a lithium manganese composite oxide, the method comprising,
a mixing step in which the manganese oxide according to claim 1 is mixed with a lithium compound, and a heating step in which heat treatment is carried out.

15. The method for producing lithium manganese composite oxide according to claim 14, wherein in the mixing step, a heterogeneous metal compound containing a metal element different from manganese or lithium as a constituent element, is mixed with the manganese oxide and the lithium compound.

* * * * *